US012291843B2

(12) United States Patent
Spears et al.

(10) Patent No.: US 12,291,843 B2
(45) Date of Patent: May 6, 2025

(54) SYSTEMS AND METHODS FOR MINI-LOADERS OR OTHER POWER MACHINES

(71) Applicant: Doosan Bobcat North America, Inc., West Fargo, ND (US)

(72) Inventors: Karl Spears, Bismarck, ND (US); Shaun Riveland, Bismarck, ND (US); Thomas Tokach, Mandan, ND (US); Mitchell Pence, Bismarck, ND (US); Andrew Kraft, Bismarck, ND (US)

(73) Assignee: Doosan Bobcat North America, Inc., West Fargo, ND (US)

( * ) Notice: Subject to any disclaimer, the term of this patent is extended or adjusted under 35 U.S.C. 154(b) by 237 days.

(21) Appl. No.: 17/890,767

(22) Filed: Aug. 18, 2022

(65) Prior Publication Data

US 2023/0089256 A1   Mar. 23, 2023

Related U.S. Application Data

(60) Provisional application No. 63/234,352, filed on Aug. 18, 2021.

(51) Int. Cl.
*E02F 9/08*   (2006.01)
*E02F 3/42*   (2006.01)
*E02F 9/22*   (2006.01)

(52) U.S. Cl.
CPC .......... *E02F 9/0866* (2013.01); *E02F 3/422* (2013.01); *E02F 9/2271* (2013.01)

(58) Field of Classification Search
CPC .............................. E02F 9/0866; E02F 9/2271
See application file for complete search history.

(56) References Cited

U.S. PATENT DOCUMENTS

| | | | |
|---|---|---|---|
| 4,942,826 A | 7/1990 | Warren et al. | |
| 5,076,378 A | 12/1991 | Lagace | |
| 5,913,802 A | 6/1999 | Mullet et al. | |
| 10,718,098 B1 * | 7/2020 | Hager | E02F 9/2004 |
| 2004/0064978 A1 | 4/2004 | Hendron | |
| 2007/0017713 A1 | 1/2007 | Sewell et al. | |
| 2016/0090712 A1 | 3/2016 | Yamashita et al. | |
| 2017/0362797 A1 * | 12/2017 | Nakagawa | E02F 9/2075 |
| 2018/0056776 A1 * | 3/2018 | Oshikawa | E02F 3/7604 |
| 2018/0127950 A1 * | 5/2018 | Kukuk | E02F 3/4133 |

(Continued)

FOREIGN PATENT DOCUMENTS

| | | |
|---|---|---|
| JP | S63180482 U | 11/1988 |
| WO | 2017024008 A1 | 2/2017 |

(Continued)

OTHER PUBLICATIONS

International Searching Authority, International Search Report and Written Opinion for counterpart application PCTUS2022040726. Mailed on Dec. 6, 2022 [20 pgs].

*Primary Examiner* — Erez Gurari
(74) *Attorney, Agent, or Firm* — Quarles & Brady LLP

(57) ABSTRACT

The present disclosure provides systems and methods for power machines, including a mini-loader that includes a frame, an operator station positioned toward a rear end of the frame and configured to be used by an operator who is behind or on the rear end of the frame, and a power source positioned toward a front end of the frame.

23 Claims, 50 Drawing Sheets

(56) References Cited

U.S. PATENT DOCUMENTS

| | | | |
|---|---|---|---|
| 2020/0071906 A1* | 3/2020 | Glasser | E02F 3/433 |
| 2020/0271143 A1 | 8/2020 | Binstock et al. | |
| 2021/0032847 A1* | 2/2021 | Carlson | E02F 9/2037 |
| 2023/0089256 A1* | 3/2023 | Spears | B62D 51/02 |
| | | | 180/305 |
| 2024/0068199 A1* | 2/2024 | Durkin | B62D 51/007 |

FOREIGN PATENT DOCUMENTS

| | | |
|---|---|---|
| WO | 2017040643 A1 | 3/2017 |
| WO | 2021021943 A1 | 2/2021 |

\* cited by examiner

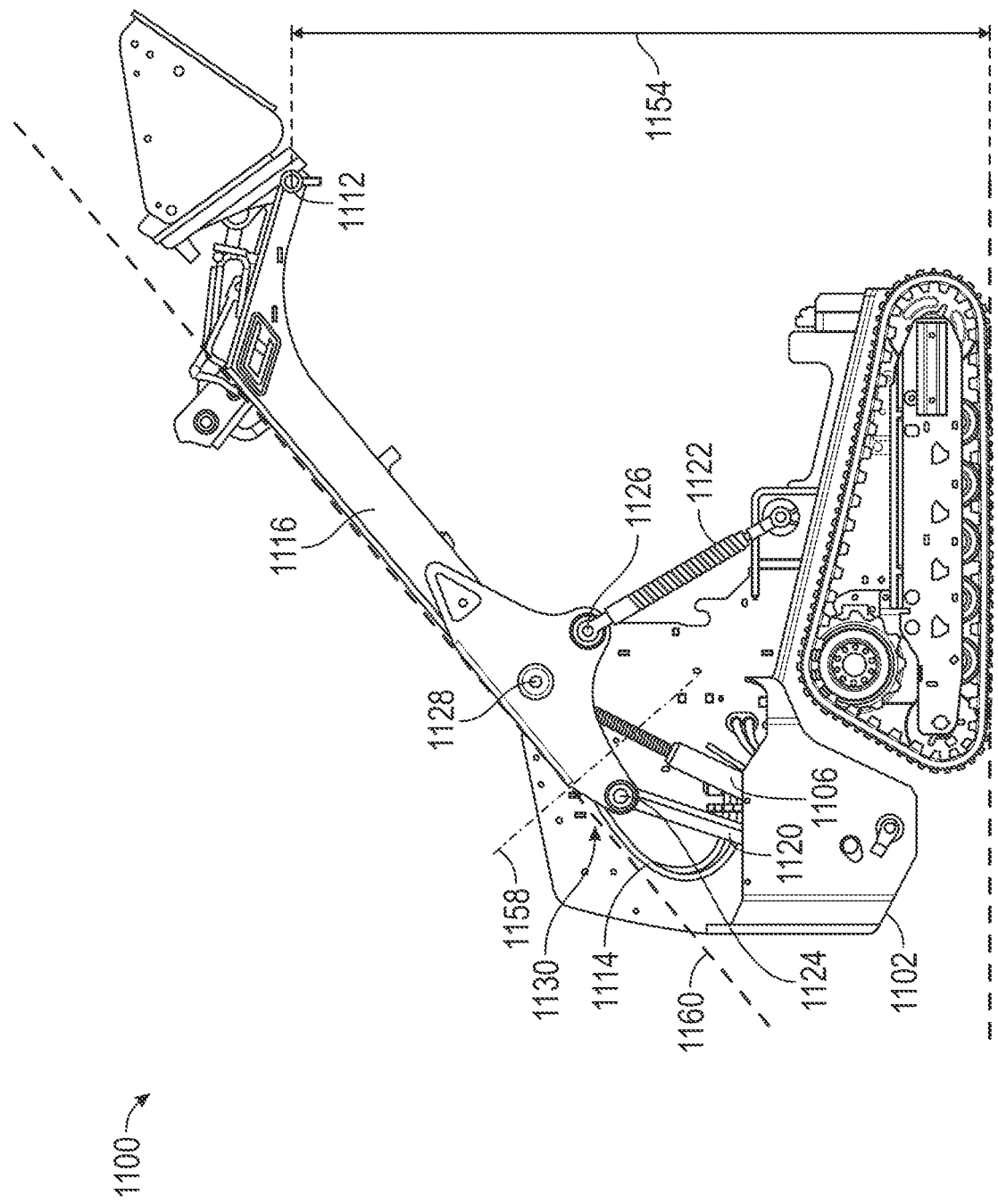

SYSTEMS AND METHODS FOR MINI-LOADERS OR OTHER POWER MACHINES

CROSS-REFERENCE TO RELATED APPLICATIONS

This application claims priority to U.S. provisional patent application No. 63/234,352, filed Aug. 18, 2021, the entirety of which is incorporated herein by reference.

BACKGROUND

This disclosure is directed toward power machines. Power machines, for the purposes of this disclosure, include any type of machine that generates power to accomplish a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders (e.g., mini-loaders), excavators, utility vehicles, tractors, mowers, and trenchers, to name a few examples.

The discussion above is merely provided for general background information and is not intended to be used as an aid in determining the scope of the claimed subject matter.

SUMMARY

According to one aspect of the present disclosure, a mini-loader is provided. The mini-loader can include a frame, an operator station positioned toward a rear end of the frame and configured to be used by an operator who is behind or on the rear end of the frame, a power source positioned toward a front end of the frame, and at least one heat exchanger supported by the frame and configured to cool fluid passing through the at least one heat exchanger. The at least one heat exchanger can be positioned between the power source and the operator station.

In some examples, one or more of the following aspects can be additionally included, individually or in combination. The at least one heat exchanger can be oriented vertically. The at least one heat exchanger can be positioned vertically above an axis defined by a crankshaft of the power source. A bottom end of the at least one heat exchanger can be pivotally mounted to the frame. The at least one heat exchanger can be at least two heat exchangers including a radiator configured to receive coolant from the power source and an oil cooler configured to receive hydraulic fluid from the one or more hydraulic pumps. The radiator can be coupled to the oil cooler. The radiator and the oil cooler can be arranged in the same plane. The radiator can be positioned vertically above the oil cooler. The mini-loader can also include: an air inlet positioned toward a rear end of the frame; a hood pivotally coupled to the frame and configured to cover the power source and at least one side of the at least one heat exchanger; at least one air outlet arranged on a first lateral sidewall of the hood or an opposing second lateral sidewall of the hood; and a fan coupled to the at least one heat exchanger and configured to draw air through an airflow path defined by the air inlet, the at least one heat exchanger, and the at least one air outlet. The fan can be a variable-speed electric fan. An air inlet can be positioned vertically below an operator control panel and the at least one heat exchanger can be positioned forward of the operator control panel. The at least one heat exchanger can be pivotally mounted to the frame and configured to pivot in a first direction and the hood can be configured to pivot in a second direction opposite the first direction. The at least one air outlet can include at least two air outlets including a first air outlet on the first lateral sidewall and a second air outlet on the second lateral sidewall. The hood can define an enclosure including an open back side configured to receive air entering through the at least one heat exchanger, the first lateral sidewall, the second lateral sidewall, a top wall, and a bottom wall, so that the enclosure is configured to prevent air entering through the at least one heat exchanger from entering into a power source compartment containing the power source. The hood can include a vertical center baffle configured to separate air entering through the at least one heat exchanger to direct an outlet flow of the air through the first and second air outlets in the first and second lateral sidewalls, respectively.

According to one aspect of the present disclosure, a mini-loader can include a frame, an operator station positioned toward a rear end of the frame and configured to be used by an operator who is behind or on the rear end of the frame, a power source positioned toward a front end of the frame, and a hydraulic pump unit including one or more hydraulic pumps. The hydraulic pump unit can be operatively coupled to the power source and extends from the power source towards the rear end of the frame.

In some examples, one or more of the following aspects can be additionally included, individually or in combination. The hydraulic pump unit is solely supported by a coupling with the power source. The hydraulic pump unit can be supported by the power source in a cantilever arrangement. A shaft of the hydraulic pump unit can be arranged in-line with and coupled to a crank shaft of the power source. The hydraulic pump unit can include: a first drive pump configured to power to a first drive motor to operate a first tractive element; a second drive pump configured to power to a second drive motor to operate a second tractive element; and an implement pump configured to power one or more work elements. The first drive pump, second drive pump, and implement pump can be axially aligned with one another. The first drive pump can be operatively coupled to the crank shaft of the power source, the second drive pump can be operatively coupled to the first drive pump, and the implement pump can be operatively coupled to the second drive pump.

According to one aspect of the present disclosure, a mini-loader can include a frame, an operator station positioned toward a rear end of the frame and configured to be used by an operator who is behind or on the rear end of the frame, and a power source positioned toward a front end of the frame. The frame can include a first side frame member, a second side frame member laterally opposite the first side frame member, and a cross member spanning between the first and second side frame members. The power source can be supported by each of the first side frame member, the second side frame member, and the cross member.

In some examples, one or more of the following aspects can be additionally included, individually or in combination. The power source can be rearward of the cross member. The engine mounts can include: a first engine mount coupled between a front side of the power source and the cross member; a second engine mount coupled between the power source and the first side frame member; and a third engine mount coupled between the power source and the second side frame member. The first engine mount can be positioned in a vertical plane defined by a crankshaft of the power source. The second engine mount and the third engine mount can define a lateral axis therebetween, the lateral axis being perpendicular to a crankshaft axis.

According to one aspect of the present disclosure, a mini-loader can include a frame including a first side frame member, a second side frame member laterally opposite the first side frame member, and a cross member spanning between the first and second side frame members, and a bottom frame member spanning between the first and second side frame members. The mini-loader can also include an operator station positioned toward the rear end of the frame and configured to be used by an operator who is behind or on the rear end of the frame, a power source positioned toward a front end of the frame and supported by the frame, a receptacle at least partly defined by the frame between the first and second side frame members, and a fuel tank received in the receptacle and configured to provide fuel to the power source. The fuel tank can be removable from the front end of the frame through a frame opening defined by the first side frame member, the second side frame member, the cross member, and the bottom frame member.

In some examples, one or more of the following aspects can be additionally included, individually or in combination. The mini-loader can include an access panel removably coupled to the frame and configured to cover the frame opening. The mini-loader can include a front pad arranged between the access panel and the fuel tank. The fuel tank can include one or more pads arranged between the frame and the fuel tank and configured to isolate the fuel tank from the frame. The one or more pads can provide an interference fit between the fuel tank and the receptacle.

According to one aspect of the present disclosure, a mini-loader can include a frame, an operator station positioned toward a rear end of the frame and configured to be used by an operator who is behind or on the rear end of the frame, a power source positioned toward a front end of the frame, a first track assembly, and a second track assembly. Each of the first and second track assemblies can be configured to be powered by the power source and define a wheelbase greater than about 1,100 millimeters (mm) and a track width greater than about 200 mm. The mini-loader can define an unloaded mass of greater than about 3500 lbs. This mini loader can further include a ground contact pressure of less than about 5.0 psi (e.g., as calculated by a standard defined by ISO 16754:2008). In some examples, the first and second track assemblies can further define a vehicle width of between about 900 mm to about 908 mm.

According to one aspect of the present disclosure, a mini-loader can include a frame, a drive motor supported by the frame, a sprocket coupled to the drive motor, a track frame coupled to the frame, a track surrounding the track frame and configured to be driven by the sprocket, and a tensioner assembly. The tensioner assembly can include an idler frame, an idler rotatably coupled to the idler frame and configured to engage the track, and a tensioning cylinder coupled between the track frame and the idler frame. The tensioning cylinder can be configured to move the idler frame relative to the track frame to adjust a tension of the track. The track frame can define a guide slot configured to receive the idler frame to prescribe a path of movement of the idler frame by the tensioning cylinder.

In some examples, one or more of the following aspects can be additionally included, individually or in combination. The idler frame can include a protrusion configured to extend into the guide slot. The guide slot can include an end stop configured to engage the protrusion on the idler frame, the end stop defining a retracted position of the idler. An actuation range between a tensioned position, in which the idler is in contact with the track, and the retracted position can be greater than 50 mm. The actuation range can be greater than 70 mm. An actuation range between a tensioned position, in which the idler is in contact with the track, and the retracted position can be between 2% and 15% of a wheelbase defined by the mini-loader.

According to one aspect of the present disclosure, a kit for converting a mini-loader from a narrow track configuration to a wide track configuration is provided. The mini-loader can include a frame, a track frame, a drive motor coupled to the frame, and a first sprocket coupled to a hub of the drive motor and configured to drive a track surrounding the track frame. The first sprocket can define a first offset between the hub of the drive motor and teeth on the first sprocket. The kit can include one or more spacers configured to be coupled between the frame and the track frame of the mini-loader, and a second sprocket configured to mount to the hub of the drive motor on the mini-loader. The second sprocket can define a second offset between the hub of the drive motor and teeth on the second sprocket. The second offset can be different than the first offset by a distance equal to a thickness of the one or more spacers. In some examples, the second offset of the second sprocket can be less than the first offset of the first sprocket.

According to one aspect of the present disclosure, a method of converting a mini-loader from a narrow track configuration to a wide track configuration is provided. The method can include removing a narrow track from a track assembly of the mini-loader, removing the track assembly mounted to a frame of the mini-loader, and removing a first sprocket mounted to a drive motor coupled to the frame. The first sprocket defines a first offset between a hub of the drive motor and teeth on the first sprocket. The method further includes installing one or more spacers between the track assembly and the frame, and, without removing a drive motor coupled to the frame, installing a second sprocket onto the drive motor. The second sprocket defines a second offset between the hub of the drive motor and teeth on the second sprocket. The second offset is different than the first offset by a distance equal to a thickness of the one or more spacers. Further, the method includes installing a wide track onto the track assembly.

According to one aspect of the present disclosure, a mini-loader can include a frame, an operator station positioned toward a rear end of the frame, a reference plane, a control panel supported by the frame, and at least one joystick mounted to the frame and extending through the control panel to provide control signals for controlling one or more work elements. The reference plane can be defined by one of: a contact area between a track of the mini-loader and level ground, or an operator platform configured to support an operator. The at least one joystick can be biased to a neutral position and configured to be moved relative to the neutral position. The neutral position can define a neutral axis that is tilted forward relative to a vertical axis that is orthogonal to the reference plane.

In some examples, one or more of the following aspects can be additionally included, individually or in combination. The neutral axis can be tilted forward at an angle greater than about 5 degrees. The neutral axis can be tilted inboard relative to a vertical plane passing through a centerline of the frame and orthogonal to the reference plane. The neutral axis can be tilted inboard at an angle between about 2 degrees and about 15 degrees. The at least one joystick can be positioned at least 800 mm above the operator platform. The at least one joystick can be positioned at least 250 mm forward of a forward-most contact surface of a hip pad of the operator station. The at least one joystick can be laterally offset from a centerline of the frame by at least about 50 mm. The at least one joystick can include a first joystick and a second joystick, in which the first and second joysticks can be laterally separated by at least about 100 mm. The mini-loader can also include a reference bar coupled to the control panel and at least partially surrounding the at least one joystick. A forward end of the reference bar can define a first height relative to the reference plane and a rearward end of the reference bar defines a second height relative to the reference plane. The first height can be different from the second height such that a reference axis passing through the forward and rearward ends of the reference bar can be not parallel to the reference plane. The reference bar can include a first bar portion forward of the joystick, a second bar portion aft of the joystick, and a third bar portion extending between the first bar and the second bar. The third bar portion can define a curved profile that extends initially upwards and away from a rearward end of the reference bar and then downwards towards a forward end of the reference bar. The first bar portion can define a c-shaped bar section that opens toward the rear end of the frame and the second bar portion can define a c-shaped bar section that opens towards a forward end of the frame. First, second, and third bar portions can be continuously connected to partially surround the joystick. The reference bar can include a first support extending between the first bar portion and the control panel and a second support extending between the second bar portion and the control panel. The first support can include a first support portion that extends away from the control panel and a second support portion that extends rearward and away from the first bar portion to meet the first support portion at a bend; and in which the bend defines an angle between the first support portion and the second support portion that can be less than about 150 degrees. The second support can include a third support portion that extends away from the control panel and a fourth support portion that extends forward and away from the second bar portion to meet the third support portion at a bend, in which the bend defines an angle between the third support portion and the fourth support portion that can be less than about 165 degrees.

According to one aspect of the disclosure, a mini-loader can include a frame defining a front end opposite a rear end and a first lateral side extending between the front end and the rear end. The mini-loader can further include a drive motor supported by the frame and a track assembly supported by the frame on the first lateral side. The track assembly can be operatively coupled to the drive motor to move the mini-loader along a support surface. The track assembly can include a track frame coupled to the frame, a sprocket rotatably coupled to the track frame and configured to couple to the drive motor, and a track surrounding and being supported by the track frame. The track can be configured to be driven by the sprocket. The track assembly can further include a front idler rotatably coupled to the track frame at a front of the track frame to rotate about a front idler axis, a rear idler rotatably coupled to the track frame at a rear of the track frame to rotate about a rear idler axis, and a plurality of rollers. Each roller of the plurality can be rotatably coupled to the track frame to rotate about a corresponding roller axis and arranged in a front-to-back direction between the front idler axis and the rear idler axis. The plurality of rollers can include a front roller having a front roller axis and being positioned closer to the front idler axis than are the other rollers in the plurality of rollers, a rear roller having a rear roller axis and being positioned closer to the rear idler axis than are the other rollers in the plurality of rollers, and a plurality of intermediary rollers each having an intermediary roller axis positioned between the front roller axis and the rear roller axis relative to a front-to-back direction of the mini-loader. The plurality of intermediary rollers can include a first intermediary roller having a first intermediary roller axis and a second intermediary roller having a second intermediary roller axis. The first intermediary roller axis can be positioned closer to the front roller axis than is the second intermediary roller axis and the second intermediary roller axis can be positioned closer to the rear roller axis than is the first intermediary roller axis. Further, the track assembly can also define an intermediary plane tangent to at least two of the plurality of intermediary rollers, a rear plane tangent to the second intermediary roller and the rear roller, and a front plane tangent to first intermediary roller and the front roller. The rear plane can be angled relative to the intermediary plane at a first angle greater than zero degrees and the front plane can be angled relative to the intermediary plane at a second angle greater than zero degrees.

In some examples, one or more of the following aspects can be additionally included, individually or in combination. When the support surface is a hard surface, on the first lateral side: with the mini-loader in a neutral loaded state, downward force from the total weight of the mini-loader can be distributed on the support surface primarily by the plurality of intermediary rollers loaders; with the mini-loader in a front loaded state, downward force from the total weight of the mini-loader can be distributed on the support surface primarily by the front roller and the first intermediary roller; and with the mini-loader in a rear loaded state, downward force from the total weight of the mini-loader can be distributed on the support surface primarily by the rear roller and the second intermediary roller. For each of the neutral loaded state, the front loaded state, and the rear loaded state, the weight of the mini-loader can be not distributed on the support surface by each of the first idler and the second idler. The front and rear roller axes can be elevated above the first and second intermediary roller axes relative to the support surface so that, when the support surface is a hard surface: with the mini-loader in a neutral loaded state of the mini-loader, the intermediary plane can be substantially parallel with the support surface; with the mini-loader in a front loaded state, the front plane can be substantially parallel with the support surface; and with the mini-loader in a rear loaded state, the rear plane can be substantially parallel with the support surface. Each of the first angle and the second angle can be within a range between 0 degrees and 5 degrees, inclusive. The track assembly further can define at least one of: a rear elevation plane tangent to the rear roller and the rear idler, the rear elevation plane angled relative to the intermediary plane at a third angle that can be greater than the first angle; and a front elevation plane tangent to the front roller and the front idler, the front elevation plane angled relative to the intermediary plane at a fourth angle that can be greater than the second angle.

According to one aspect of the disclosure, a track assembly for a power machine can be provided. The track assembly can include a track frame defining a first end opposite a second end, a track surrounding and being supported by the frame, and a sprocket rotatably coupled to the track frame and configured to engage with the track to rotate the track around the track frame. A first idler can be rotatably coupled to the track frame at the first end and configured rotate about a first idler axis and a second idler can be rotatably coupled to the track frame at the second end and configured rotate about a second idler axis. In addition, the track assembly can include a plurality of rollers. Each roller of the plurality of rollers cab be rotatably coupled to the track frame and arranged sequentially between the first idler axis and the second idler axis. The plurality of rollers can include a first, second, third, and fourth roller. The first roller can have a first roller axis positioned closer to the first idler axis than can be the roller axes of the other rollers in the plurality of rollers. The second roller can have a second roller axis positioned closer to the second idler axis than can be the roller axes of the other rollers in the plurality of rollers. The third roller can have a third roller axis positioned between the first and second roller axes relative to a front-to-back direction of the power machine. The fourth roller can have a fourth roller axis positioned between the first and second roller axes relative to the front-to-back direction of the power machine, and positioned closer to the second roller axis than can be the third roller axis. The third and fourth rollers can define a first plane tangent to a bottom side of the third and fourth rollers. The first roller can be spaced perpendicularly from the first plane by a first roller distance. The first idler can be spaced perpendicularly from the first plane by a first idler distance that can be greater than the first roller distance. The second roller can be spaced perpendicularly from the first plane by a second roller distance. The second idler can be spaced perpendicularly from the first plane by a second idler distance that can be greater than the second roller distance.

In some examples, one or more of the following aspects can be additionally included, individually or in combination. The mini-loader can also include a fifth roller having a fifth roller axis and positioned so that the fifth roller axis can be between the third roller axis and the fourth roller axis, a bottom side of the fifth roller being tangent to the first plane. The first roller distance can be equal to the second roller distance. The first roller distance and the second roller distance can be approximately 2 mm, and in which the first idler distance and the second idler distance can be approximately 6 mm.

According to one aspect of the disclosure, a method can be provided for reducing friction when turning a power machine on a hard support surface, wherein the power machine has a center of gravity location in an unloaded state. The method can include rotating a track around a track frame that can be secured to a lateral side of the power machine. The track frame can extend in a front-to-back direction between a front end of the power machine and a rear end of the power machine. The track frame and the track can define, for any given rotational orientation of the track, a front contact portion, an intermediary contact portion that does not extend in parallel with the front contact portion, and a rear contact portion that does not extend in parallel with the front contact portion or the intermediary contact portion. A tractive force to turn the power machine can be applied primarily at the front contact portion when the power machine can be in a front loaded state relative to the center of gravity location. A tractive force to turn the power machine can be applied primarily at the intermediary contact portion when the power machine can be in a neutral loaded state relative to the center of gravity location. A tractive force to turn the power machine can be applied primarily at the rear contact portion when the power machine can be in a rear loaded state relative to the center of gravity location.

In some examples, one or more of the following aspects can be additionally included, individually or in combination. The track can be rotatably supported on the track frame by: a front idler that can be rotatably coupled at front of the track frame to rotate about a front idler axis; a rear idler that can be rotatably coupled at rear of the track frame to rotate about a rear idler axis, and a plurality of rollers; and a plurality of rollers rotatably coupled to the track frame, can arranged in a front-to-back direction between the front idler axis and the rear idler axis. Each roller of the plurality can be rotatably coupled to the track frame to rotate about a corresponding roller axis and the plurality of rollers can include: a front roller having a front roller axis and being positioned closer to the front idler axis than can be the other rollers in the plurality of rollers; a rear roller having a rear roller axis and being positioned closer to the rear idler axis than can be the other rollers in the plurality of rollers; and a plurality of intermediary rollers (e.g., each having an intermediary roller axis positioned between the front roller axis and the rear roller axis relative to a front-to-back direction of the mini-loader). The plurality of intermediary rollers can include a first intermediary roller having a first intermediary roller axis and a second intermediary roller having a second intermediary roller axis, the first intermediary roller axis being positioned closer to the front roller axis than can be the second intermediary roller axis and the second intermediary roller axis being positioned closer to the rear roller axis than can be the first intermediary roller axis. The front contact portion can extend between the front roller axis and the first intermediary roller axis, the second intermediary contact portion extends between the first intermediary roller axis and the second intermediary roller axis, and the rear contact portion can extend between the second intermediary roller axis and the rear roller axis.

According to one aspect of the disclosure, a mini-loader can include a frame and an operator platform coupled to the frame The operator platform can define a support surface and can include protrusions extending from the support surface to provide anti-slip contact for an operator standing on the operator platform. The mini-loader can further include a mat having a top surface opposite a bottom surface and through-holes that extend between the top and bottom surfaces. The bottom surface can contact the support surface and the through-holes can be configured to receive the protrusions to expose the protrusions for contact with an operator standing on the mat.

In some examples, one or more of the following aspects can be additionally included, individually or in combination. The protrusions can extend above the support surface by at least a protrusion height. A thickness of the mat between the top and bottom surfaces with the mat in an uncompressed state can be greater than or equal to the protrusion height. The mat can be configured to be reversibly compressed to reduce the thickness of the mat to be less than the protrusion height. The mat further can include a plurality of annular protrusions, with each annular protrusion of the plurality surrounding a perimeter of a corresponding one of the through-holes, the plurality of annual protrusions extending from an intermediary surface of the mat to partly define the top surface of the mat. The mini-loader can also include a resilient member disposed between the operator platform and the frame, the resilient member configured to attenuate pivotal movement of the operator platform relative to the frame and vibrations transferred from the frame to the operator platform.

According to one aspect of the disclosure, a mini-loader can include a frame, a power source supported by the frame, and an operator station positioned toward a rear end of the frame. The mini—loader can also include a lift arm structure that can include: a lift arm that can include a tube weldment and can define an internal channel, a linkage that pivotally supports the lift arm relative to the frame, and a lift actuator pivotally secured to the lift arm structure to raise and lower the lift arm between a fully lowered and a fully raised position. The mini—loader can also include transmissive lines extending through the internal channel to relay signals from the power source to an implement supported by the lift arm. With the lift arm in the fully lowered position, a first pivot joint between the linkage and the lift arm can be rearward of a second pivot joint between the lift actuator and the lift arm. The transmissive lines can extend within a portion of the internal channel of the lift arm that can be fully enclosed by the tube weldment, along a length of the lift arm that can include and extends forward of at least one of the first or second pivot joints.

In some examples, one or more of the following aspects can be additionally included, individually or in combination. The transmissive lines can extend over and rearward of the first pivot joint to enter the internal channel from the frame. A top side of the lift arm can define a top reference plane; and in which, with the lift arm in the fully lowered position, the transmissive lines extends from the frame to the internal channel entirely below the top reference plane. An internal wall of the tube weldment can define a lower internal boundary of the internal channel; and in which, the lower internal boundary deviates by no more than four degrees from parallel to a reference line between the axes of rotation of the first and second pivot joints. Internal walls of the tube weldment can define a lower internal boundary of the internal channel and an upper internal boundary of the internal chamber. Along the lift arm between the first and second pivot joints, one or more of: the lower internal boundary can be spaced no more than about 2.8 inches from a reference line between the axes of rotation of the first and second pivot joints; or the upper internal boundary can be spaced no less than about 4.5 inches from the reference line between the axes of rotation of the first and second pivot joints. Along the lift arm between the first and second pivot joints, the lower internal boundary can be spaced no more than about 2.8 inches from the reference line and the upper internal boundary can be spaced no more than about 4.5 inches from the reference line. Along the lift arm between the first and second pivot joints, the internal channel can exhibit a minimum cross-sectional height of about 1.8 inches, as measured perpendicular to a reference line between the axes of rotation of the first and second pivot joints. The transmissive lines can include hydraulic lines arranged to transmit hydraulic power to the implement. The transmissive lines can include electrical signal lines arranged to transmit electrical signals to the implement. The length of the lift arm, along which the transmissive lines extend within the fully enclosed portion of the internal channel, can include and extend forward of the second pivot joint.

This Summary and the Abstract are provided to introduce a selection of concepts in a simplified form that are further described below in the Detailed Description. This Summary is not intended to identify key features or essential features of the claimed subject matter.

DRAWINGS

FIGS. 44A and 44B illustrate a right side elevation view of the power machine of FIG. 41 with the lift arm structure raised to a first height and in a fully raised configuration, respectively.

DETAILED DESCRIPTION

Figure 1:
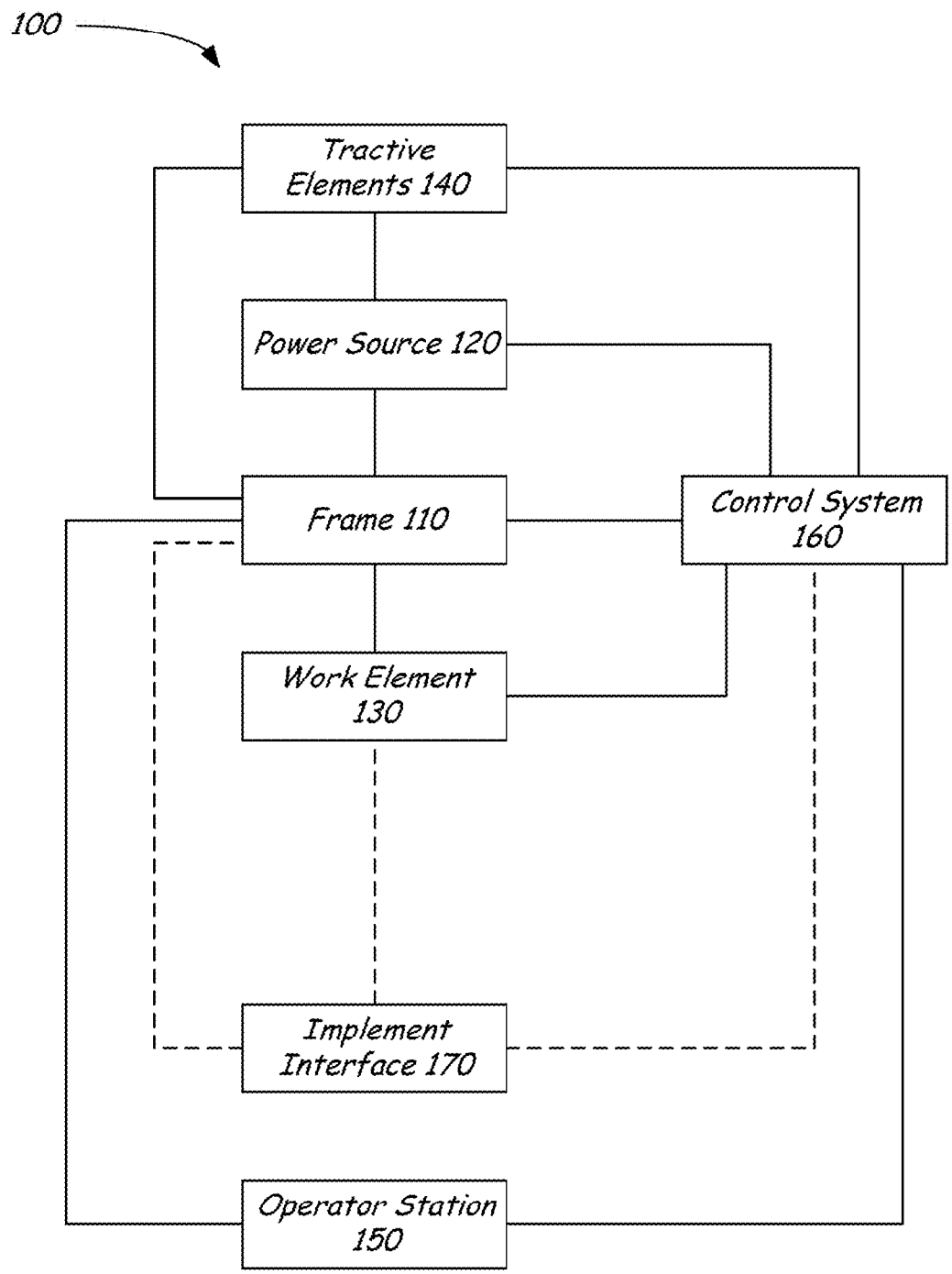
FIG. 1 is a block diagram illustrating functional systems of a representative power machine on which embodiments of the present disclosure can be advantageously practiced.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings unless identified as such.

Additionally, the use of "lateral" and "longitudinal" and variations thereof herein are utilized to describe aspects that are relative to axes that are defined by a power machine. For example, a power machine can define a longitudinal axis that extends from the front of the power machine to the back of the power machine, and a lateral axis that extends from the left side of the power machine to the right side of the power machine, perpendicular to the longitudinal axis. Aspects of a power machine can be described relative to these axes for purposes of directionality, including for components or reference frames that extend longitudinally (i.e., extending at least partly from front to back or back to front of a power machine) or that extend laterally (i.e., extending at least partly from left to right or right to left of a power machine). Also, as used herein, unless otherwise defined or limited, the terms "inboard" and "outboard" refer to a relative relationship (e.g., a lateral distance) between one or more objects or structures and a centerline of the power machine, along a lateral side of the power machine. For example, a first structure that is inboard of a second structure is positioned laterally inward from the second structure so that a distance between the first structure and the centerline of the power machine is less than a distance between the second structure and the centerline of the power machine. Conversely, a first structure that is outboard of second structure is positioned laterally outward from the second structure so that a distance between the first structure and the centerline of the power machine is greater than a distance between the second structure and the centerline of the power machine.

Further, the terms "approximately" an "about," as applied to one or more reference values, refers to a value that fall within 25% or less (e.g., within 20%, 15%, 10%, 5%, or 1%) in either direction (i.e., greater than or less than) of the stated reference value and inclusive of the endpoints of the range, unless otherwise limited or defined specifically with reference to a particular value. Similarly, the term "substantially equal" (and the like) as used herein with respect to a reference value refers to variations from the reference value of less than ±30% (e.g., ±20%, ±10%, ±5%) inclusive. Where specified, "substantially" can indicate in particular a variation in one numerical direction relative to a reference value. For example, "substantially less" than a reference value (and the like) indicates a value that is reduced from the reference value by 30% or more, and "substantially more" than a reference value (and the like) indicates a value that is increased from the reference value by 30% or more. "Substantially zero" or equivalent phrases indicate a quantity that is within 3% of zero, relative to a maximum operational value of the quantity. For example, substantially zero forward movement indicates forward movement that is at 3% or less (e.g., 0.6%, 0.3%, etc.) of a maximum operational forward speed. "Substantially all" as used herein with respect to a reference value refers to variations from the reference value of less than ±10% (e.g., ±5%, ±2.5%, ±1%).

Further, unless otherwise limited or defined, "substantially parallel" indicates a direction that is within ±4 degrees of a reference direction (e.g., within ±2 degrees), inclusive. For a path that is not linear, the path can be considered to be substantially parallel to a reference direction if a straight line between end-points of the path is substantially parallel to the reference direction or a mean derivative of the path within a common reference frame as the reference direction is substantially parallel to the reference direction.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

As noted above and further discussed below, some embodiments may be particularly suitable for implementation on a mini-loader. As used herein, "mini-loader" refers to a power machine that is smaller than traditional compact construction equipment. A specific form of mini-loader includes an operator station that is located at or near a rear portion of the loader and that can be accessed from the rear of the loader. More specifically, mini-loaders often do not have cabs or operator compartments where an operator can sit while operating the loader.

Figure 2:
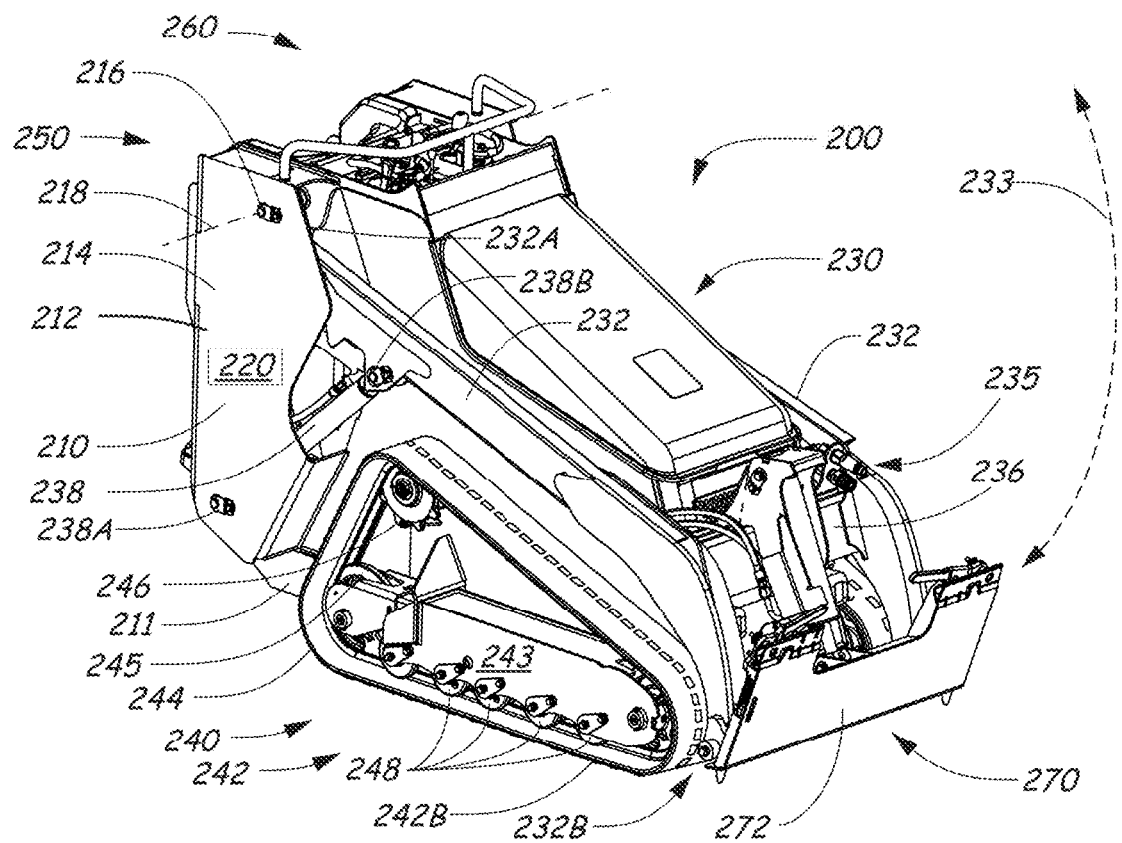
FIGS. 2-3 illustrate perspective views of a representative power machine in the form of a skid-steer loader of the type on which the disclosed embodiments can be practiced.
Figure 3:
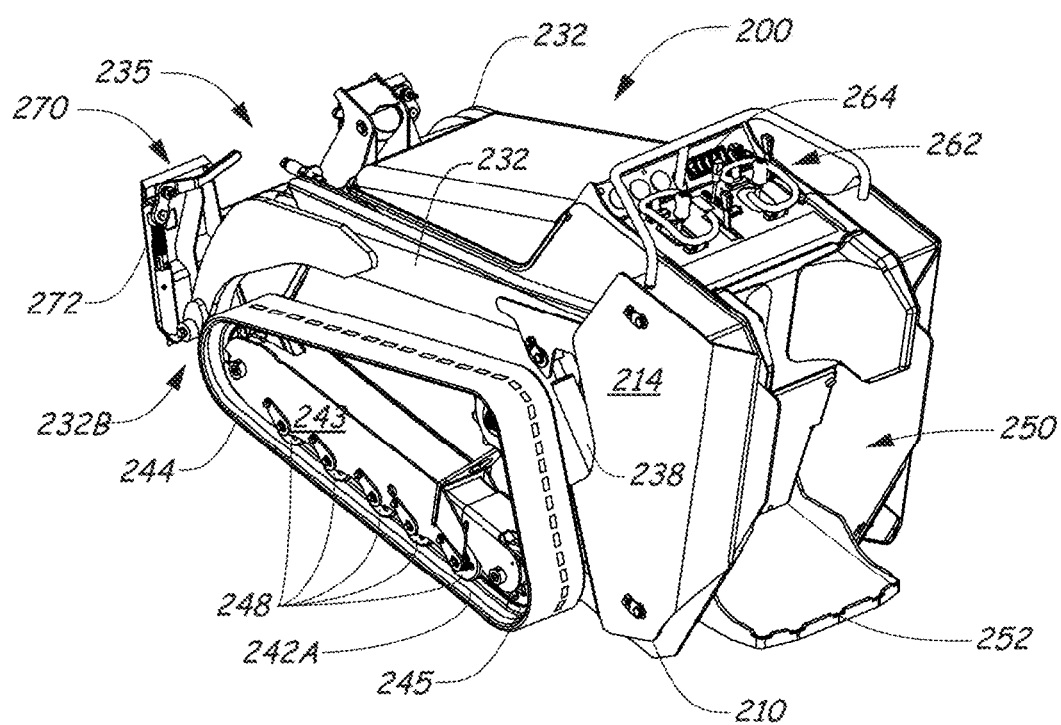

The concepts described herein can be practiced on various power machines. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can potentially be practiced on any of a number of power machines, possibly including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

FIG. 1 is a block diagram that illustrates the basic systems of a power machine 100, which represents any of a number of different types of power machines upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement to perform the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of different implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources alone or in combination with an internal combustion engine. The electrical source can be used to selectively power some or all of the work elements of the power machine and can typically be charged, as necessary, by the internal combustion engine. Such power machines are generally referred to as hybrid vehicles.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work elements in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether they have operator compartments or operator positions or not, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both the power machine and any implement to which is it coupled) that can control at least some of the operator-controlled functions on the power machine.

FIGS. 2-3 illustrates a loader 200, which is one particular example of a power machine of the type illustrated in FIG. 1 where the embodiments discussed below can be advantageously employed. Loader 200 is a tracked loader and more particularly, a mini-loader. Consistent with the definition, a mini-loader for the purposes of this discussion is a small loader relative to other compact loaders such as traditional skid-steer loaders and compact track loaders. The embodiment shown in FIGS. 2-3 is a mini-loader without an operator cab that can be operated from an operator station at the back of the loader. Some mini-loaders have a platform on which an operator can ride on. Other mini-loaders can be operated by an operator who walks behind the loader. Still other mini-loaders have a platform that is moveable or removable to allow an operator to alternatively ride on the platform or walk behind the loader. The loader 200 is a tracked loader, in some embodiments these types of mini-loaders can be wheeled loaders as well.

Loader 200 is one particular example of the power machine 100 illustrated broadly in FIG. 1 and discussed above. To that end, features of loader 200 described below include reference numbers that are generally similar to those used in FIG. 1. For example, loader 200 is described below as having a frame 210, just as power machine 100 has a frame 110. Track loader 200 is described herein to provide a reference for understanding one environment on which the embodiments described below related to operator controls may be practiced. The loader 200 should not be considered limiting especially as to features that loader 200 may have described herein that are not essential to the disclosed embodiments. Such features may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, mowers, and dozers, to name but a few examples.

As mentioned above, loader 200 includes frame 210. Frame 210 supports a power system 220, the power system being configured to generate or otherwise provide power for operating various functions on the power machine. Frame 210 also supports a work element in the form of a lift arm structure 230 that is selectively powered by the power system 220 in response to signals from an operator control system 260 and can perform various work tasks. As loader 200 is a work vehicle, frame 210 also supports a traction system 240, which is also selectively powered by power system 220 in response to signals from operator control system 260. The traction system 240 is configured to propel the power machine over a support surface. The lift arm structure 230 in turn supports an implement carrier 272, which is configured to receive and secure various implements to the loader 200 for performing various work tasks. The loader 200 can be operated from an operator station 250 from which an operator can manipulate various control devices to cause the power machine to perform various functions, discussed in more detail below. Frame 210 also supports a work element in the form of a lift arm structure 230 that is powered by the power system 220 and can perform various work tasks.

Various power machines that can include and/or interact with the structures and/or functions of embodiments discussed below can have various frame components that support various work elements. The elements of frame 210 discussed herein are provided for illustrative purposes and are not necessarily the only type of frame that a power machine on which the embodiments discussed below can be practiced can be employed, unless otherwise specifically indicated. Frame 210 of loader 200 includes an undercarriage or lower portion 211 of the frame and a mainframe or upper portion 212 of the frame that is supported by the undercarriage 211. The mainframe 212 of loader 200 is attached to the undercarriage 211 such as with fasteners or by welding the undercarriage 211 to the mainframe 212. Mainframe 212 includes a pair of upright portions 214 located on either side and toward the rear of the mainframe 212 that support a lift arm structure 230 and to which the lift arm structure 230 is pivotally attached. The lift arm structure 230 is illustratively pinned to each of the upright portions 214. The combination of mounting features on the upright portions 214 and the lift arm structure 230 and mounting hardware (including pins used to pin the lift arm structure 230 to the mainframe 212) are collectively referred to as joints 216 (one is located on each of the upright portions 214) for the purposes of this discussion. Joints 216 are aligned along an axis 218 so that the lift arm structure 230 is capable of pivoting, as discussed below, with respect to the frame 210 about axis 218. Other power machines may not include upright portions on either side of the frame or may not have a lift arm structure that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements 242 on either side of the loader 200, which on loader 200 are track assemblies.

The lift arm structure 230 shown in FIGS. 2-3 is one example of a lift arm structure that can be attached to a power machine such as loader 200 or other power machines on which embodiments of the present discussion can be practiced. The lift arm structure 230 has a pair of lift arms 232 that are disposed on opposing sides of the frame 210. A first end 232A of each of the lift arms 232 is pivotally coupled to the power machine at joints 216 and a second end 232B of each of the lift arms is positioned forward of the frame 210 when in a lowered position as shown in FIG. 2. The lift arm structure 230 is moveable (i.e. the lift arm structure 230 can be raised and lowered) under control of the loader 200 with respect to the frame 210. That movement (i.e. the raising and lowering of the lift arm structure 230) is described by a radial travel path, shown generally by arrow 233. For the purposes of this discussion, the travel path 233 of the lift arm structure 230 is defined by the path of movement of the second end 232B of the lift arm structure. Embodiments discussed below will include a vertical path lift arm, which is the type of lift arm where the second end of the lift arm moves in a substantially vertical direction for at least a portion of the travel path.

The lift arms 232 are each coupled to a cross member 236 that provides increased structural stability to the lift arm structure 230. A pair of actuators 238, which on loader 200 are hydraulic cylinders configured to selectively receive pressurized fluid from power system 220 (shown conceptually as a box in FIG. 2 to represent that it is enclosed within the frame 210), are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm structure 230 to pivot about joints 216 and thereby be raised and lowered along a fixed path illustrated by arrow 233. The lift arm structure 230 shown in FIGS. 2 and 3 is representative of one type of lift arm structure that may be coupled to the power machine 200. Other lift arm structures, with different geometries, components, and arrangements can be pivotally coupled to the loader 200 or other power machines upon which the embodiments discussed herein can be practiced without departing from the scope of the present discussion. For example, other machines can have lift arm structures with lift arms that each has two portions (as opposed to the single piece lift arms 232) that are pivotally coupled to each other along with a control arm to create a four-bar linkage and a substantially vertical travel path or at least more vertical than the radial path of lift arm structure 230. Other lift arm structures can have an extendable or telescoping lift arm. Still other lift arm structures can have several (i.e. more than two) portions segments or portions. Some lift arms, most notably lift arms on excavators but also possible on loaders, may have portions that are controllable to pivot with respect to another segment instead of moving in concert (i.e. along a pre-determined path) as is the case in the lift arm structure 230 shown in FIGS. 2-3. Some power machines have lift arm structures with a single lift arm, such as is known in excavators or even some loaders and other power machines. Other power machines can have a plurality of lift arm structures, each being independent of the other(s).

An exemplary implement interface 270 is provided at a second end 234B of the arm 234. The implement interface 270 includes an implement carrier 272 that is configured to accept and secure a variety of different implements to the lift arm 230. Such implements have a machine interface that is configured to be engaged with the implement carrier 272. The implement carrier 272 is pivotally mounted to the second end 232B of each of the arms 232. An implement carrier actuator 237 is operably coupled the lift arm structure 230 and the implement carrier 272 and are operable to rotate the implement carrier with respect to the lift arm structure. Other examples of power machines can have a plurality of implement carrier actuators. Still other examples of power machines of the type that can advantageously employ the disclosed embodiments discussed herein may not have an implement carrier such as implement carrier 272, but instead may allow only for implements to be directly attached to its lift arm structure such as by pinning.

The implement interface 270 also includes an implement power source 235 available for connection to an implement on the lift arm structure 230. The implement power source 235 includes pressurized hydraulic fluid ports to which an implement can be coupled. The pressurized hydraulic fluid port selectively provides pressurized hydraulic fluid for powering one or more functions or actuators on an implement. The implement power source can, but need not, include an electrical power source for powering electrical actuators and/or an electronic controller on an implement. The electrical power source can also include electrical conduits that are in communication with a data bus on the loader 200 to allow communication between a controller on an implement and electronic devices on the loader 200. It should be noted that the specific implement power source on loader 200 does not include an electrical power source.

The lower portion 211 of the frame supports and has attached to it a pair of tractive elements, identified in FIGS. 2-3 as left track assembly 242A and right track assembly 242B (collectively tractive elements 242). Each of the tractive elements 242 has a track frame 243 that is coupled to the frame 210. The track frame 243 supports and is surrounded by an endless track 244, which rotates under power to propel the loader 200 over a support surface. Various elements are coupled to or otherwise supported by the track frame 243 for engaging and supporting the endless track 244 and cause it to rotate about the track frame. For example, a sprocket 246 is supported by the track frame 243 and engages the endless track 244 to cause the endless track to rotate about the track frame. An idler 245 is held against the track 244 by a tensioner (not shown) to maintain proper tension on the track. The track frame 243 also supports a plurality of rollers 248, which engage the track and, through the track, the support surface to support and distribute the weight of the loader 200.

An operator station 250 is positioned toward the rear of the frame 210 and is configured to be used by an operator who is behind or on the rear of the frame. A platform 252 is provided for the operator to stand. While standing on the platform 252, and operator has access to a plurality of operator control inputs 262 that, when manipulated by the operator, can provide control signals to control work functions of the power machine 200, including, for example, the traction system 240 and the lift arm 230. Operator control inputs 262 can include joysticks with adjacent reference bars of the type discussed below.

Display devices 264 are provided in the operator station to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be designed to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided.

Figure 4:
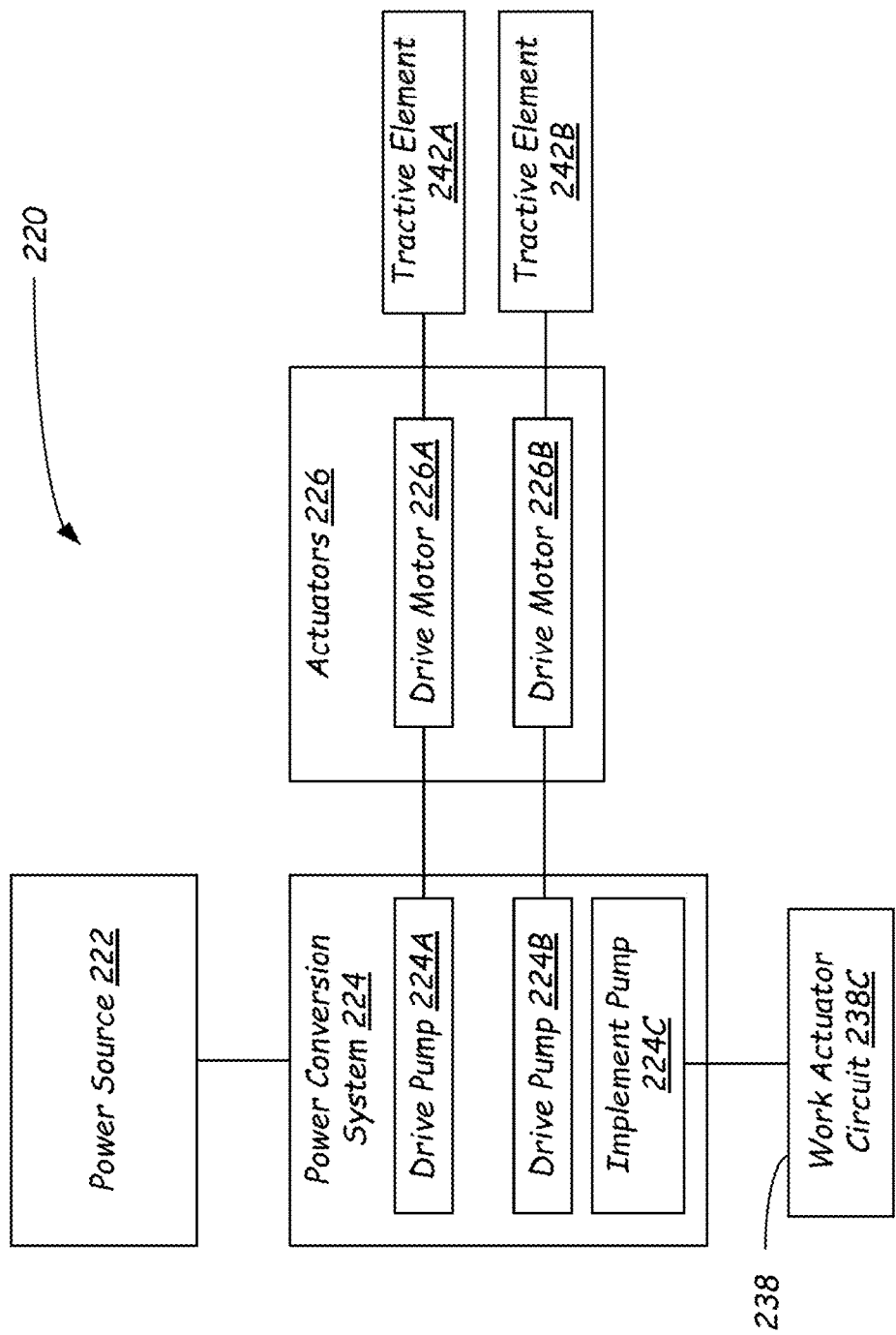
FIG. 4 is a block diagram illustrating components of a power system of a loader such as the loader illustrated in FIGS. 2-3.

As mentioned above, frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that are configured to generate and/or store power for use on various machine functions. On power machine 200, the power source 222 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine. Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably to tractive elements 242A-B, respectively. The drive pumps 224A and 224B can be mechanically, hydraulic, and/or electrically coupled to operator input devices to receive actuation signals for controlling the drive pumps.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238 includes lift cylinders 238 and tilt cylinders 235 as well as control logic to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement. The control logic of power machine 200 includes an open center, 3-spool valve in a series arrangement. The spools are arranged to give priority to the lift cylinders, then the tilt cylinders, and then pressurized fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as loader 200, unless otherwise noted or recited, the concepts discussed below are not intended to be limited in their application to the environments specifically described above.

Figure 5:
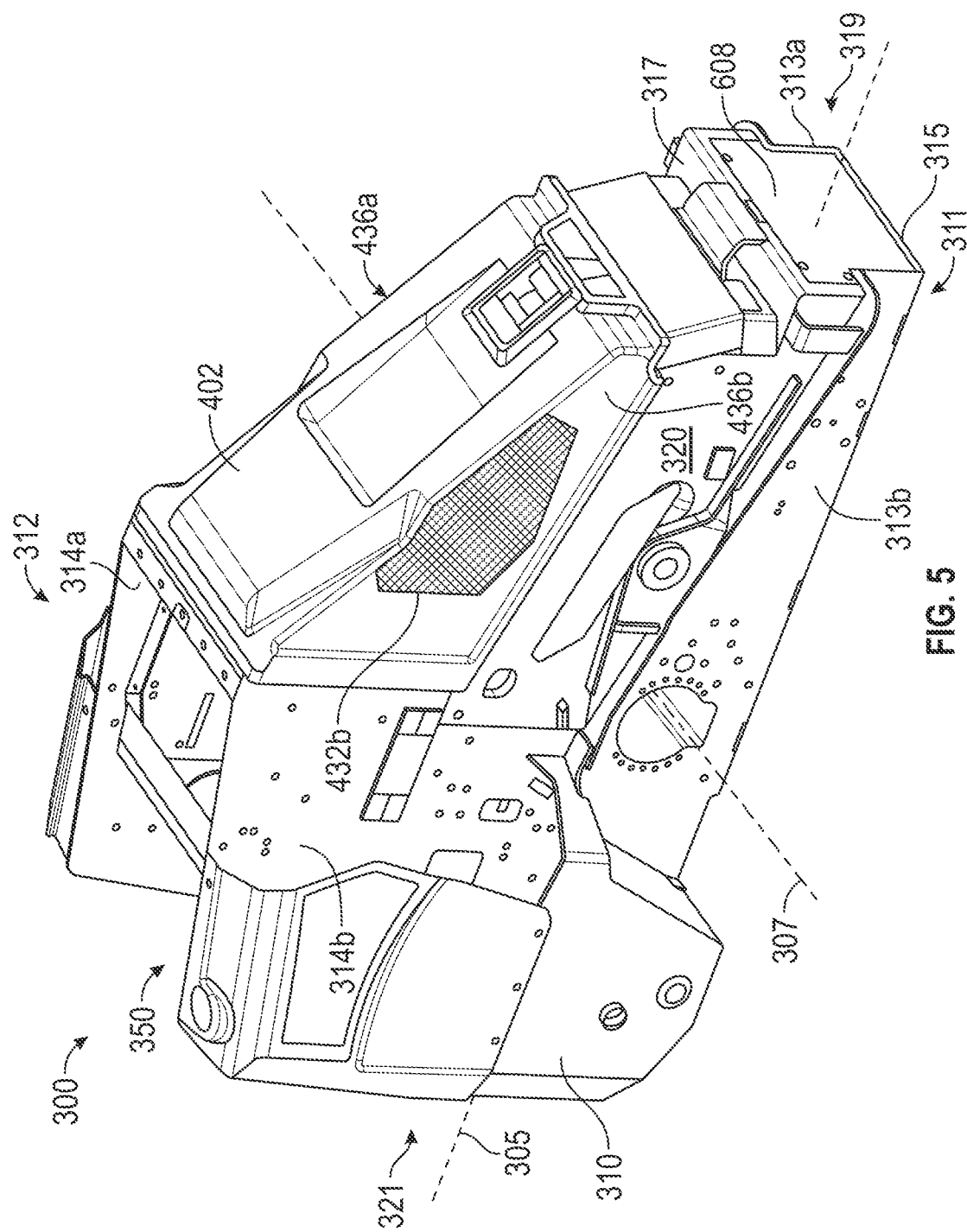
FIG. 5 illustrates a front-right perspective view of a main frame and other components of a representative power machine, in the form of a mini-loader, of the type on which the disclosed embodiments can be practiced.

FIG. 5 illustrates a loader 300 configured as a tracked mini-loader. Loader 300 is another particular example of the power machines 100, 200 illustrated broadly in FIGS. 1-3 and discussed above. To that end, features of loader 300 described below include reference numbers that are generally similar to those used in FIG. 1. For example, loader 300 is described below as having a frame 310, just as power machines 100, 200 have frames 110, 210. The loader 300 defines a longitudinal axis 305 (e.g., a roll axis) and a lateral axis 307 (e.g., a pitch axis). It is to be understood that the following figures may depict partial assemblies, or subassemblies, of the loader 300 with various components not shown to provide clarity to particular aspects. For example, loader 300 in FIG. 5 is illustrated without track assemblies, however it is to be understood that track assemblies can also be included on loader 300 (see, e.g., FIG. 15).

The loader 300 includes a frame 310 that components and assemblies may be mounted to and/or supported by. For example, tractive elements, work elements, power system 320 (indicated conceptually in FIG. 5, since the power system is not visible), operator station 350, and operator control system 360 (see FIG. 23) can be mounted to or supported by (or defined by) the frame 310. The frame 310 includes a lower portion 311 and an upper portion 312 supported by the lower portion 311. The lower portion 311 can include a pair of side frame members 313, including a first side frame member 313a and a second side frame member 313b laterally opposite the first side frame member 313a. The first and second side frame members 313a, 313b generally extend along the longitudinal axis 305 of the loader 300.

The lower portion 311 of the frame 310 can also include a bottom frame member 315 and a cross member 317. The bottom frame member 315 spans laterally between the first and second side frame members 313a, 313b along an underside of the loader 300 and is coupled to the pair of side frame members 313. The cross member 317 also spans laterally between the first and second side frame members 313a, 313b of the loader 300 and is coupled to the pair of side frame members 313. In the illustrated example, the cross member 317 is coupled between the pair of side frame members 313 at a front end 319 of the loader 300 and extends in a direction generally parallel to the lateral axis 307.

The upper portion 312 of the frame includes a pair of upright portions 314a, 314b. The upright portions 314 can include one or more additional upright panels to form a panel assembly. In some examples, the upright portions 314 can be formed of a single unitary panel member. The upright portions 314 can extend generally along the longitudinal axis 305 of the loader 300 to define the operator station 350 at the back end 321 of the loader 300.

Figure 6:
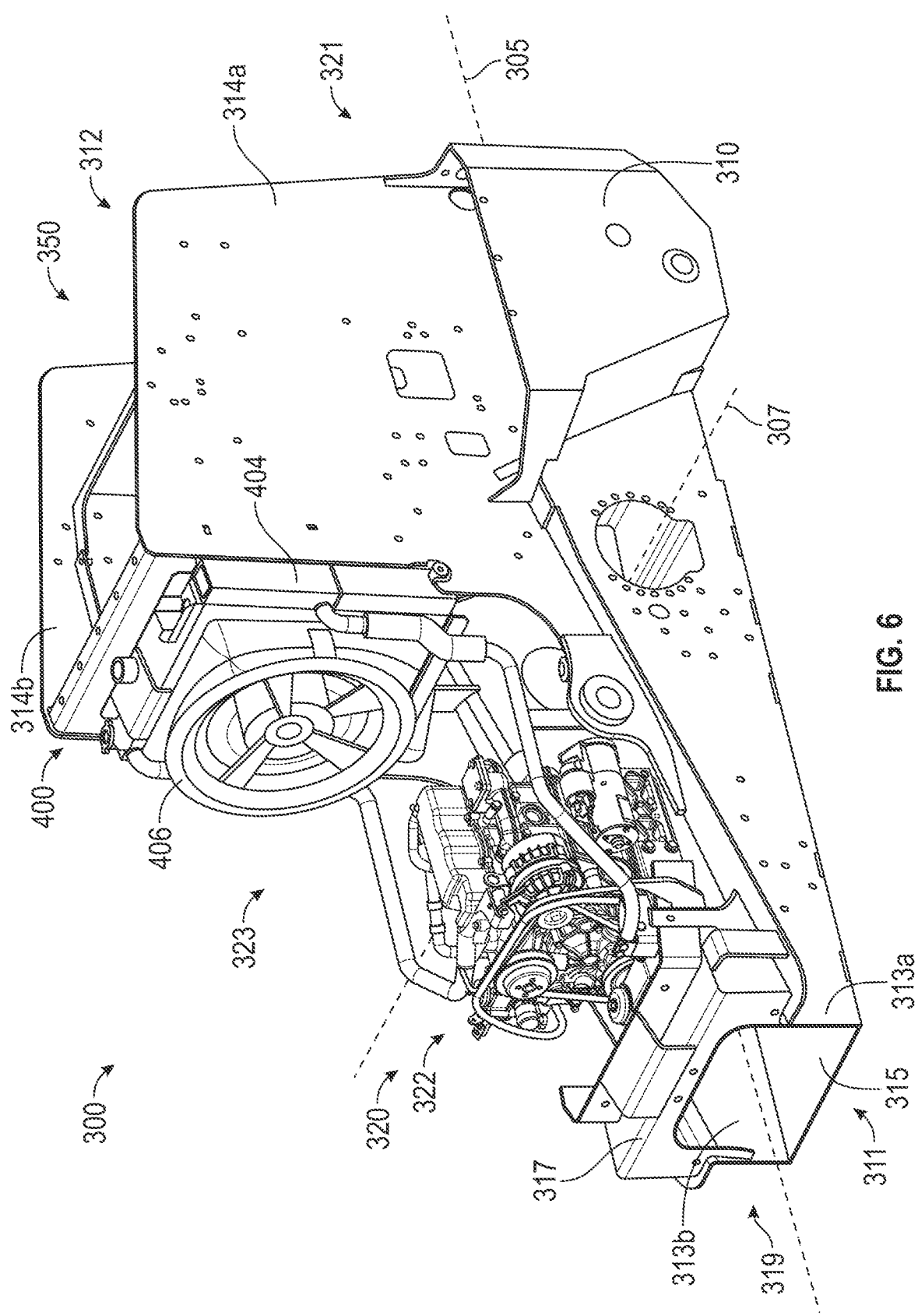
FIG. 6 illustrates a front-left perspective view of the power machine of FIG. 5, with certain components reviewed to illustrate internal structures.
Figure 9:
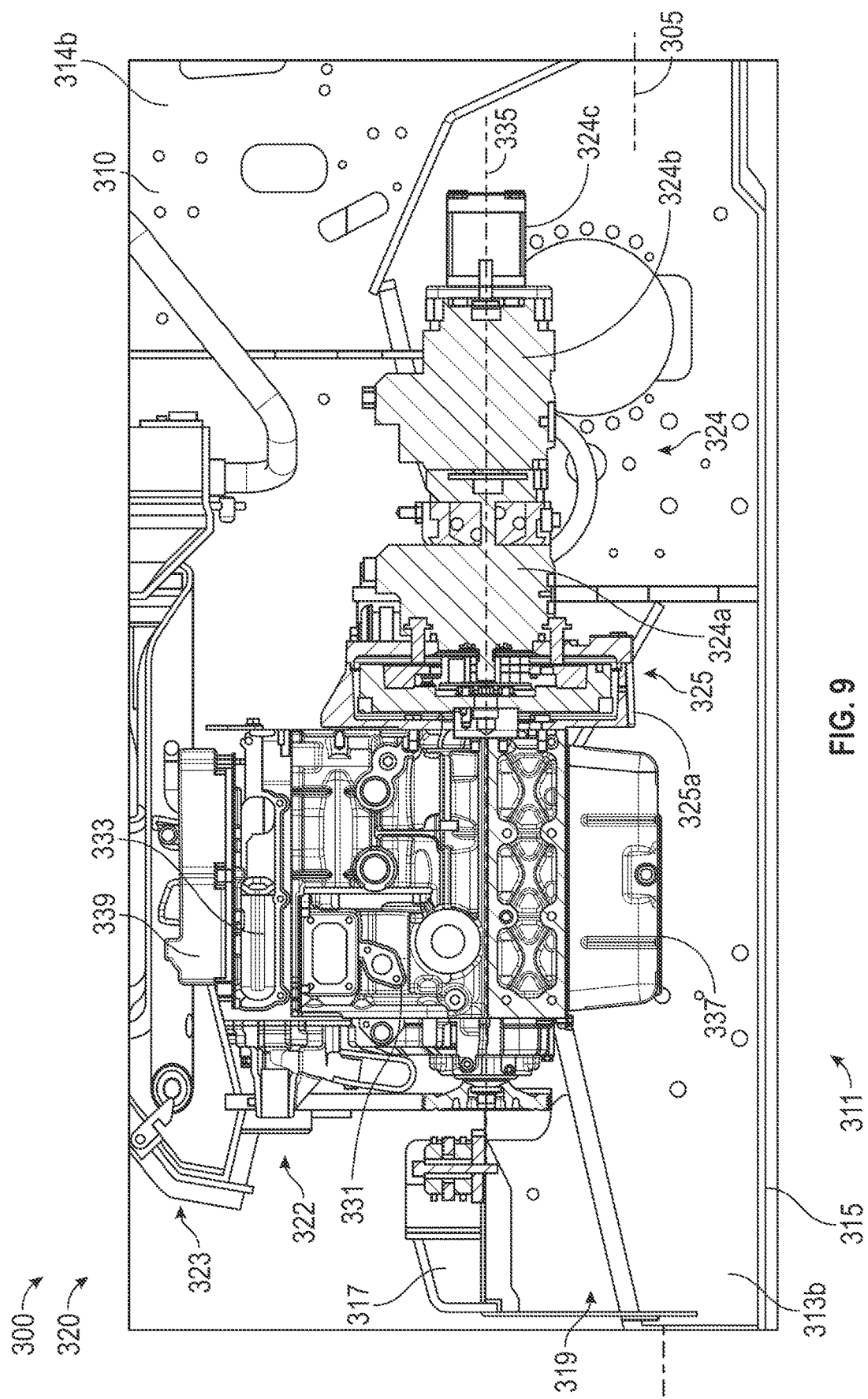
FIG. 9 illustrates a cross-sectional partial view of the power machine of FIG. 5, illustrating a power system including a power source and power conversion system mounted to the frame of the power machine.
Figure 10A:
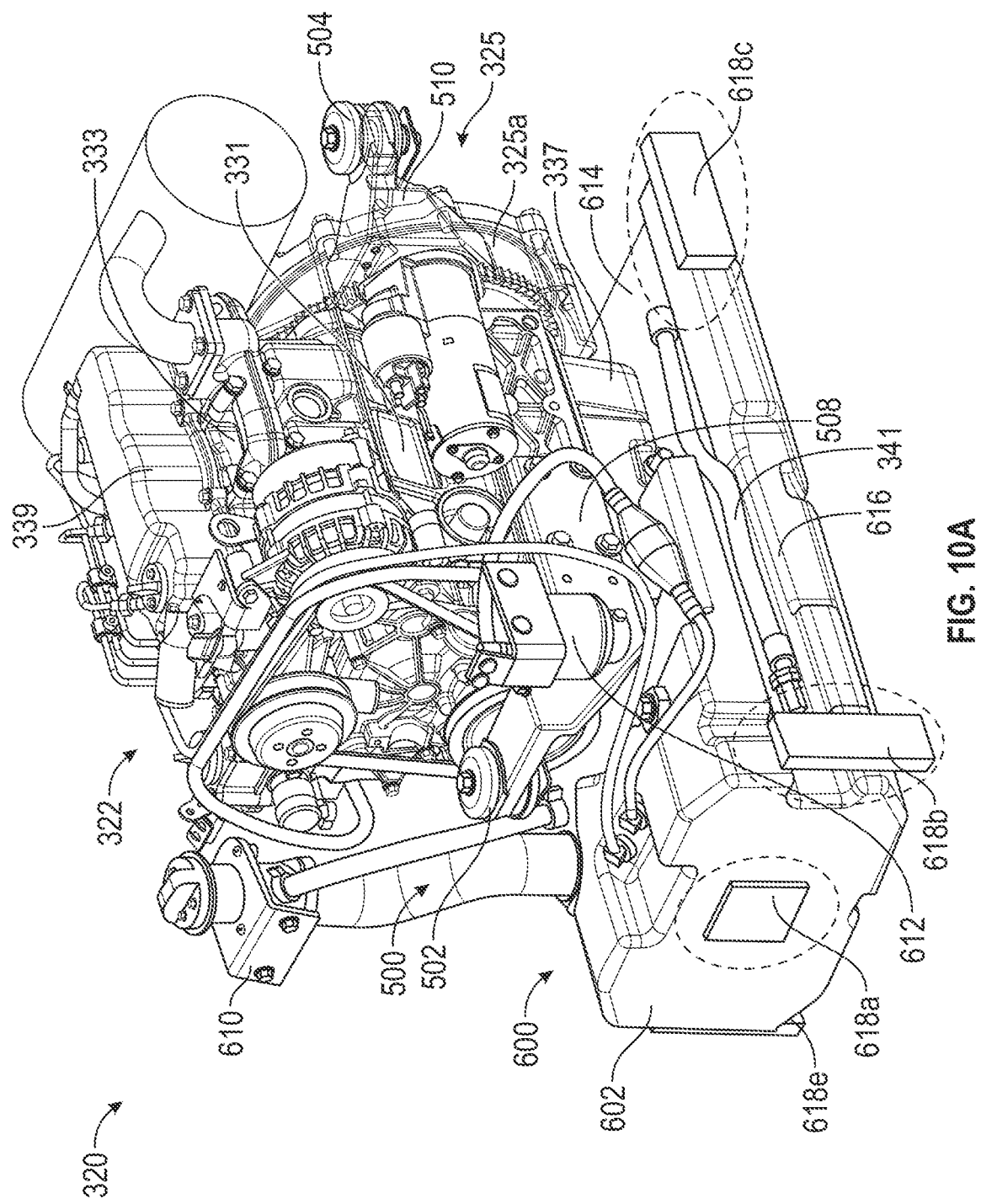
FIG. 10A illustrates a perspective view of the power source and fuel system of the power machine of FIG. 5.
Figure 10B:
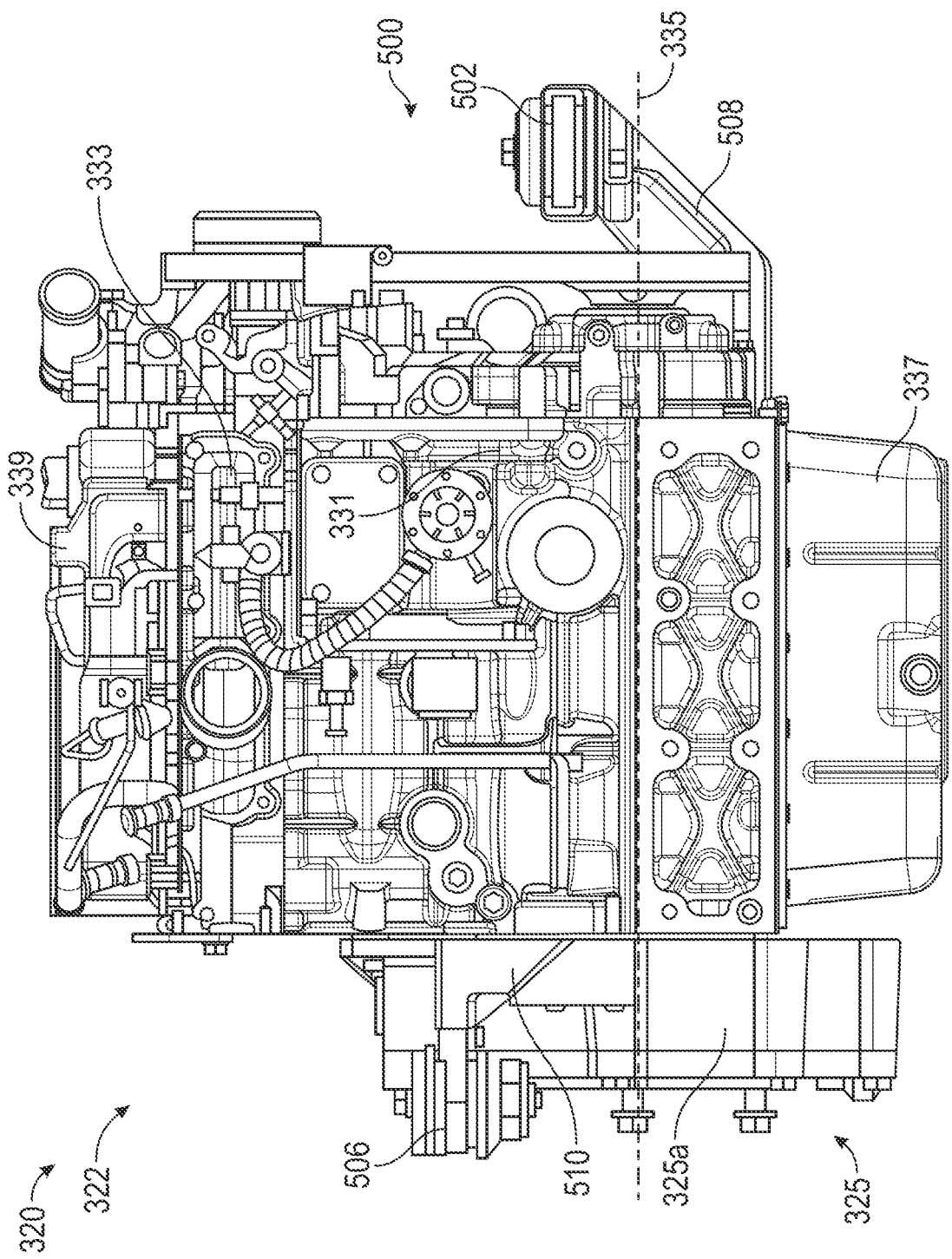
FIG. 10B illustrates a right side view of the power source of FIG. 10A.
Figure 10C:
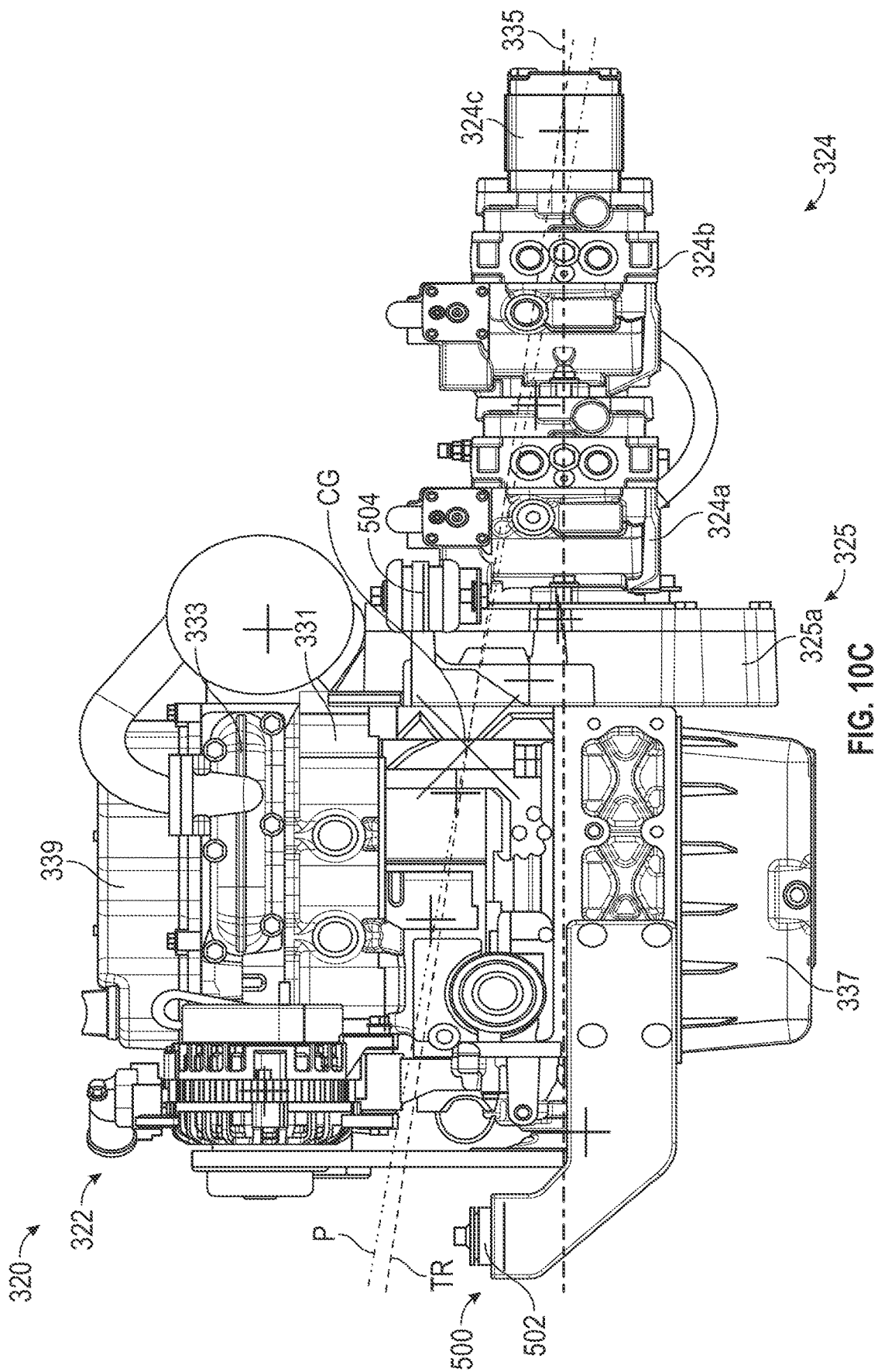
FIG. 10C illustrates a left side view of the power system of FIG. 9 illustrating a center of gravity ("CG"), a torque-roll axis, and a CG axis.
Figure 11:
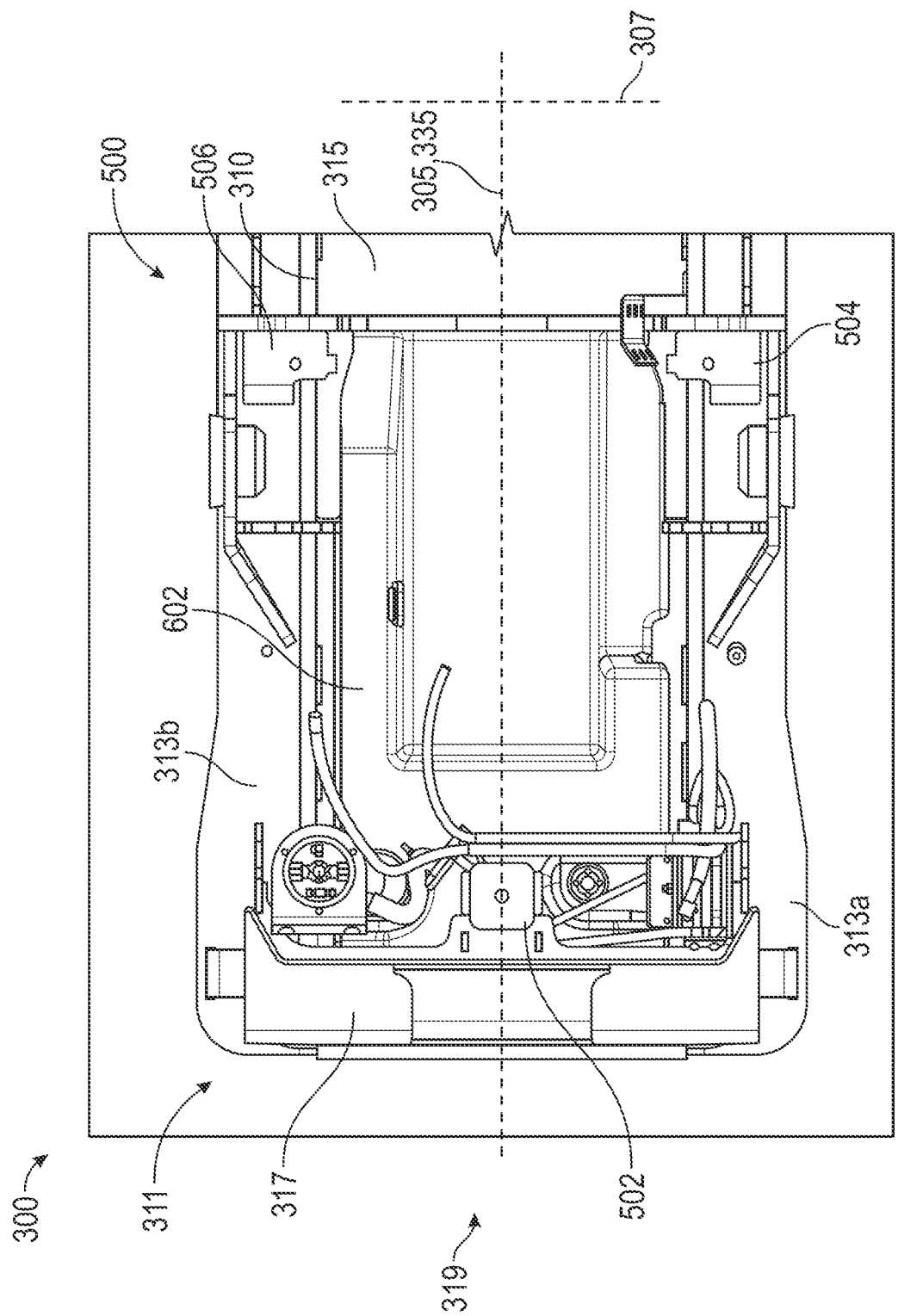
FIG. 11 illustrates a top view of a horizontal cross-section of the power machine of FIG. 5 taken through a horizontal plane vertically offset from a longitudinal axis.

Referring to FIGS. 5 and 6, the upper portion 312 and the lower portion 311 together define an enclosure 323 for supporting and at least partly enclosing the power system 320 and a cooling system 400, along with other components/assemblies including a power conversion system and fuel tank (see, e.g., FIGS. 9-11. (FIG. 6 illustrates the loader 300 with certain side portions of the frame 310 removed for clarity.) The enclosure 323 can be accessed through a hood 402 pivotally coupled to the frame 310 (see FIG. 5). In the illustrated embodiment, the hood 402 can pivot upwardly and rearwardly to open, about a horizontal axis at a top of the frame 310. In other embodiments, however, other movements to open a cover may be possible.

As shown in FIG. 6, in particular, in the illustrated example, the power system 320 includes a power source 322 arranged adjacent to the front end 319 of the frame 310, opposite the operator station 350, which is arranged at the back end 321 of the frame 310. Further, the cooling system 400 can be arranged longitudinally between the power source 322 and the operator station 350. More specifically, the cooling system 400 can be arranged forward of the operator control system 360 (e.g., forward of an operator control panel and the operator station 350).

In the illustrated example, the cooling system 400 can include at least one heat exchanger 404 and a fan 406. The heat exchanger 404 can be supported by the frame 310 and can be in fluid communication with the power source so that the heat exchanger 404 can cool fluid passing through both the power system 320 and the heat exchanger, and thereby help to maintain appropriate operating temperatures for the power system 320. For example, the heat exchanger 404 can be configured to be in fluid communication with one or both of the power source 322 and the power conversion system 324 (see FIG. 9). In the illustrated example, the heat exchanger is supported by the upright portions 314a, 314b of the frame 310, at a forward end of the upright portions 314a, 314b. The hood 402 is configured to cover the power source 322 and at least one side of the heat exchanger 404 (e.g., all of a forward portion of the heat exchanger 404). In the illustrated example, the hood 402 encloses the fan-mount side of the heat exchanger 404 (e.g., the forward side, as shown) so that the fan 406 of the heat exchanger 404 is covered by and operates to move air within the hood 402. In other embodiments, however, a fan can be differently arranged relative to a hood or other relevant components of a power machine.

Figure 7:
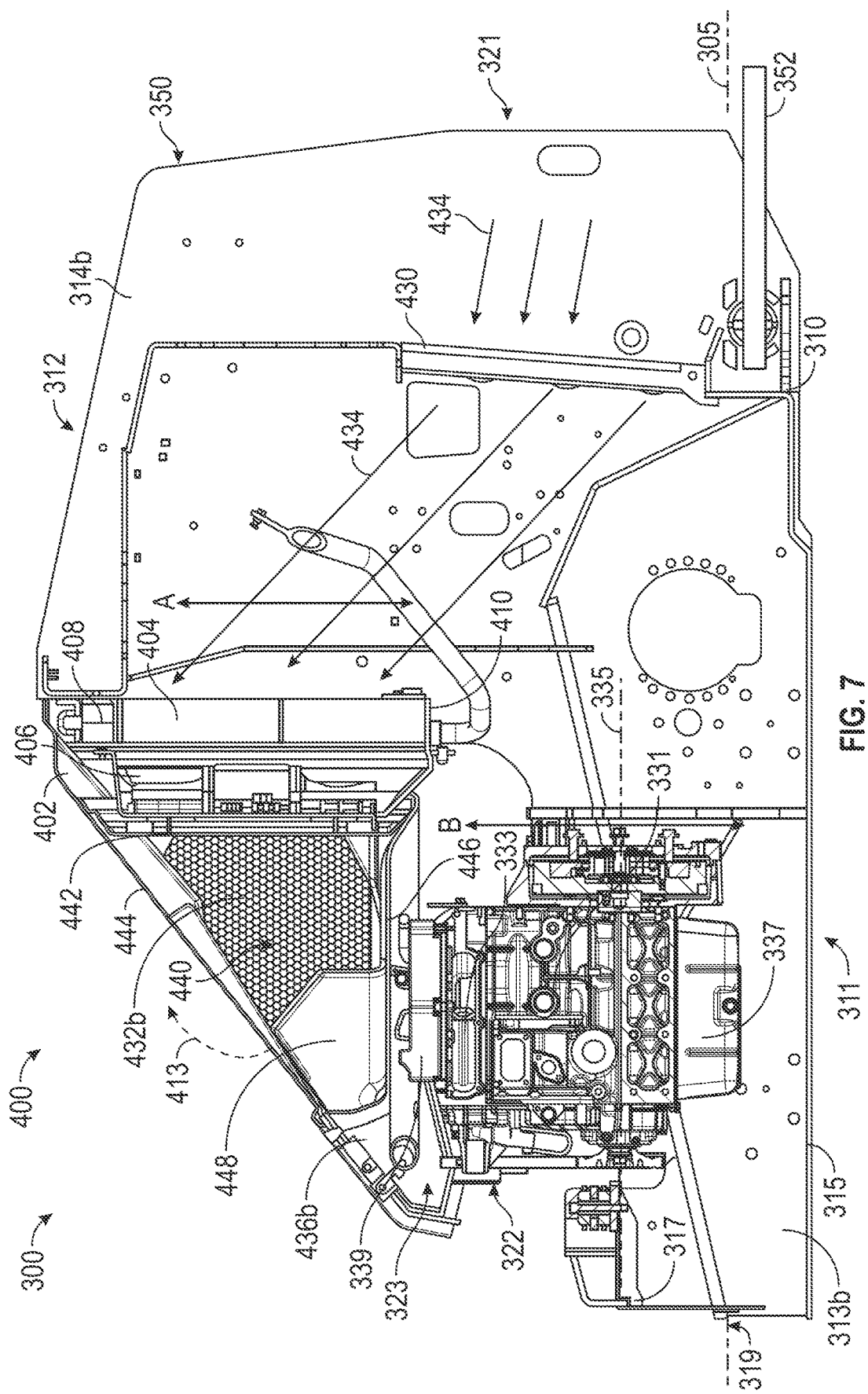
FIG. 7 illustrates a cross-section of the power machine of FIG. 5 taken through a vertical plane passing through the center line of the power machine.
Figure 8:
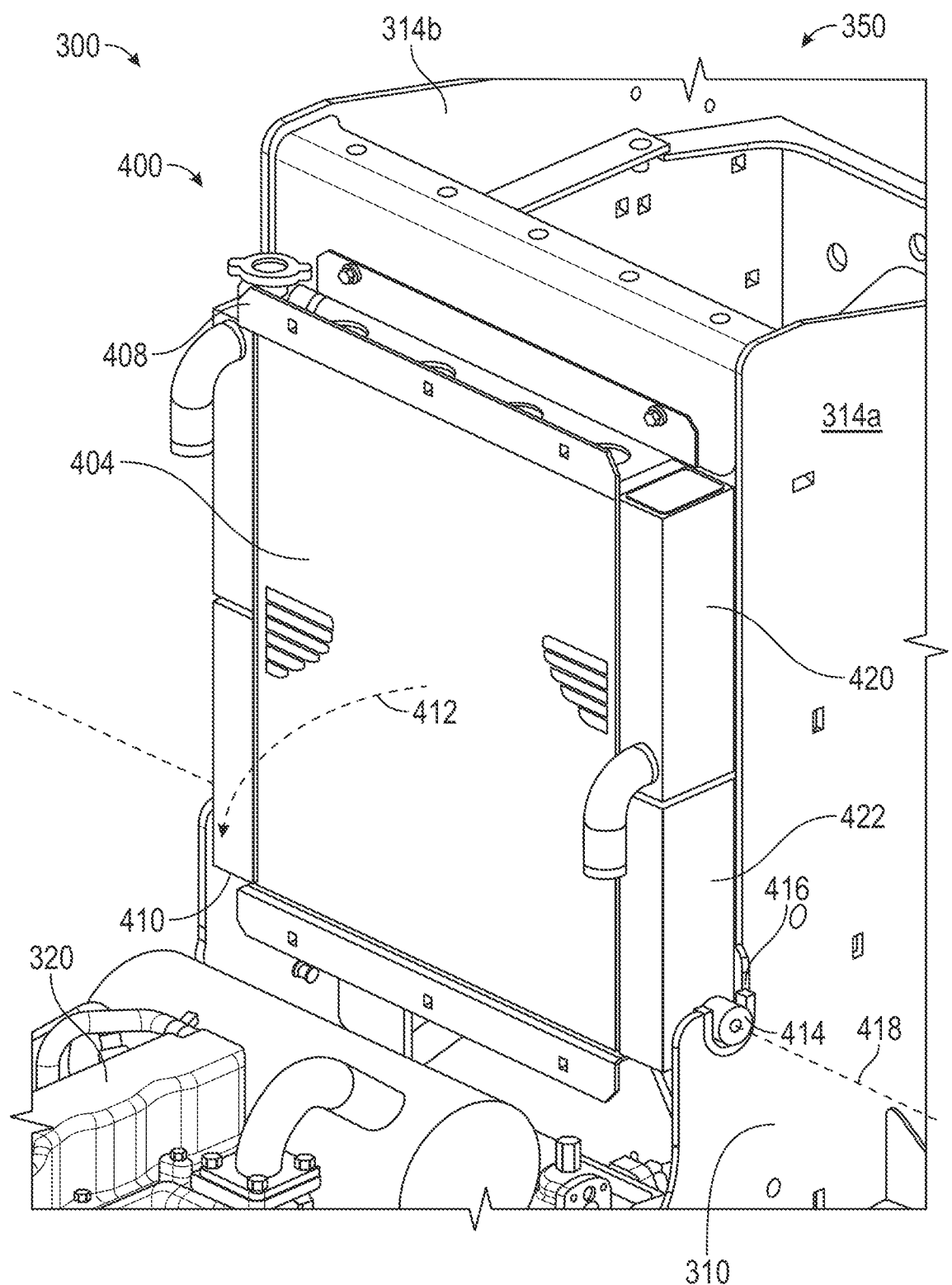
FIG. 8 illustrates a perspective view of a heat exchanger mounted to a frame of the power machine of FIG. 5.

Referring now to FIGS. 7 and 8, the heat exchanger 404 can be oriented vertically in some embodiments (e.g., orthogonal to the longitudinal axis 305 and parallel to the lateral axis 307 (see FIG. 6)). Further, in the illustrated example, the heat exchanger 404 is generally positioned vertically above the power source 322. For example, FIG. 7 illustrates a power source 322 configured as an internal combustion engine. Internal combustion engines generally include two major assemblies, as shown in FIG. 7 as an engine block 331 and a cylinder head 333 coupled to the engine block 331. The engine block 331 includes a crankshaft, which defines a crankshaft axis 335 about which the crankshaft rotates. The internal combustion engine can also include a sump 337 (e.g., an oil pan) coupled to a bottom side of the engine block 331 and a valve cover 339 (e.g., a rocker cover) coupled to a top side of the cylinder head 333.

In the illustrated example, the heat exchanger 404 is arranged such that at least a portion of the heat exchanger is located vertically above the crankshaft axis 335. More specifically, the heat exchanger 404 in the embodiment shown in FIG. 7 is arranged vertically and fully above the engine block 331. Further, in the illustrated example, the heat exchanger 404 is arranged vertically above the cylinder head 333.

In this regard, as shown in FIG. 7, the heat exchanger 404 can define a vertical height A between top end 408 and a bottom end 410 of the heat exchanger 404. Similarly, the power source 322 can define a vertical height B, for example, between a bottom of the sump 337 and a top of the valve cover 339 for the illustrated configuration as an internal combustion engine. Generally, a substantial portion (i.e., 50% of more) of the height A can be above the height B, to provide improved packaging, heat management, and other benefits. According to some examples, the heat exchanger 404 can be arranged within the frame 310 such that no more than 40% of the height A of the heat exchanger 404 overlaps with a vertical height B of the power source 322. That is, the amount of vertical overlap between the heat exchanger 404 and the power source 322 can be no more than 40% of the height A of the heat exchanger 404. According to some examples, the amount of vertical overlap between the heat exchanger 404 and the power source 322 can be no more than 25% of the height A of the heat exchanger 404. According to some examples, the amount of vertical overlap between the heat exchanger 404 and the power source 322 can be no more than 15% of the height A of the heat exchanger 404 (e.g., 10% or less).

The heat exchanger 404 is pivotally coupled to the frame 310 at the bottom end 410 of the heat exchanger 404 and is configured to pivot forwardly and downwardly relative to the operator station 350 in a first direction (as indicated by arrow 412, FIG. 8). The hood 402 can be pivotally coupled to the frame 310 adjacent to the operator station 350 forward of the operator control system 360 and be configured to pivot rearwardly and upwardly towards the operator station 350 in a second direction (as indicated by arrow 413). The hood 402 can be pivoted between an open position, in which access is provided to the enclosure 323, and a closed position, in which the hood 402 (along with the frame 310) fully encloses the cooling system 400 and the power source 322 within the enclosure 323. According to the illustrated example, the second direction of the pivoting hood 402 is opposite the first direction of the pivoting heat exchanger 404. This can allow for increased serviceability of the heat exchanger 404, as well as improved access to the area behind the heat exchanger 404 under the operator control system 360. In other embodiments, however, other arrangements are possible.

In different embodiments, a heat exchanger can be arranged to pivot using different mechanical arrangements. For example, as shown in FIG. 8 in particular, the heat exchanger 404 can include protrusions 414 extending laterally outward from opposing left and right sides of the heat exchanger 404. The protrusions 414 can be received within corresponding cutouts 416 within the pair of upright portions 314a, 314b. The cutouts 416 in the upright portions 314 can thus receive the protrusions 414 to define a heat exchanger pivot axis 418 about which the heat exchanger 404 can pivot from a first, vertical operational orientation (as shown) towards a second, forwardly pivoted service orientation (see arrow 412). In the illustrated example, the heat exchanger 404 can be coupled to the frame 310 forward of the operator control system 360 via one or more fasteners. In other embodiments, however, clasps, catches, detents, or other known devices can be similarly employed.

According to some examples, the loader 300 can include one or more hydraulic pumps operatively coupled to the power source 322. For example, a power conversion system 324 can be operative coupled to the power source 322 (see, e.g., FIG. 9) to provide hydraulic power to various work elements of the power machine 300. In this case, and others with similar arrangements, the heat exchanger 404 can include at least two heat exchangers including a radiator 420 and an oil cooler 422. The radiator 420 is configured to receive coolant or water from the power source and the oil cooler 422 is configured to receive hydraulic fluid from the one or more hydraulic pumps within the power conversion system 324. In the illustrated example, the radiator 420 is coupled to the oil cooler 422. The radiator 420 and the oil cooler 422 can be arranged in the same vertical plane in some cases. For example, in the illustrated example, the radiator 420 and the oil cooler 422 both extend along (and in parallel with) a vertical plane that is orthogonal to the longitudinal axis 305 and parallel to the lateral axis 307 (see, e.g., FIG. 1). In the illustrated example, the radiator 420 is positioned vertically above the oil cooler 422, although other arrangements are possible. Positioning the radiator 420 vertically above the oil cooler 422 can aid in clearing trapped air from within the cooling system and provide improved access to the radiator 420.

In some embodiments, a radiator that is substantially vertically arranged (i.e., extends within 25 degrees of vertical) or that is arranged behind a power source and in front of an operator station (or other reference point) can provide notable benefits. Referring back to FIG. 7, for example, the loader 300 can further include an air inlet 430 arranged towards the rear end 321 of the frame 310 and at least one air outlet 432 arranged on the hood 402. The fan 406 is configured to draw air through an airflow path defined by the air inlet 430, the heat exchanger 404, and the air outlet 432 (as well as intervening ducting, baffles, etc., as appropriate). In the illustrated example, the airflow path is illustrated by arrows 434, which originate in the ambient environment at the rear of the power machine 300, and extend past (e.g., through) the operator station 350 before entering the heat exchanger 404.

In some cases, the illustrated airflow path, as provided by the arrangement of the cooling system of the loader 300, as generally described above, can help to prevent the operator station 350, and the operator control system 360 therein, from heating excessively. For example, the illustrated arrangements can prevent hot air that is exhausted through the heat exchanger 404 from passing across (e.g., through) the operator station 350 or panels, cavities, or other spaces near the operator control system 360. Rather, in the illustrated example, cool ambient air is drawn in from the operator station 350 and exhausted forward of the operator station 350 and then out through the lateral sides of the hood 402 via the air outlet 432. Thus, hot air is directed from the heat exchanger 404 away from the operator station 350 and (relatively) cooler air is directed across the operator station 350 to the heat exchanger 404.

Generally, it may thus be useful to arrange a cooling system so that an air inlet and an operator station are located on an opposing side of a heat exchanger from a power source. In particular, it may be useful to arrange an air inlet so that air flow upstream of the heat exchanger passes through an operator station or across an operator control system, and air flow downstream of the heat exchanger is directed away from the operator station or the operator control system. In the illustrated example, the air inlet 430 is positioned vertically below the operator control system 360. More specifically, the air inlet 430 is positioned vertically between the operator control system 360 and an operator platform 352. Accordingly, air flow to the air inlet 430 may generally pass across the top of the operator platform 352, through the operator station 350, and air flow from the air inlet 430 may pass the operator control system 360 before reaching the heat exchanger 404. Continuing, the hood 402 can include a first lateral sidewall 436a and an opposing second lateral sidewall 436b (see also, FIG. 5). The air outlet 432 can be arranged on at least one of the first or second lateral sidewalls 436a, 436b, so that airflow from the heat exchanger 404 is directed laterally outward, forward of the operator station 350. In the illustrated embodiment, a first air outlet (not shown) can be arranged on the first lateral sidewall 436a and a second air outlet 432b can be arranged on the second lateral sidewall 436b, so that air heated by the heat exchanger 404 can be directed to both lateral sides of the power machine 300 to disperse into the ambient environment. Although the illustrated arrangement may be particularly beneficial, an air inlet or an air outlet can be differently positioned in other embodiments, including for power machines that include operator control systems but not operator stations.

In the illustrated example, the hood 402 can define a hood enclosure 440 configured to isolate the hot air exhausted from the heat exchanger 404 from the power source 322. In particular, the hood enclosure 440 is defined by an open back side 442, a top wall 444, a bottom wall 446, and the first and second lateral sidewalls 436a, 436b. The hood 402 can receive hot air from the heat exchanger 404 into the hood enclosure 440 through the open back side 442. The internal structure of the hood 402 (e.g., one or more ducts, baffles, open spaces, etc.) can then provide fluid communication from the back side 442, through the hood enclosure 440, to the lateral sides of the loader 300, so that hot air can be vented through the air outlets 432a, 432b. Further, in the illustrated example, the bottom wall 446 is arranged between the top wall 444 and the top side of the power source 322 (e.g., fully above the valve cover 339). Thus, the hood enclosure 440 provided by the hood 402 can help to prevent hot air from the heat exchanger 404 from entering the enclosure 323 that contains the power source 322 and can thereby increase the cooling efficiency of the power source 322.

According to the illustrated example, the hood 402 further includes a vertical center baffle 448 (e.g., a center wall) configured to separate the air flow from the heat exchanger 404 and guide heated air out each of the first and second air outlets 432a, 432b. The center baffle 448 extends at least partially between a front side of the hood enclosure 440 towards the open back side 442. According to some examples, the center baffle fully extends between the front end and the open back side 442 (e.g., such that FIG. 7 exhibits a cutaway view of the baffle 448 to reveal the air outlet 432b).

According to some examples, the fan 406 can be a variable speed fan, which can be controlled between a minimum fan speed (e.g., zero RPM) and a maximum fan speed. In some cases, the fan 406 can be controlled to an infinite number (or effectively continuous range) of speeds between minimum and maximum fan speeds. According to some examples, the fan 406 can also be a reversible fan such that, if desired, ambient air can be drawn in through the air outlets 432a, 432b and warm air can be exhausted across the operator control system 360 and towards the operator station 350. This can be beneficial, for example, in cold weather climates where the heat energy from the heat exchanger 404 can be reutilized and redirected to warm the operator station 350 (or the operator control system 360). In some cases, the operator control system 360 can include control mechanisms, such as HVAC/climate control functions, and an operator can engage the climate control functions to engage the fan 406 and cause the fan 406 to spin in reverse. According to some examples, ducting can be provided between the heat exchanger 404 and the operator station 350 to direct warm air towards an operator's hands, feet, or torso or to otherwise direct warmed (or cooler) air to particular areas or equipment. For example, one or more climate control vents can be located adjacent to or on the operator control system 360, the operator platform 352, or anywhere therebetween.

Referring now to FIG. 9, the power conversion system 324 of the loader 300 can extend longitudinally rearward of the power source 322. In the illustrated example, the power conversion system 324 is configured as a hydraulic pump unit, with one or more hydraulic pumps operatively coupled to the power source 322. In particular, the one or more hydraulic pumps extend in an axial direction rearward from the power source towards the rear of the frame 310 (e.g., towards the operator station 350). In different embodiments, different numbers or types of pumps can be used. In the illustrated example, the power conversion system 324 includes two hydrostatic drive pumps 324a, 324b, which are selectively controllable to provide a power signal to corresponding drive motors, which in turn are each operably to tractive elements (see, e.g., FIG. 4). The power conversion system 324 also includes a hydraulic implement pump 324c, which is also operably coupled to the power source 322 and can be operably coupled to a work actuator circuit (see, e.g., FIG. 4) to power a workgroup or other non-tractive work element.

In the illustrated example, the power conversion system 324 is supported by the power source 322 in a cantilever arrangement. That is, the power conversion system 324 is solely supported by the power source 322 at only one end of the power conversion system 324. For example, a coupling 325 can be arranged between the power source 322 and the power conversion system 324. The coupling 325 can include, for example, a viscous coupling or a flywheel encased in a housing 325a. The housing 325a can be coupled to the power source 322 and the power conversion system 324, for example, by one or more appropriate fasteners. In the illustrated example, the power conversion system 324 includes no supporting structure at the free end (e.g., no tailstock support adjacent the implement pump 324c).

The power conversion system 324, in the example of FIG. 9, is arranged in-line and operative coupled to the crankshaft of the power source 322. For example, each of the first drive pump 324a, second drive pump 324b, and implement pump 324c are axially aligned along a common rotational axis. In the illustrated embodiment, the common rotational axis is axially aligned with the crankshaft axis 335. This axial alignment of the power conversion system in a cantilever arrangement can provide an improved weight distribution of the loader 300. For example, the illustrated arrangement can generally improve weight distribution along the longitudinal direction as compared to conventional machines, including as may optimally balance weight distribution for digging and for skid turns.

In the illustrated example, the drive pumps 324a, 324b and the implement pump 324c are driven in series. For example, the first drive pump 324a is operatively coupled to the crankshaft of the power source 222, the second drive pump 324b is operatively coupled to a central shaft of the first drive pump 324a, and the implement pump 324c is operatively coupled to a central shaft of the second drive pump 324b. According to some example, the central shafts of each of the drive pumps 324a, 324b and the implement pump 324c can include a spline interface to allow for the transfer of rotational movement therebetween. In other embodiments, however, other arrangements are possible, including parallel-drive (e.g., chain or belt driven) arrangements.

Referring now to FIGS. 10A-11, an engine mount assembly 500 is illustrated. The engine mount assembly 500 is configured to support the power source 322 by each of the first side frame member 313a, second side frame member 313b, and cross member 317 of the frame 310. In the illustrated example, the power source 322 is arranged rearward of the cross member 317 (see also, FIG. 9) and fully between the side frame members 313a, 313b. In particular, the engine mount assembly 500 includes a first engine mount 502 (e.g., a forward engine mount), and a second engine mount 504 and third engine mount 506 (e.g., lateral side engine mounts). The first engine mount 502 is coupled between a front side of the power source 322 (e.g., an accessory drive side opposite the power conversion system 324) and the cross member 317. The second engine mount 504 is coupled between the power source 322 and the first side frame member 313a, and the third engine mount 504 is coupled between the power source 322 and the laterally opposing second side frame member 313b.

In the illustrated example, the engine mount assembly 500 can further include additional brackets or other supporting members between the power source 322 and the engine mounts 502, 504, 506. For example, a block bracket 508 can be coupled between the power source 322 and the first engine mount 502. In the illustrated example, the block bracket 508 is coupled to a lateral side of the engine block 331 via one or more fasteners. The block bracket 508 extends forward from the engine block 331 to meet the first engine mount 502. The block bracket 508 is configured to locate the first engine mount 502 such that the first engine mount 502 is laterally aligned with the crankshaft axis 335. That is, the first engine mount 502 is positioned in a vertical plane passing through the crankshaft axis 335 and orthogonal to the lateral axis 307 (see FIG. 1). According to some examples, the first engine mount 502 can be laterally offset from the crankshaft axis 335.

The engine mount assembly 500 can also include housing brackets 510 coupled between the housing 325a and each of the second engine mount 504 and the third engine mount 506 (bracket for third engine mount 506 not shown). In the illustrated example, the housing bracket 510 is integrally formed into the housing 325a. The housing brackets 510 are configured to position the second and third mounts 504, 506 along a lateral axis that is parallel to the lateral axis 307 of the loader 300 and perpendicular to the crankshaft axis 335. As best illustrated in FIG. 10B, the first engine mount 502 can be vertically offset from the crankshaft axis 335 by a first distance (e.g., a first height above the crankshaft axis 335) and the second and third engine mounts 504, 506 can be vertically offset from the crankshaft axis 335 by a second distance (e.g., a second height above the crankshaft axis 335). In the illustrated example, the first height is less than the second height. However, according to some examples, each of the engine mounts 502, 504, 506 can lie in the same horizontal plane (e.g., a plane vertically offset from the longitudinal axis 305 of the loader 300). Similarly, some embodiments can include different combinations of one or more of the engine mounts above the remaining engine mounts 502, 504, 506, different combinations of one or more of the engine mounts 502, 504, 506 aligned or not aligned in a common horizontal plane, or one or more of the engine mounts aligned with the crankshaft axis 335.

According to the illustrated example, the triangular arrangement of the first, second, and third engine mounts 502, 504, 506 can beneficially support the cantilevered power conversion system 324 (see, e.g., FIG. 9). Further, as best illustrated in FIG. 10C, the engine mount arrangement positions the second and third engine mounts 504, 506 near the CG, the principle axis P, and the torque roll axis TR defined by the power system 320. That is, the cumulative power system 320, including the power source 322 and the power conversion system 324, can together define a CG, along with principle P and torque roll TR axes. This can allow for a high isolation efficiency provided by the engine mount assembly 500. In some examples, the isolation efficiency can be greater than 90%, including when the power source 322 is at a high idle. In other examples, the isolation efficiency can be greater than 95%.

Figure 12:
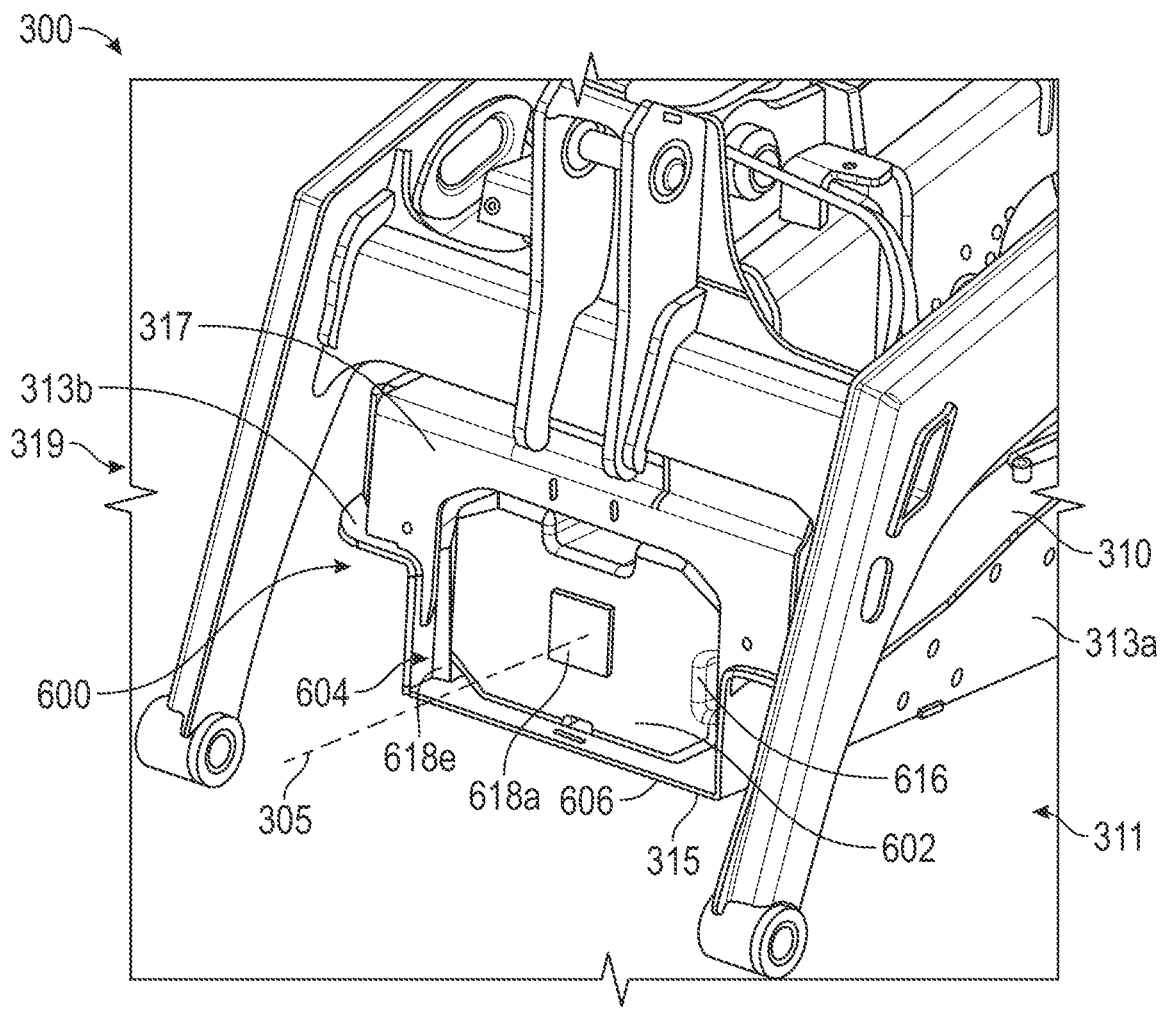
FIG. 12 illustrates a perspective view of the front end of the power machine of FIG. 5 with an access panel removed illustrating a removable fuel tank.
Figure 13:
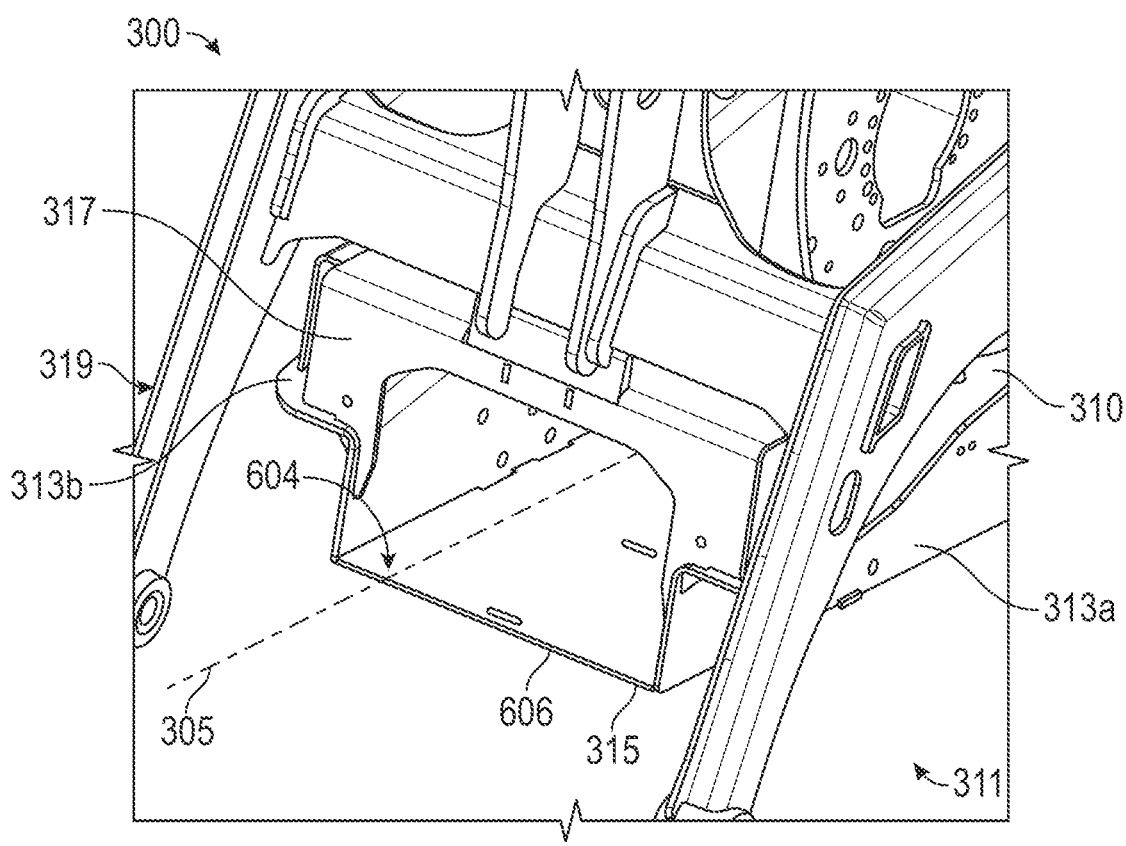
FIG. 13 illustrates a perspective view similar to FIG. 12 with the fuel tank removed.

Referring now to FIGS. 12 and 13, a fuel tank assembly 600 for the loader 300 is illustrated. The fuel tank assembly 600 can include a fuel tank 602 that is configured to be removable through the front end 319 of the loader 300. In the illustrated example, the loader 300 includes a receptacle 604 at least partly defined by the frame 310 between the first and second side frame members 313a, 313b. The fuel tank 602 is received within the receptacle 604 and is configured to provide fuel to the power source 322 (see FIG. 10A). According to some examples, the receptacle 604 can be a separate structure received within the frame 310. According to other examples, the receptacle 604 can be an enclosure between the side frame members 313a, 313b or other structures of the frame 310. In the illustrated example, the receptacle 604 also forms part of the enclosure 323 housing the power system 320 (see FIG. 7).

The fuel tank 602 is removable from the receptacle 604 through an opening 606 at the front end 319 of the frame 310. In the illustrated example, the fuel tank 602 is removed by axially moving the fuel tank forward through the opening 606 along (or parallel to) the longitudinal axis 305 of the loader 300. The opening 606, in this example, is defined by the first side frame member 313a, the second side frame member 313b, the cross member 317, and the bottom frame member 315 of the lower portion 311 of the frame 310. The opening 606 can be covered and uncovered by an access panel 608 (see FIG. 5) removably coupled to the frame 310 to provide serviceability to the fuel tank assembly 600.

Figure 14:
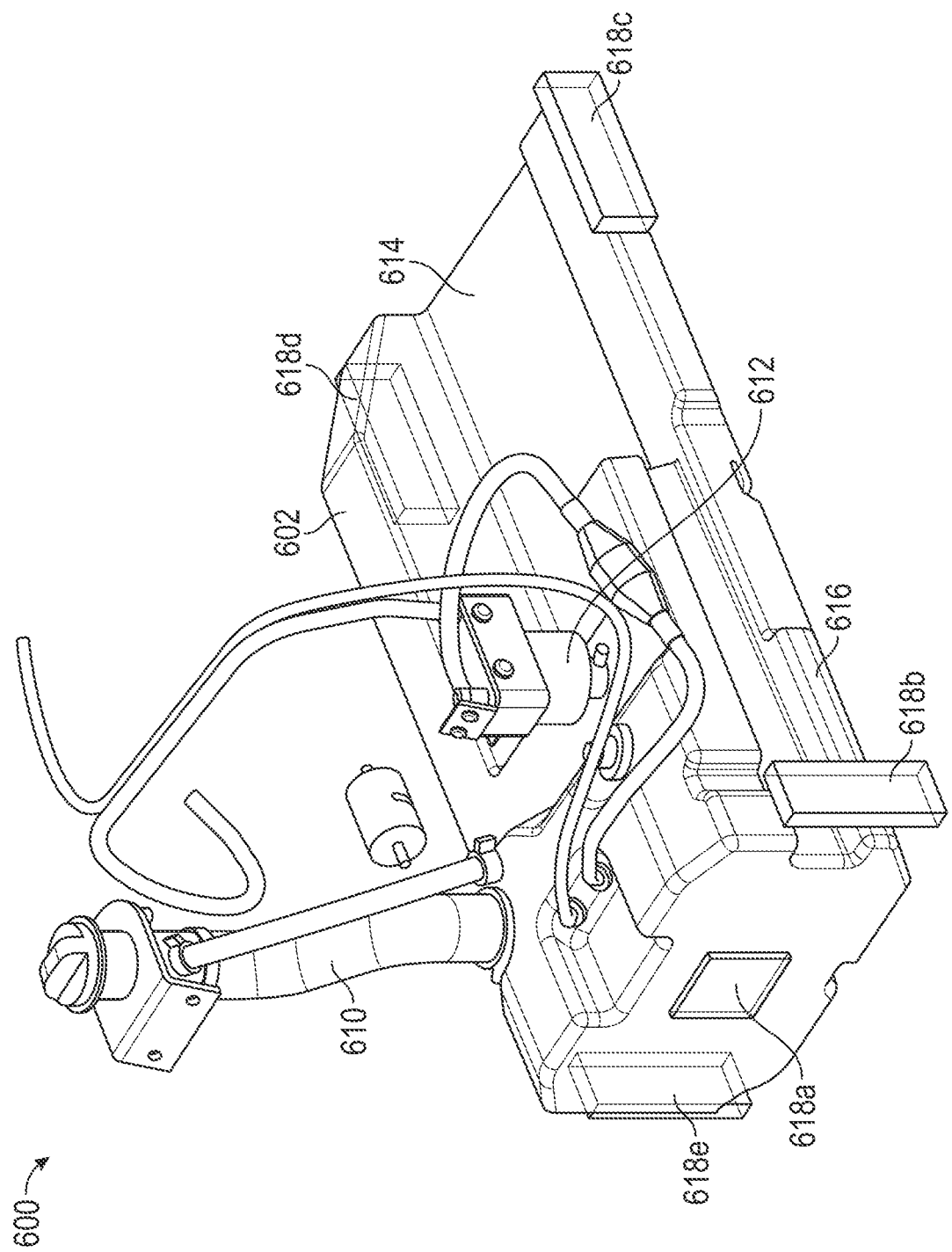
FIG. 14 illustrates a perspective view of a fuel tank assembly, including the fuel tank of FIG. 12.

Referring to FIG. 14 (and also FIG. 10A), the fuel tank assembly 600 can include a filler neck 610 and a fuel filter 612. The filler neck 610 is configured to provide fluid communication between a fill port and the fuel tank 602 for servicing operations. The fuel filter 612 is configured to filter fuel being delivered from the fuel tank 602 to the power source 322. The fuel tank 602 can include one or more inset portions integrally formed therein to provide spacing for components of the loader 300. For example, a top side of the fuel tank 602 can include a sump recess 614 configured to provide clearance for at least a portion of the fuel tank 602 to be positioned below the sump 337 of the power source 322. The fuel tank 602 can also include a side recess 616 protruding into the fuel tank 602 from a lateral side thereof to receive an oil drain line 341. The oil drain line 341 can be in fluid communication with the sump 337 of the power source 322 to allow oil to drain therefrom. The side recess 616 allows the oil drain line 341 to be accessed by removal of the access panel 608 to provide ease of serviceability to the oil system of the power source 322.

The fuel tank assembly 600 can also include one or more pads 618 arranged between the fuel tank 602 and the frame 310 of the loader 300. For example, the illustrated example includes a front pad 618a arranged between the access panel 608 (see FIG. 5) and the fuel tank 602, and pads 618b-618e arranged adjacent to the corners of the fuel tank 602. The pads 618 are generally configured to isolate the fuel tank 602 from the frame 310. According to some examples, the pads 618 are configured to provide an interference fit between the fuel tank 602 and the frame 310 for a more secure fit within the receptacle 604. According to some examples, the pads 618 can be coupled to the frame 310, for example, with an adhesive. According to other examples, the pads 618 can be coupled to the fuel tank 602. In the illustrated example, the pads 618 comprise a hard foam material. According to other examples, the pads 618 can be formed of a rubber, plastic, or other suitable isolation material.

Figure 15:
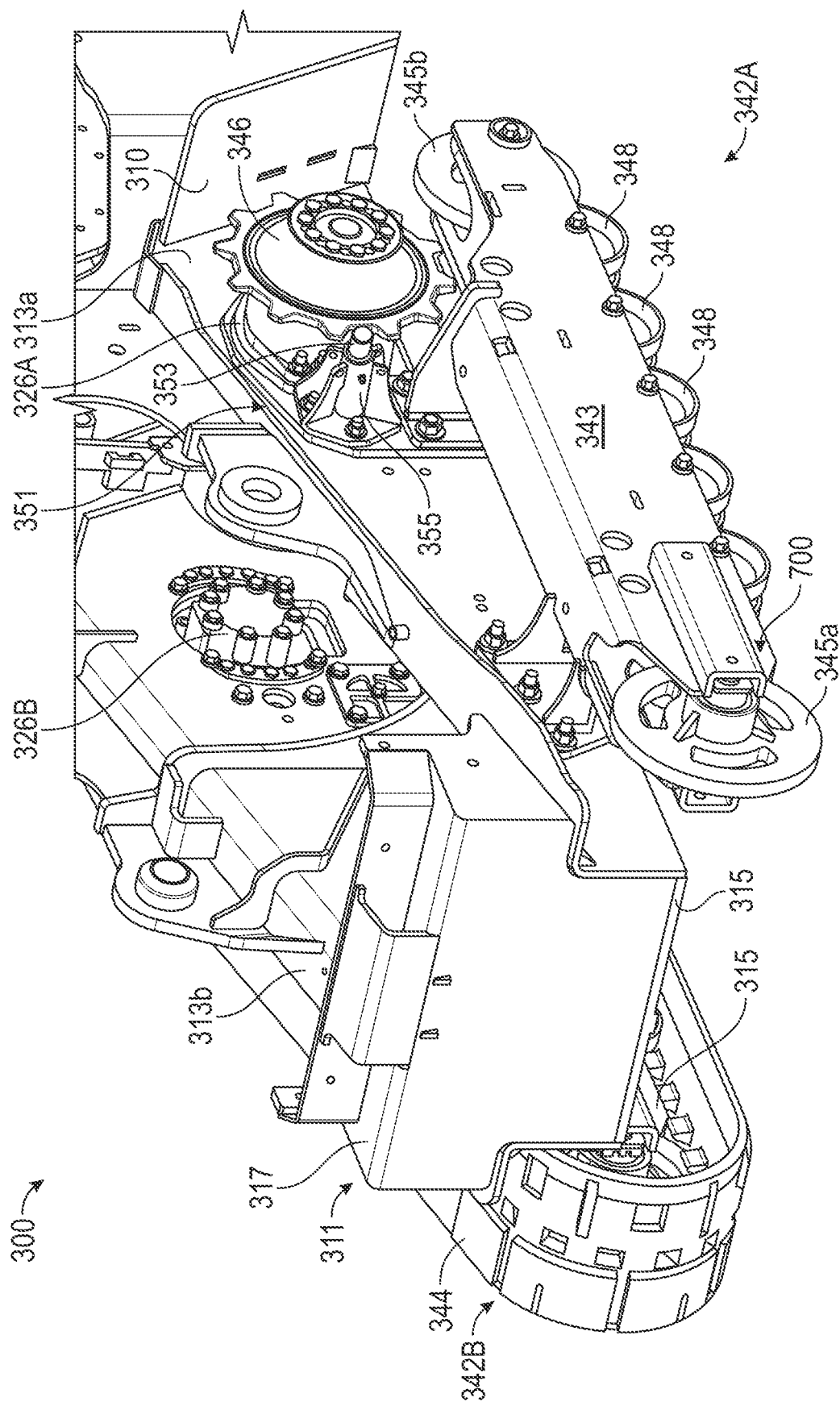
FIG. 15 illustrates a perspective view of a track assembly mounted to the frame of the power machine of FIG. 5, with an endless track of the track assembly removed.

Referring now to FIG. 15, the loader 300 includes a pair of tractive elements configured as left track assembly 342A (illustrated with the track removed for clarity) and right track assembly 342B (collectively tractive elements 342) supported by the lower portion 311 of the frame 310. Each of the tractive elements 342 has a track frame 343 that is coupled to the frame 310. In the following description, only aspects of the left track assembly 342A will be expressly described. Generally, the right track assembly 342B can also include the same components. In the illustrated example, the track frame 343 is coupled to the first side frame member 313a. The track frame 343 supports and is surrounded by an endless track 344 (only one shown), which rotates under power to propel the loader 300 over a support surface.

The track assembly 342A also includes a sprocket 346 coupled to and powered by a drive motor 326A to engage the endless track 344 to cause the endless track 344 to rotate about the track frame 343. Idlers 345, including a first idler 345a (e.g., a forward idler) and a second idler 345b (e.g., a rear idler), are provided at opposing ends of the track frame 343. One of the idlers 345a is held against the track 344 by a tensioner assembly 700 (see FIGS. 17-18) to maintain proper tension on the track 344, as further described below. The track frame 343 also supports a plurality of other rollers 348, which engage the track 344 and, through the track 344, the support surface, to support and distribute the weight of the loader 300.

In the illustrated example, the track assemblies 342A, 342B of the loader 300 define a wheelbase greater than 1,100 mm. Wheelbase, as used herein, is defined as the longitudinal center-to-center distance between forward and rear idlers of a track frame (e.g., the idlers 345a, 345b). When equipped with tracks, the track assemblies 342A, 342B can also each define a track width of greater than 200 mm. Track width, as used herein, is defined by the lateral edge-to-edge distance of an endless track (e.g., the track 344). The loader 300 can further define a vehicle width of between about 900 mm to about 908 mm. Vehicle width, as used herein, is defined by the lateral edge-to-edge distance between the lateral outside of a right track assembly (e.g., the track assembly 342B) and the lateral outside of a left track assembly (e.g., the track assembly 342A).

As illustrated, the loader 300 can also define an unloaded mass of greater than 3500 lbs. For example, an unloaded mass can be defined as a mass of a loader (e.g., the loader 300) with equipment installed and an empty attachment (e.g., a bucket), in the most usual configuration as specified by the manufacturer. The unloaded mass can also include the mass of the operator (e.g., assumed at 75 kg) along with a full fluid tank and all other fluid systems also filled. The loader 300, in the illustrated configuration, defines a ground contact pressure of less than 5.0 psi (e.g., as can be calculated by standard ISO 16754:2008).

Figure 16:
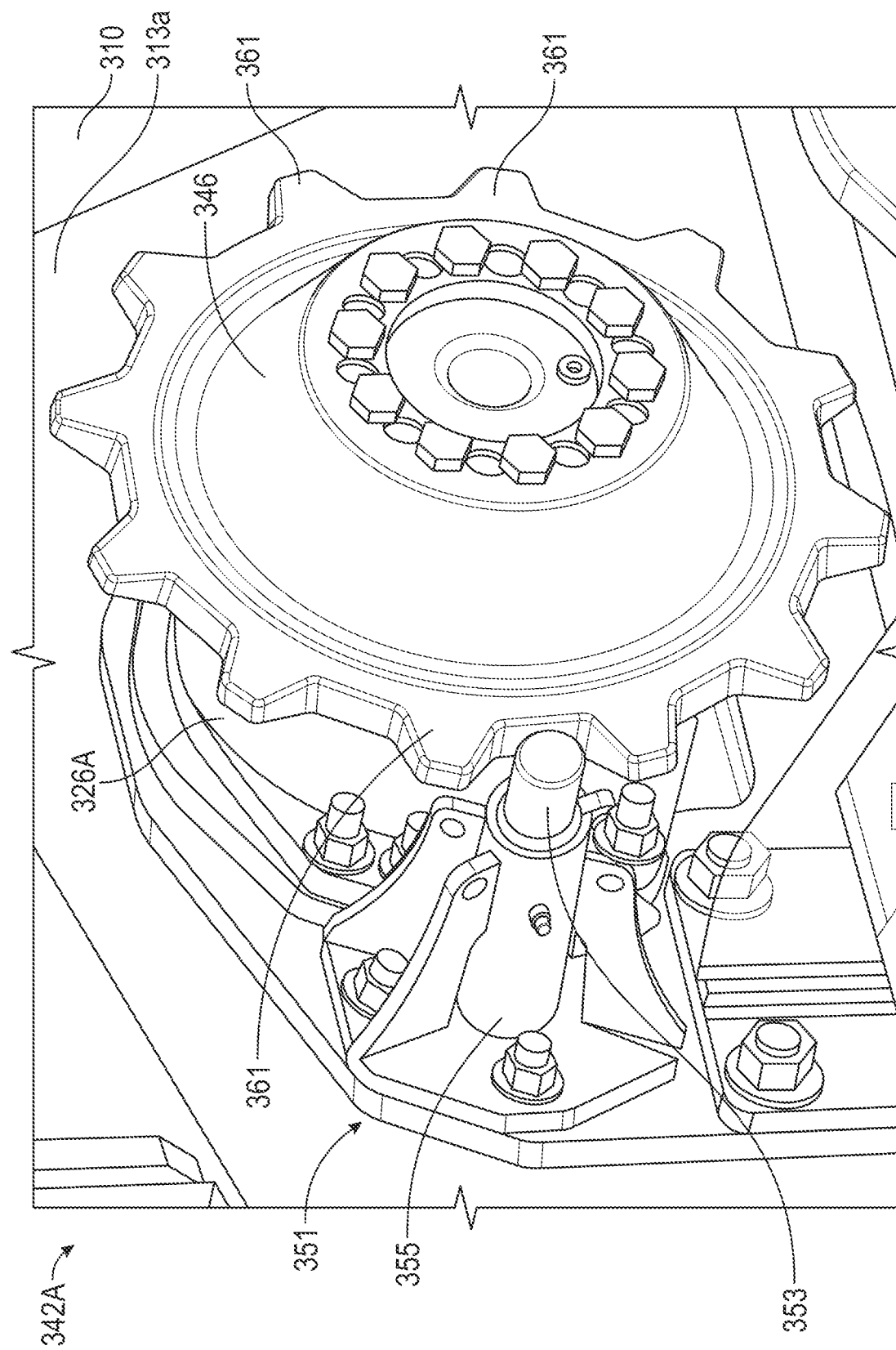
FIG. 16 illustrates a perspective view of a traction lock system that engages with the track assembly of FIG. 15.

Referring to FIGS. 15 and 16, the track assembly 342a can also include a traction lock system 351 (e.g., a brake or parking brake). In the illustrated example, the traction lock system 351 includes a traction lock actuator (now shown), a pin 353, and a support bracket 355 coupled to the frame 310 and configured to partially surround the pin 353. In the illustrated example, the support bracket is coupled to the first side frame member 313a of the frame 310. The pin 353 is movable between an extended position (shown in FIGS. 15-16), where the pin engages the sprocket 346 to lock the traction to brake the track assembly, and thereby stop or hold the loader 300, and a retracted position, where the pin does not engage the sprocket (not shown). In the illustrated example, the traction lock system is a spring applied, pressure release system, in that the traction lock actuator is configured to exert a force on the pin 353 (e.g., via a solenoid or other form of actuator) to move the pin 353 from the extended position to the retracted position, in which the pin 353 is disengaged from the sprocket 346, and an extended position (shown in FIG. 16), in which the pin 353 is engaged with the sprocket 346. In the illustrated example, the sprocket 346 has a plurality of teeth 361 that protrude radially outward therefrom for engaging the endless track 344 of the track assembly 342a. When the pin 353 is in the extended position, the pin 353 is inserted into a gap between adjacent teeth 361 of the sprocket 346 and thereby interferes with the adjacent teeth of the sprocket 346 to inhibit rotation. In contrast, when the pin 353 is in the retracted position, the pin 353 is held clear of the teeth 361 of the sprocket 346 and thereby allows the sprocket 346 (and the track 344) to rotate. When the actuator is not exerting a force on the pin, the pin is biased by a spring (not shown) to extend and engage the sprocket 346.

Figure 17:
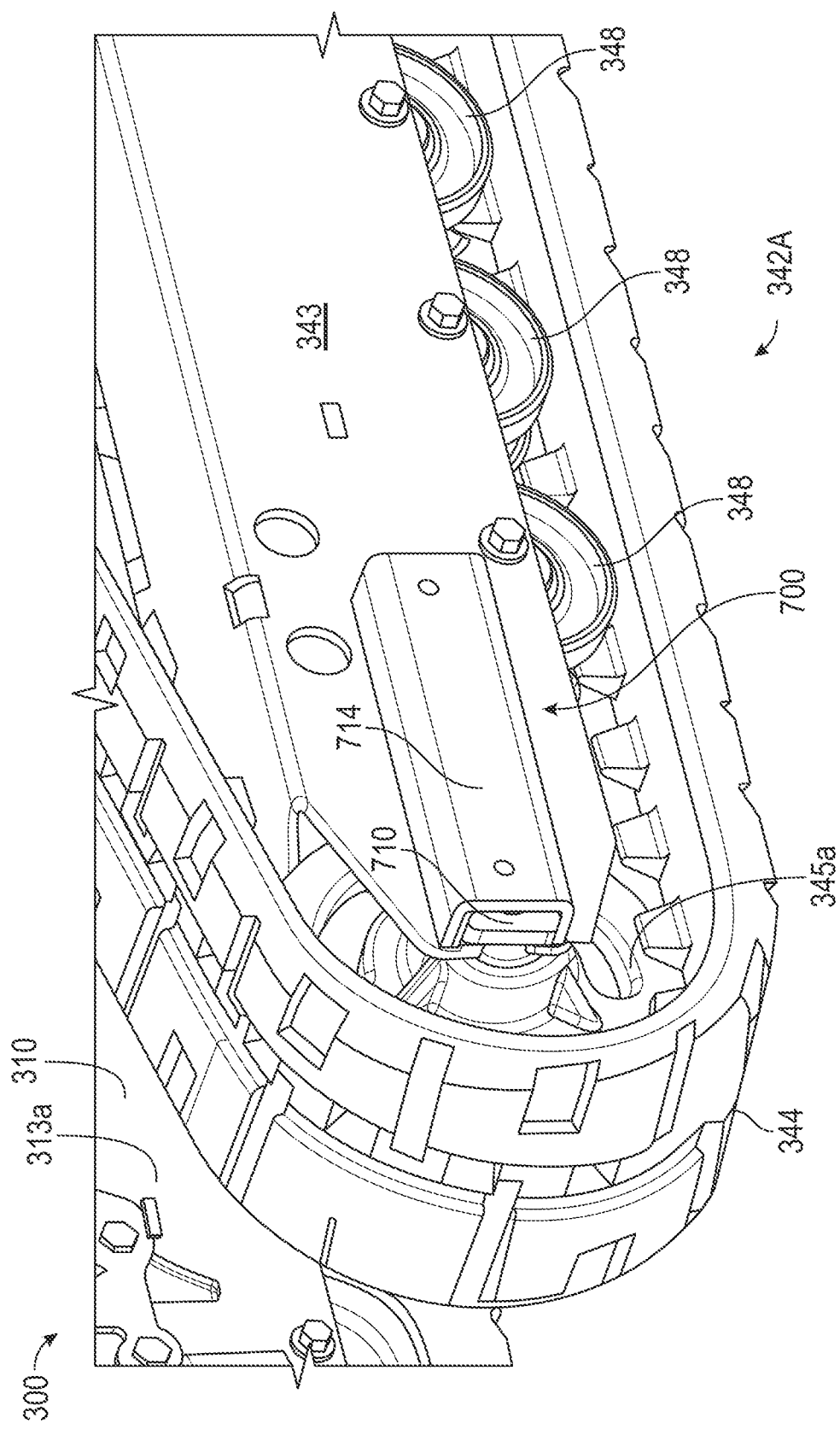
FIGS. 17 and 18 illustrate perspective views of a tensioning assembly of the track assembly of FIG. 15, with certain components removed or rendered transparently in FIG. 18.
Figure 18:
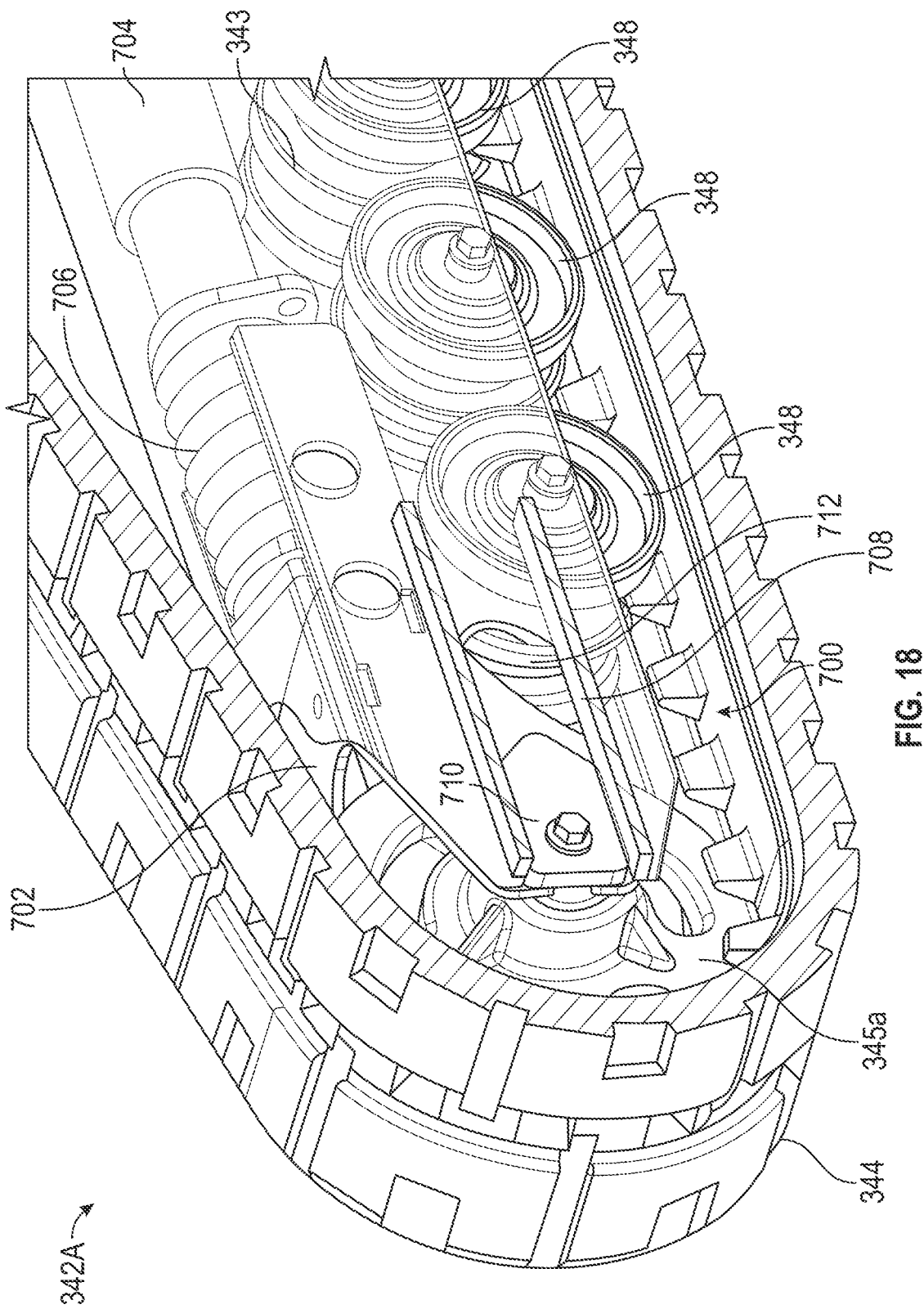

Referring to FIGS. 17 and 18, the tensioner assembly 700 can include an idler frame 702, to which the first idler 345a is rotatably coupled, and a tensioning actuator 704 (e.g., a tensioning cylinder 704, as shown). The idler frame 702 is configured to rotatably support the first idler 345a and be axially movable relative to the track frame 343 by the tensioning cylinder 704. The tensioning cylinder 704 is coupled between the track frame 343 and the idler frame 702 and can thus drive the first idler 345a towards or away from the track 344 and thereby adjust a tension of the track 344. During operation, the tensioning cylinder 704 is configured to move the idler 345a between a retracted position, in which the idler 345a is out of engagement with the track 344, and a tensioned position (e.g., in a partially or fully extended configuration), in which the idler 345a is in engagement with the track 344 (shown in FIG. 18). In the illustrated example, a spring 706 can be coupled to the tensioning cylinder 704 and be configured to bias the idler frame 702 towards an extended configuration (e.g., forward towards the track 344), while also allowing for some recoil in certain situations. For example, the spring 706 can allow for recoil when debris is introduced between the track 344 and idlers 345, or when the track 344 momentarily engages an obstruction.

In the illustrated example, the track frame 343 defines a triangular track routing and the idler 345a is arranged at an end of the track frame 343 that is adjacent to the portion of the track 344 that defines a narrow track angle relative to the other corners of the route of the track. Thus, the illustrated orientation of the tensioner assembly 700 can provide high mechanical efficiency for tensioning adjustments. In the illustrated example, the narrow track angle of the track 344 is arranged at the front end of the loader 300 opposite the operator station (not shown). Other track configurations are also possible. For example, the idler being adjusted by the tensioning cylinder can be arranged at a back end of the track (see, e.g., FIG. 3). According to other examples, the track routing can be an obround or trapezoidal track routing.

With particular reference to FIG. 18, the track frame 343 can define one or more guide slots 708 configured to receive the idler frame 702 such that the motion of the idler frame 702 is defined by the guide slot 708. In the illustrated example, the idler frame 702 includes one or more protrusions 710 (e.g., a single protrusion 710, as shown) extending outwardly from the idler frame 702. The protrusion 710 is configured to extend into the corresponding guide slot 708 (e.g., to engage with sliding-support surfaces therein). The guide slot 708 within the track frame 343 can include an end stop 712 configured to engage the protrusion 710 on the idler frame 702. The end stop 712 defines the retracted position for the idler 345a. According to some examples, the track frame 343 can include two guide slots 708 arranged on laterally opposing sides of the track frame 343 and the idler frame 702 can include two corresponding protrusions 710 extending into the guide slots 708 (see, e.g., FIG. 19). In some embodiments, including as shown, the guide slot 708 can include support rails to help guide movement of the corresponding protrusion 710, and a concavely angled end of the protrusion 710 can be configured to seat on a convexly angled end of the corresponding slot 708 when the tensioner assembly 700 is fully retracted. In some embodiments, covers for the slots 708 can be provided, including an open-ended cover 714, as shown in FIG. 17.

Within a track assembly, the tensioned or extended position of a tensioner assembly can generally be limited by the characteristics of an associated track. For example, the track has a limit as to how much it should (or can) be tensioned without adverse effect (i.e., without introducing excessive forces on the track that can impact ride quality and overall durability of the tracks), and this limit can define a corresponding limit for the extended position of a tensioner assembly (e.g., a maximum extension of a tensioning cylinder) for a given arrangement. In other cases, an extended position of a tensioner assembly can be defined by a predefined range of motion of a tensioning actuator, or by a mechanical or other stop (e.g., a rigid stop on a track frame). For tensioning assemblies with a relatively small actuation range (e.g., less than 50 mm), an issue can arise that effects the serviceability of the track assembly and its components. For example, with a tensioning cylinder in a retracted position, an idler can still be in contact with the track, making it difficult to remove the track from a loader. In some cases, a drive sprocket may need to be removed to allow the track to be removed. Thus, it can be useful to provide a relatively large actuation range for tensioner assemblies.

With the example configuration illustrated in FIGS. 17 and 18, the tensioner assembly 700 can define a notably large actuation range to allow for removal of the track 344 without removal of the drive sprocket 346 (see also, FIG. 15) or either of the idlers 345. In the illustrated example, the tensioning assembly 700 can define an actuation range of the idler 345a relative to the track frame 343, between the tensioned position and the retracted position, of greater than 50 mm. According to some examples, the actuation range can be greater than 70 mm. In the illustrated example, the actuation range about 75 mm or greater (e.g., about 100 mm or greater). According to some examples, the actuation range between the tensioned position and the retracted position can be between about 2% and 15% of the wheelbase defined by the loader 300. According to the illustrated example, the actuation range between the tensioned position and the retracted position is between about 4% and 11% of the wheelbase defined by the loader 300. According to some examples, the actuation range can be greater than 15% of the wheelbase defined by the loader 300.

Figure 19:
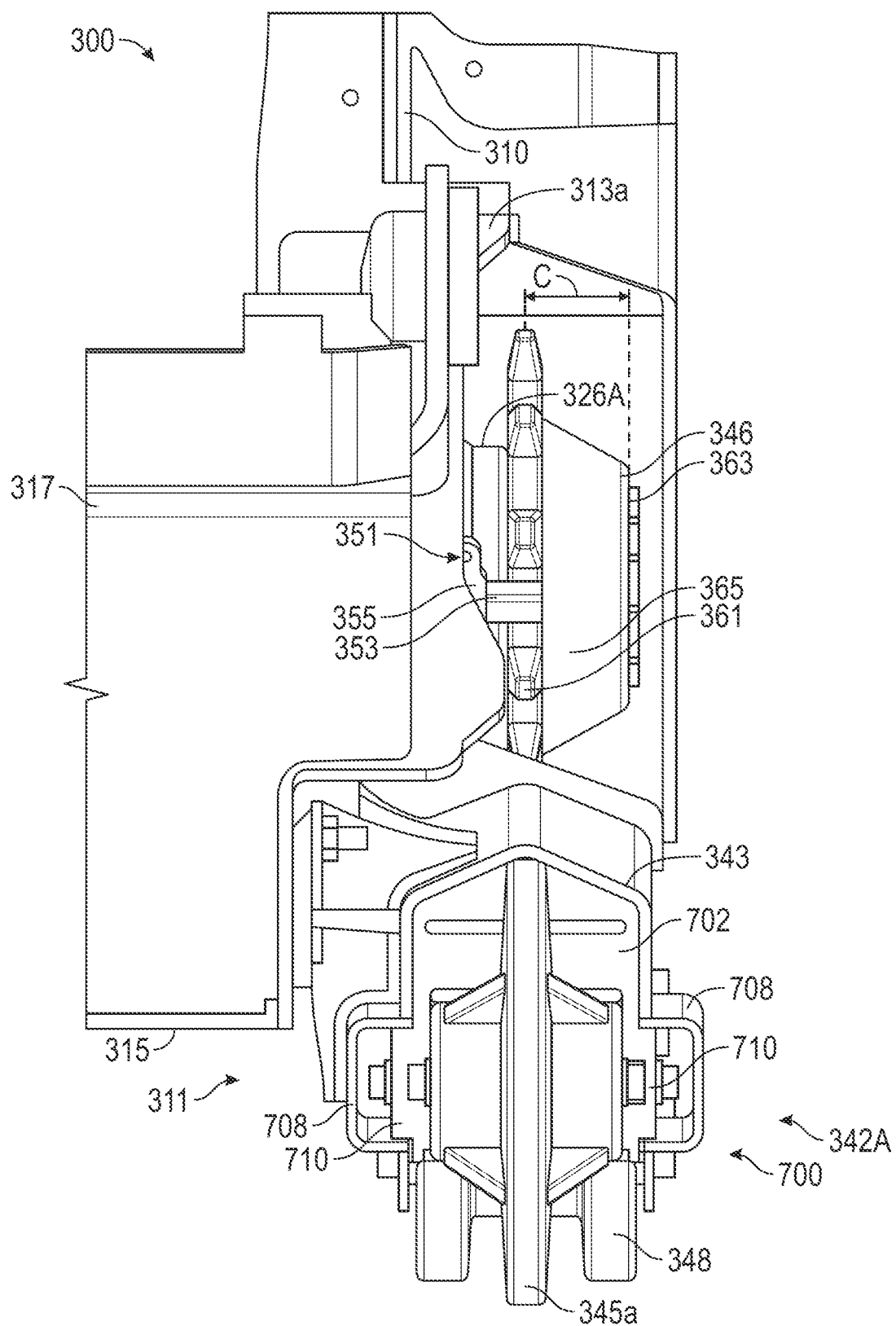
FIG. 19 illustrates a front view of the track assembly of FIG. 15.

Referring generally to FIGS. 19-22, systems and methods for converting a mini-loader from a narrow track configuration to a wide track configuration are illustrated. Converting from the narrow track configuration to the wide track configuration can allow for more clearance between the track assemblies 342 and the frame 310 of the loader 300 such that a track 344 with a larger (or smaller) track width can be installed. An example narrow track configuration is illustrated in FIG. 19. In the illustrated example, the sprocket 346 (e.g., a first sprocket) can define a first offset C defined between the hub 363 of the drive motor 326A and a line of action of the teeth 361 on the first sprocket 346 (e.g., a vertical plane passing through a lateral mid-point on the teeth 361 of the sprocket 346). The first offset C of the sprocket 346 is configured to align the teeth of the first sprocket 346 with the idlers 345 and the plurality of rollers 348. In the illustrated example, the first sprocket 346 includes a conical portion 365 extending between the hub 363 and the teeth 361. The conical portion 365 can expand radially outwards from the centerline of the sprocket 346 such that the diameter of the conical portion 365 increases from the hub 363 towards the teeth 361.

Figure 20:
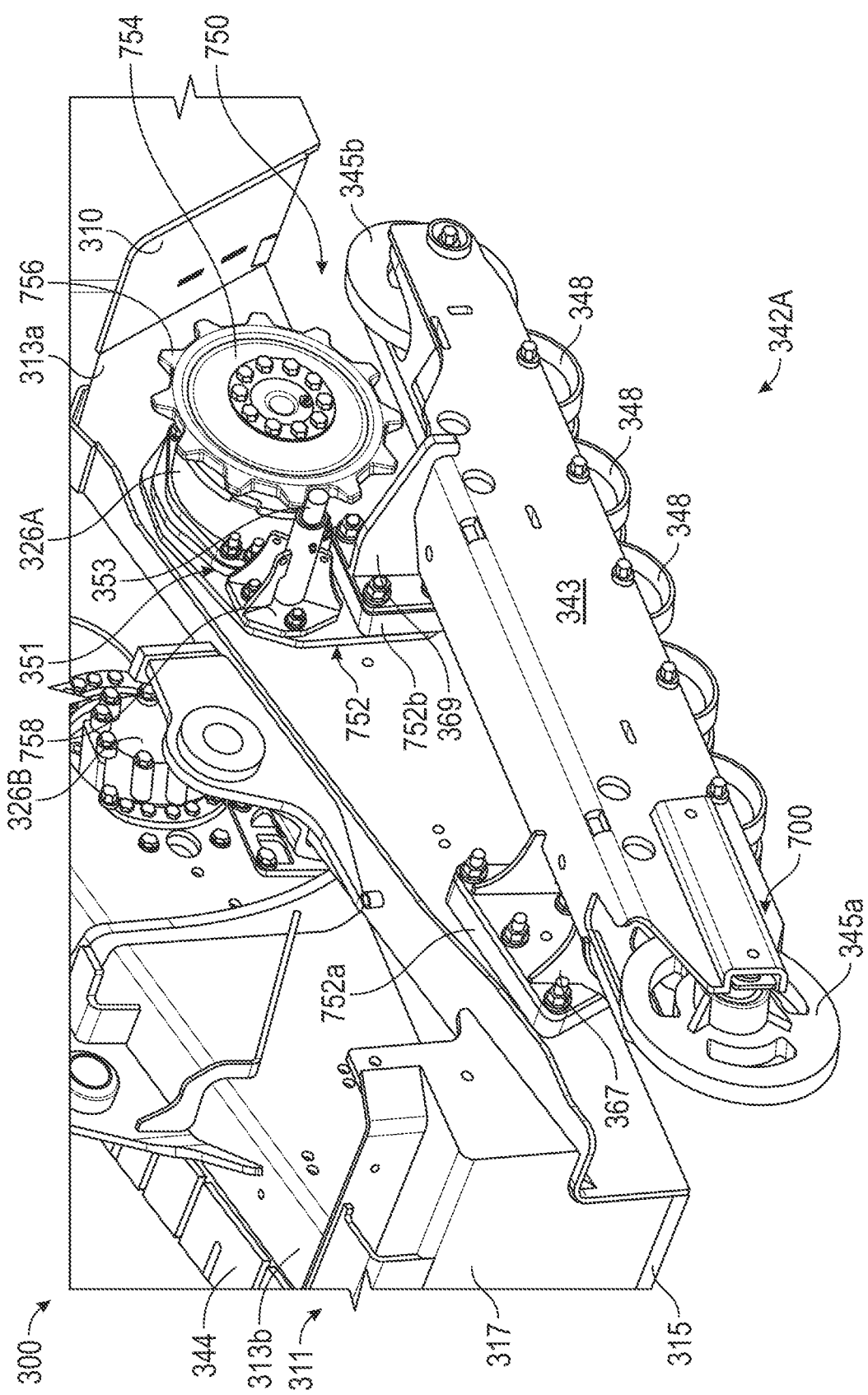
FIG. 20 illustrates a perspective view of the track assembly of FIG. 15 including an adapter kit, as installed to covert the power machine from a narrow track to a wide track configuration.
Figure 21:
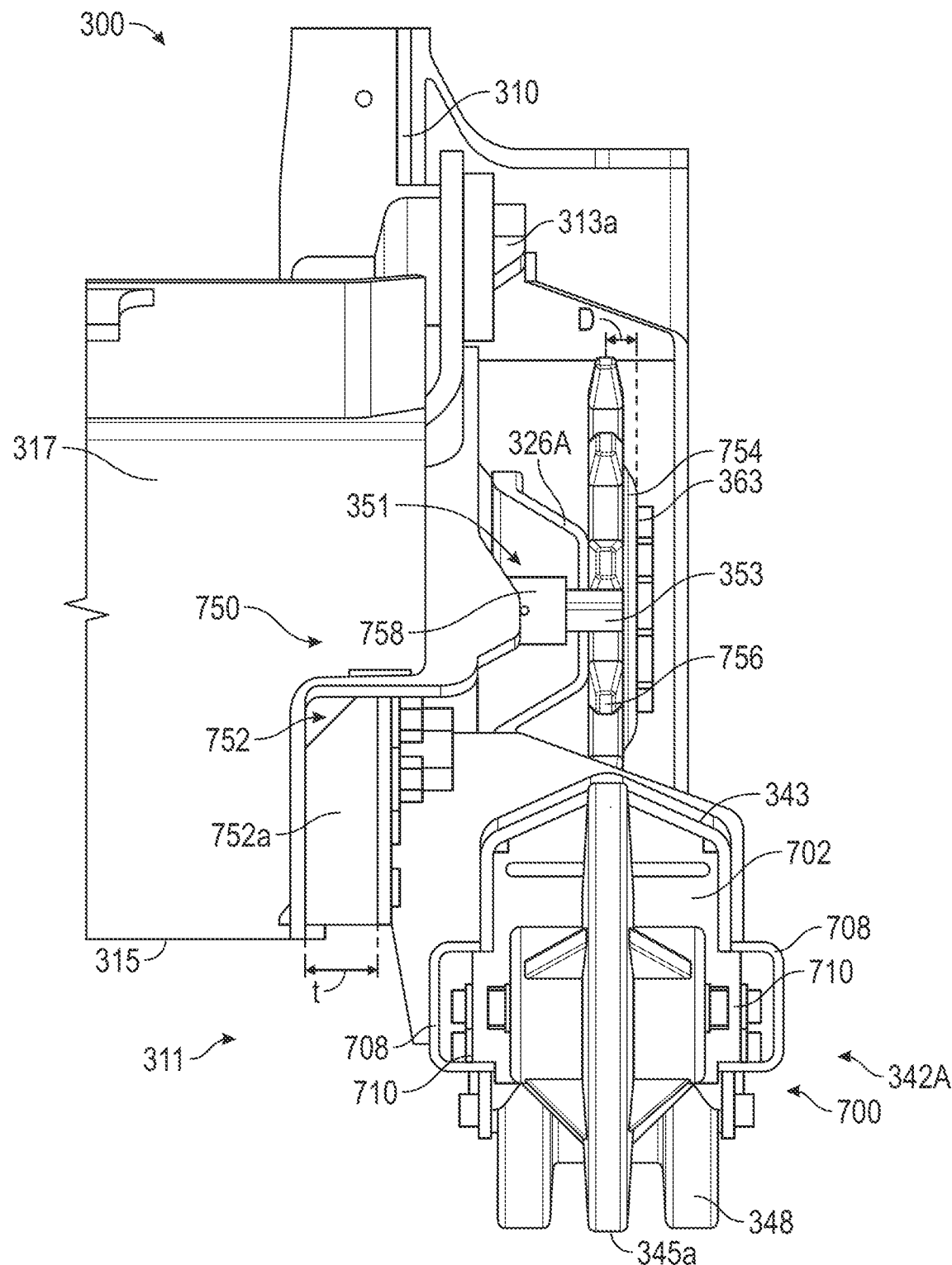
FIG. 21 illustrates a front view of the track assembly of FIG. 20.
Figure 22:
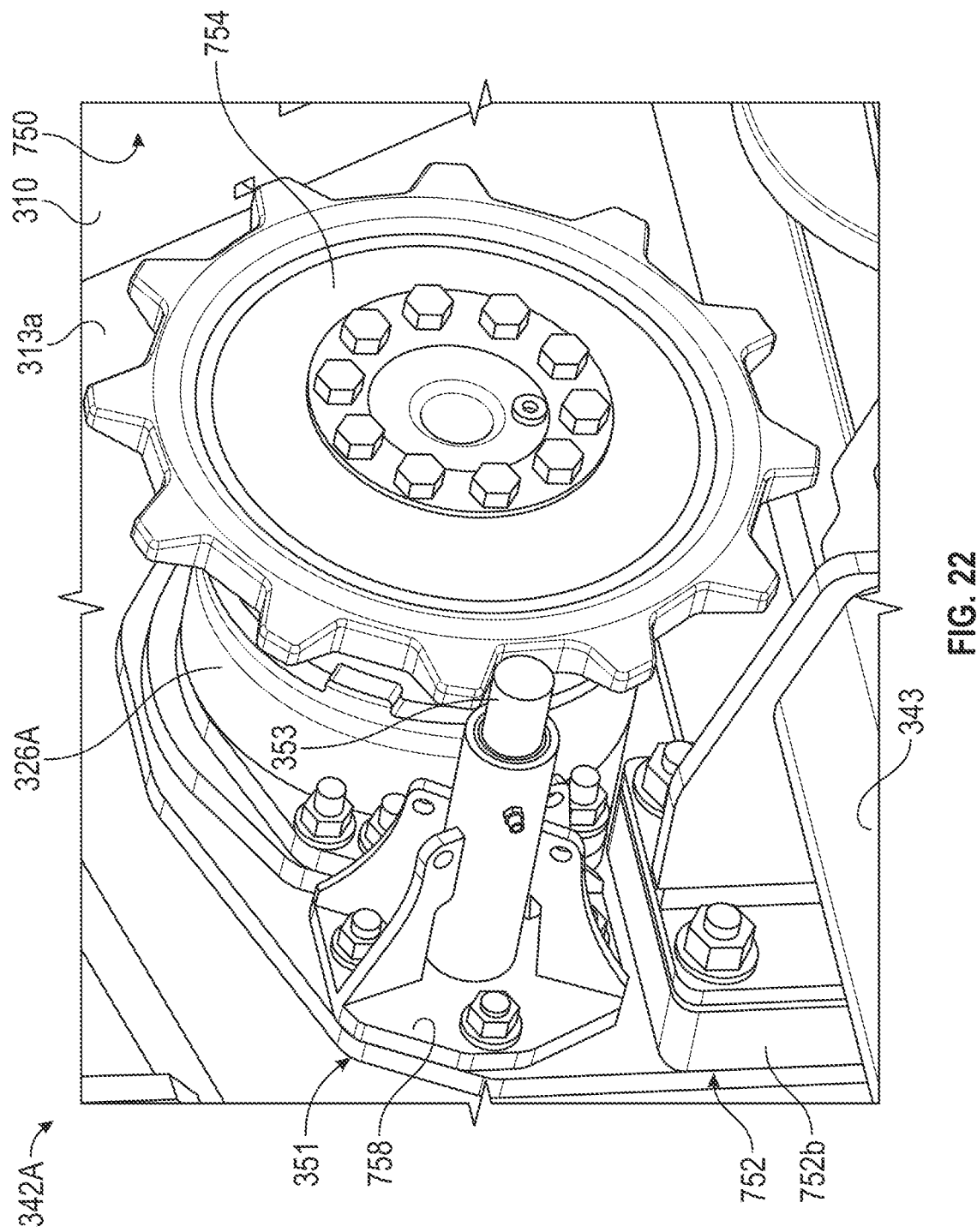
FIG. 22 illustrates a perspective view of the traction lock system of the track assembly of FIG. 21.

Looking to FIGS. 20-22, the track assembly 342 is illustrated with a kit 750 installed to convert the loader 300 from the narrow track configuration of FIGS. 15-19 to an example wide track configuration. The kit 750 can include one or more spacers 752 (e.g., a forward spacer 752a and a rearward spacer 752b) and a second sprocket 754. The spacers 752 are configured to be coupled between the frame 310 and the track frame 343 to offset the track assembly 342A laterally outwards from the frame 310 by a distance that is equal to the thickness t of the spacers 752 (see FIG. 21). According to some examples, the thickness t of the spacers 752 can be between about 15 mm and about 60 mm. According to other examples, the thickness t of the spacers 742 can be between about 20 mm and about 50 mm. According to some examples, the thickness t of the spacers 752 can be between about 25 mm and about 25 mm. According to the illustrated example, the thickness t of the spacers are between about 35 mm and about 40 mm.

In the illustrated example, the kit 750 includes two spacers, a first spacer 752a and a second spacer 752b. The first spacer 752a is arranged between a first support bracket 367 adjacent a front end of the track assembly 342A and the first side frame member 313a. Similarly, the second spacer 752b is arranged between a second support bracket 369 adjacent a rear end of the track assembly 342A and the first side frame member 313a. In the illustrated example, each of the spacers 752a, 752b is respectively formed as a solid, unitary body. However, other configurations are also possible.

As best illustrated in FIG. 21, the second sprocket 754 is configured to mount to the hub 363 of the drive motor 326A on the loader 300, in place of the sprocket 346, once the sprocket 346 has been removed. The second sprocket 754 defines a second offset D between the hub 363 of the drive motor 326A and teeth 756 of the second sprocket 754. The second offset D of the second sprocket 754 is configured to align the teeth 756 of the second sprocket 754 with the idlers 345 and the plurality of rollers 348 on the track assembly 342A, when the track assembly 342A is installed in combination with the spacers 752. Correspondingly, the second offset D is different than the first offset C by a distance equal to the thickness t of the spacers 752. According to the illustrated example, the second offset D of the second sprocket 754 is less than the first offset C of the first sprocket 346. In some cases, the offset C may be equal to zero, and the offset D may thus be equal to the thickness t of the spacers 752.

The installation of the kit 750 can be carried out by completing the following steps, which can allow for the conversion to a wide track configuration without the removal (or relocation) of the drive motor 326A and without employing two different configurations of track frames. The following steps are not necessarily described in a particular order, and it is to be understood that the method is not to be limited to the order in which the steps are described. Rather, the following steps can be completed in any order, or multiple steps can be completed in parallel.

First, the narrow track 344 from the track assembly 342A can be removed from the loader 300. Then, the track assembly 342A can be removed from the frame 310 of the loader 300. With the track assembly 342A, including the track frame 343, removed from the frame 310, the first sprocket 346 mounted to the drive motor 326A can be removed, with the drive motor 326A, in some cases, remaining installed onto the frame 310. With the track assembly 342A removed, the spacers 752 can be installed between the track assembly 342A and the frame 310, and the track assembly 342A can be re-installed onto the frame 310 together with the spacers 752. Next, and generally without removing the drive motor 326A from the frame 310, the second sprocket 754 can be installed onto the drive motor 326A. Lastly, a wide track (not shown) can be installed onto the track assembly 342A to be driven by the second sprocket 754.

In some cases, a kit for changing track width on a power machine can also include a replacement brake assembly. In this regard, according to the illustrated example, the kit 750 can further include a second support bracket 758 coupled to the frame 310 and configured to partially surround the pin 353 of the traction lock system 351. The second support bracket 758 is configured to offset the pin 353 laterally outwards a distance equal to the thickness t of the spacers 752, such that the pin 353 is in alignment with the teeth 756 of the second sprocket 754 when the pin 353 is in the extended position. Alternatively, an additional spacer (not shown) can be provided between the support bracket 355 of the traction lock system 351 and the frame 310, with a thickness that is equal to the thickness t of spacers 752, or a longer pin can be used.

In some cases, components of an operator control system can be arranged to provide optimal operator engagement or ergonomic experience for human operators. Referring generally to FIGS. 23 to 28, the operator station 350 positioned toward the rear of the frame 310 is illustrated. While standing on the platform 352 (see FIG. 27), an operator has access to a plurality of operator control inputs 362 included in the operator control system 360 that can provide control signals to control work functions of the loader 300, when manipulated by the operator, including, for example, for control of the tractive elements 340 and the lift arm (e.g., similar to the lift arm 230 of loader 200, FIG. 2).

Figure 27:
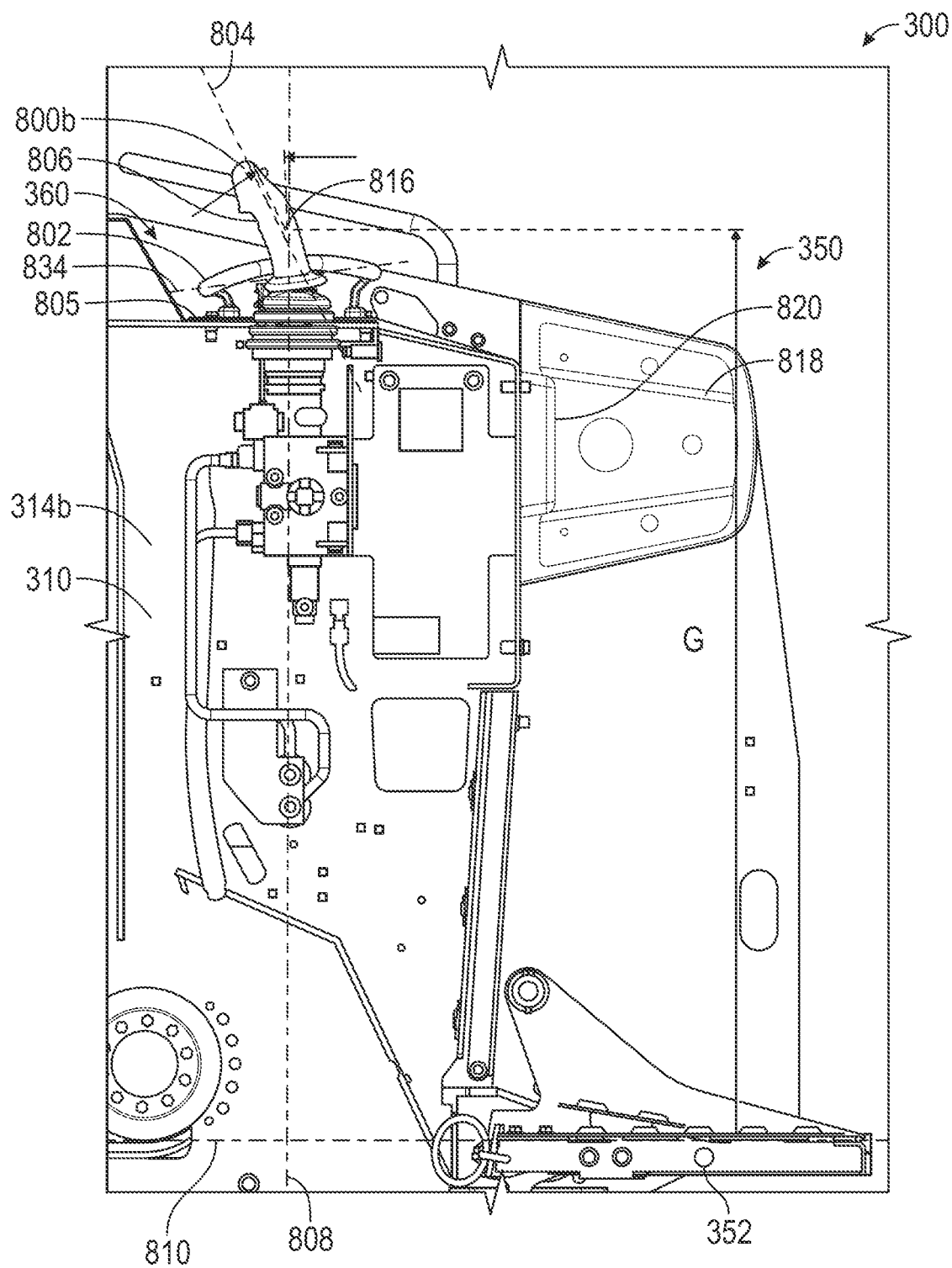
FIG. 27 illustrates a cross-section view of the operator station of the power machine of FIG. 5 taken through a vertical plane passing through the center line of the power machine.

Looking briefly towards FIG. 27, the loader 300 can define a reference plane 810. The reference plane 810 can be defined by a contact area between a track of the loader 300 and level ground (see, e.g., the track 344 of FIG. 15), or by a support area (e.g. support plane) defined by the operator platform 352. In the illustrated example, the reference plane 810 is defined by the operator platform 352, and the following description makes reference to the reference plane 810 as thus defined. However, description of components relative to the reference plane 810 (e.g., above, below, etc.) can generally also apply to a different reference plane. In the illustrated example, the operator platform 352 defines a horizontal reference plane, although it is to be understood that the reference plane 810 may also be at orientations that are angled relative to horizontal.

Figure 23:
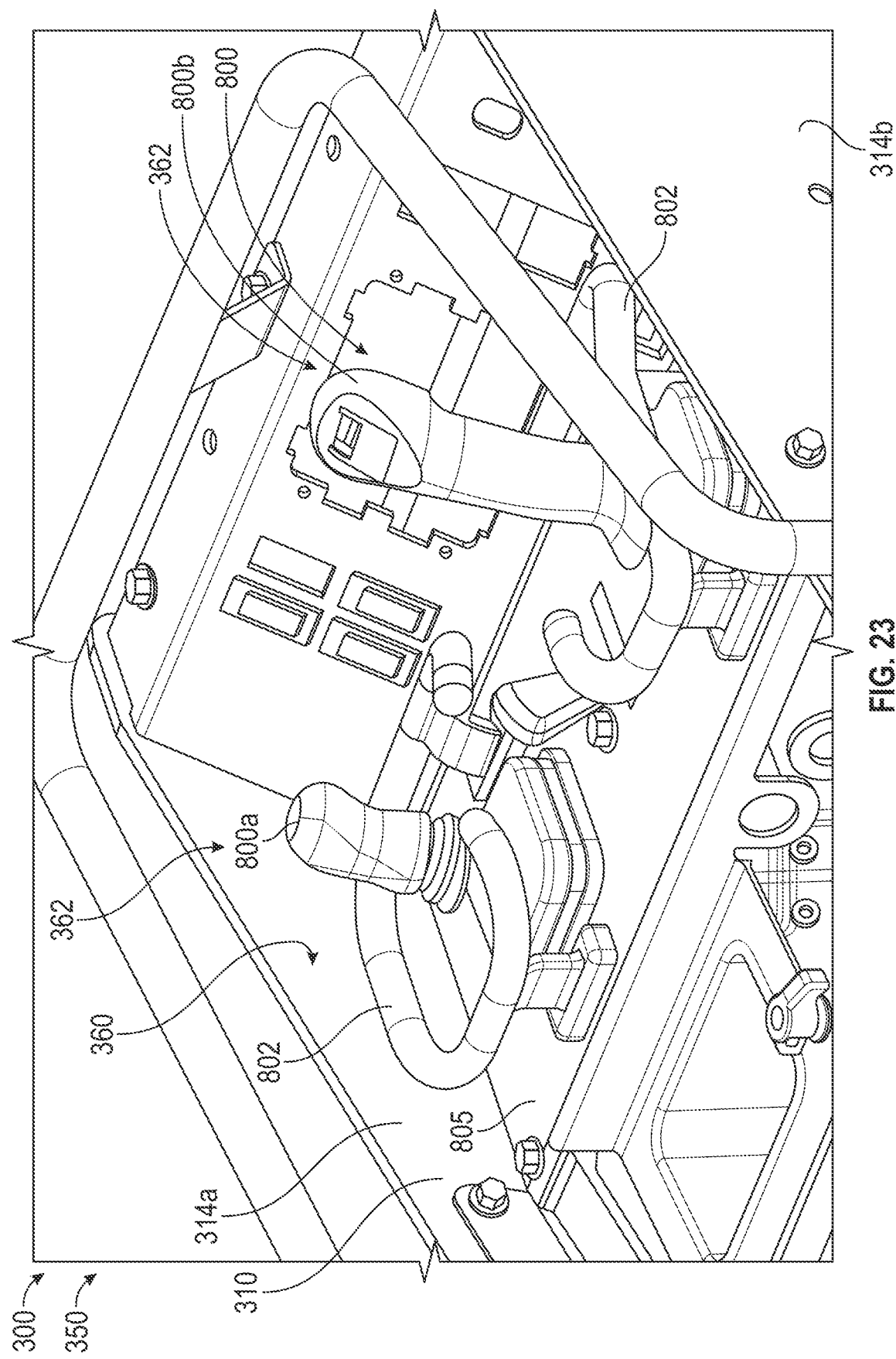
FIG. 23 illustrates a perspective view of an operator control system including an operator panel for an operator station of the power machine of FIG. 5.

In the illustrated example of FIG. 23, the operator control inputs 362 can include at least one joystick 800 mounted to the frame 310 and extending through (or otherwise from) the operator control panel 805 of the operator control system 360, which is also supported by the frame 310. As will be further described below, the operator station 350 and, in particular, the joysticks 800 can be configured with particular ergonomic arrangements, to provide greater comfort for a wide variety of operators.

According to some examples, the joysticks 800 can be configured as a two-axis joystick for controlling functions of the power machine. According to some examples, the joysticks 800 can be configured as single-axis joysticks. According to other examples, the joysticks 800 can be configured as omnidirectional joysticks. In any case, the joysticks 800 are generally biased to a neutral position (e.g., shown in FIG. 23), and are generally configured to be moved relative to the neutral position to provide non-zero commands for various power machine functions.

As illustrated in FIG. 23, the operator control system 360 includes two joysticks 800, including a first joystick 800a and a second joystick 800b. In the following description, reference may be made to either the first joystick 800a or the second joystick 800b when describing particular aspects. Aspects described relative to the first joystick 800a also generally applies to the second joystick 800b, and vice versa, although the joysticks 800a, 800b may be configured to control substantially different functionality in some cases.

As discussed above, one example of a function controlled by joystick 800 is control of travel of the power machine. As such, in two-axis embodiments joystick 800 can be operated in an ISO pattern, with a first direction of travel (fore and aft) being used to control travel speed as well as direction (i.e. forward or reverse) of travel. The second direction of travel (side-to-side) is used to control steering of the power machine in a left or right direction.

In some exemplary embodiments, a reference bar 802 at least partially surrounds the joystick 800 and is mounted to the control panel 805 adjacent the joystick 800. The reference bar 802 provides a surface for an operator to rest his or her hand while operating the joystick. The reference bar is contoured to match an arc of travel of the joystick as it moved fore and aft relative to a neutral position.

Figure 24:
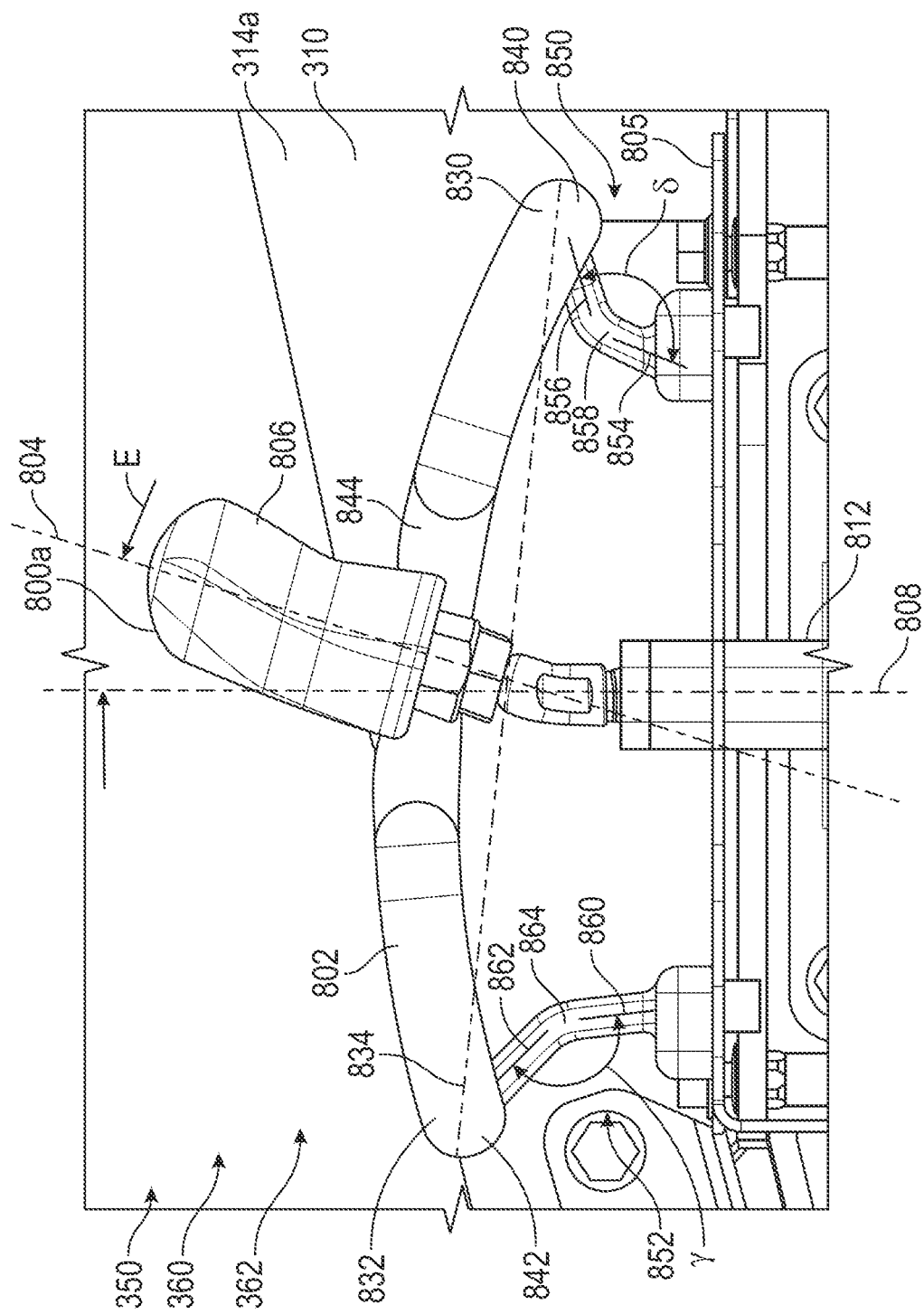
FIG. 24 illustrates a side view of a first joystick of the operator control system of FIG. 23.
Figure 25:
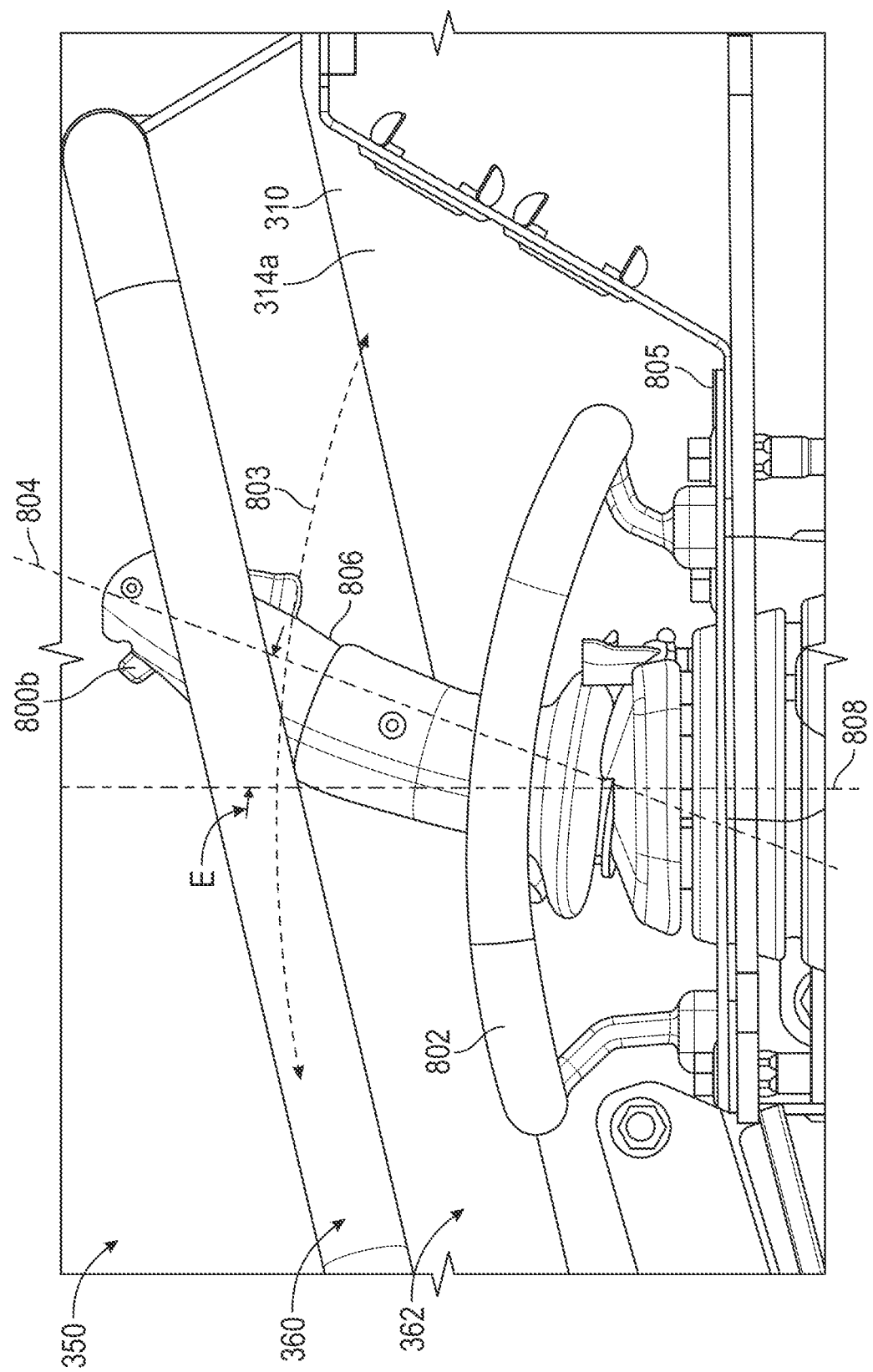
FIG. 25 illustrates a side view of a second joystick of the operator control system of FIG. 23.

FIGS. 24 and 25 illustrate joysticks 800a and 800b, respectively, in a neutral position. The neutral position defines a neutral axis 804 extending through the joystick handle 806 of the joystick 800a (and may extend at the same or a different angle for the two joysticks 800a, 800b). In the illustrated example, the neutral axis 804 is tilted forward relative to a vertical axis 808 that is orthogonal to the reference plane 810 (see, e.g., FIG. 27). In particular, the neutral axis 804 is tilted forward relative to the vertical axis 808 at an angle E greater than 5 degrees. According to some examples, the neutral axis 804 is angled forward greater than 8 degrees. According to some examples, the neutral axis 804 is angled forward greater than or equal to 10 degrees.

According to some examples, such as in FIG. 24, the joystick 800a can include a joystick shaft 812, to which the joystick handle 806 is coupled. In the illustrated example, the joystick handle 806 is also tilted forward relative to the joystick shaft 812. Indeed, the joystick handle 806 can thus in some cases define the neutral axis 804 at the handle 806 to be angled differently than a neutral axis in a sensing assembly of the relevant joystick 800 (e.g., as may remain aligned with the vertical axis 808). Generally, the neutral axis 804 for a grip portion of a joystick (e.g., a portion of the joystick handle 806 configured to be gripped) can be defined as an axis that intersects a first centroid at a cross section of a first end of a grip portion of the joystick and a second centroid at a cross section of a second end of the grip portion of the joystick. In some cases, a neutral axis of a joystick can be titled relative to a vertical axis in other ways, including by tilting an entire joystick assembly.

Figure 26:
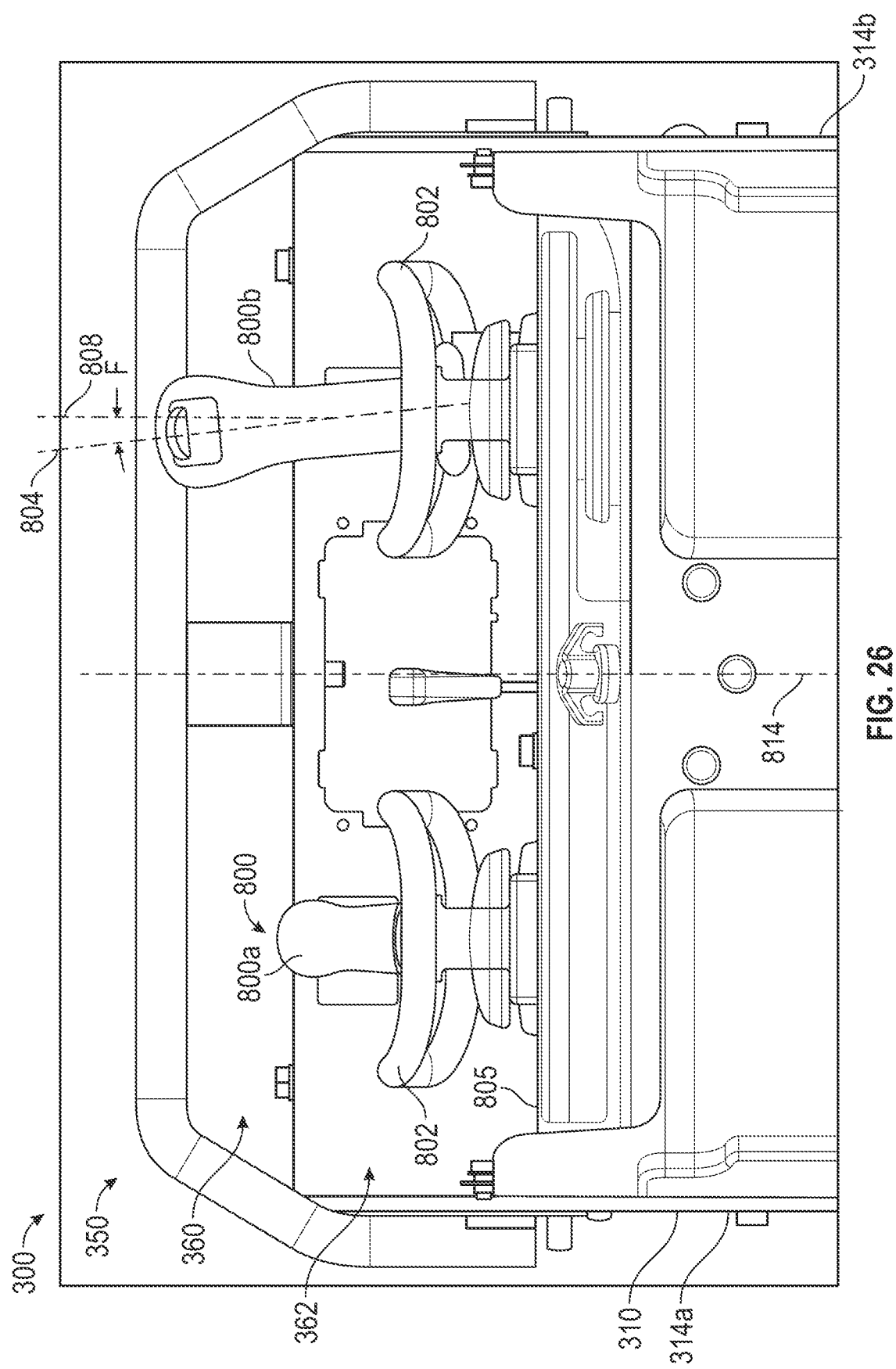
FIG. 26 illustrates a rear view of the operator panel of the power machine of FIG. 5.

In some cases, a neutral axis of a joystick may beneficially tilt laterally inwardly (e.g., in addition to tilting forward). FIG. 26 illustrates the joysticks 800a and 800b, respectively, in a neutral position. In the illustrated example, the neutral axis 804 is tilted inboard towards the centerline 814 of the loader 300 relative to a vertical plane passing through the centerline 814 of the frame 310 (e.g., the longitudinal axis 305, see FIG. 6) and orthogonal to the reference plane 810 (see FIG. 27). The neutral axis 804 is tilted inboard relative to the vertical axis 808 at an angle F that measures between about 2 degrees and about 15 degrees. According to some examples, the neutral axis 804 is angled inboard between about 2 degrees and about 10 degrees. According to some examples, the neutral axis 804 is angled inboard between about 5 degrees and about 10 degrees. According to some examples, the neutral axis 804 is angled inboard about 5 degrees. According to some examples, joystick handle 806 is also tilted inboard relative to the joystick shaft (not shown). Generally, tilted neutral axes as shown (or otherwise generally described herein) can provide for more ergonomically neutral engagement of a joystick by an operator of a power machine, particularly power machines configured as mini-loaders (e.g., as shown for the power machines 200, 300).

In some cases, joysticks can be located ergonomically relative to operator contact points of other reference locations of a power machine. For example, referring now to FIGS. 27 and 28, the joystick handle 806 of the joysticks 800 can define a medial portion configured to be received and gripped by the palm of an operator. The medial portion defines a joystick centroid 816 about which the relative locations of the joysticks 800 will be described. In the illustrated example, the operator station 350 can include one or more hip pads configured to be in contact with the hips or torso of an operator using the loader 300. The hip pads 818 can define a forward most contact point 820 about which the relative locations of the joysticks 800 will be described. In other configurations, however, other contact points can be considered, or locations of a centroid of a joystick can be references to relevant non-contact locations (e.g., a rear end of a frame that is in front of an operator of a walk-behind power machine).

Referring to FIG. 27, the centroid 816 of the joystick 800b can be positioned vertically above the reference plane 810 defined by the operator platform. The vertical distance between the centroid 816 and the operator platform 352 is defined by a distance G of at least 800 mm. In the illustrated example, the distance G is between about 800 mm and about 1500 mm. According to some examples, the distance G is between about 900 mm and about 1200 mm. According to other examples, the distance G is between about 1000 mm and about 1100 mm.

Figure 28:
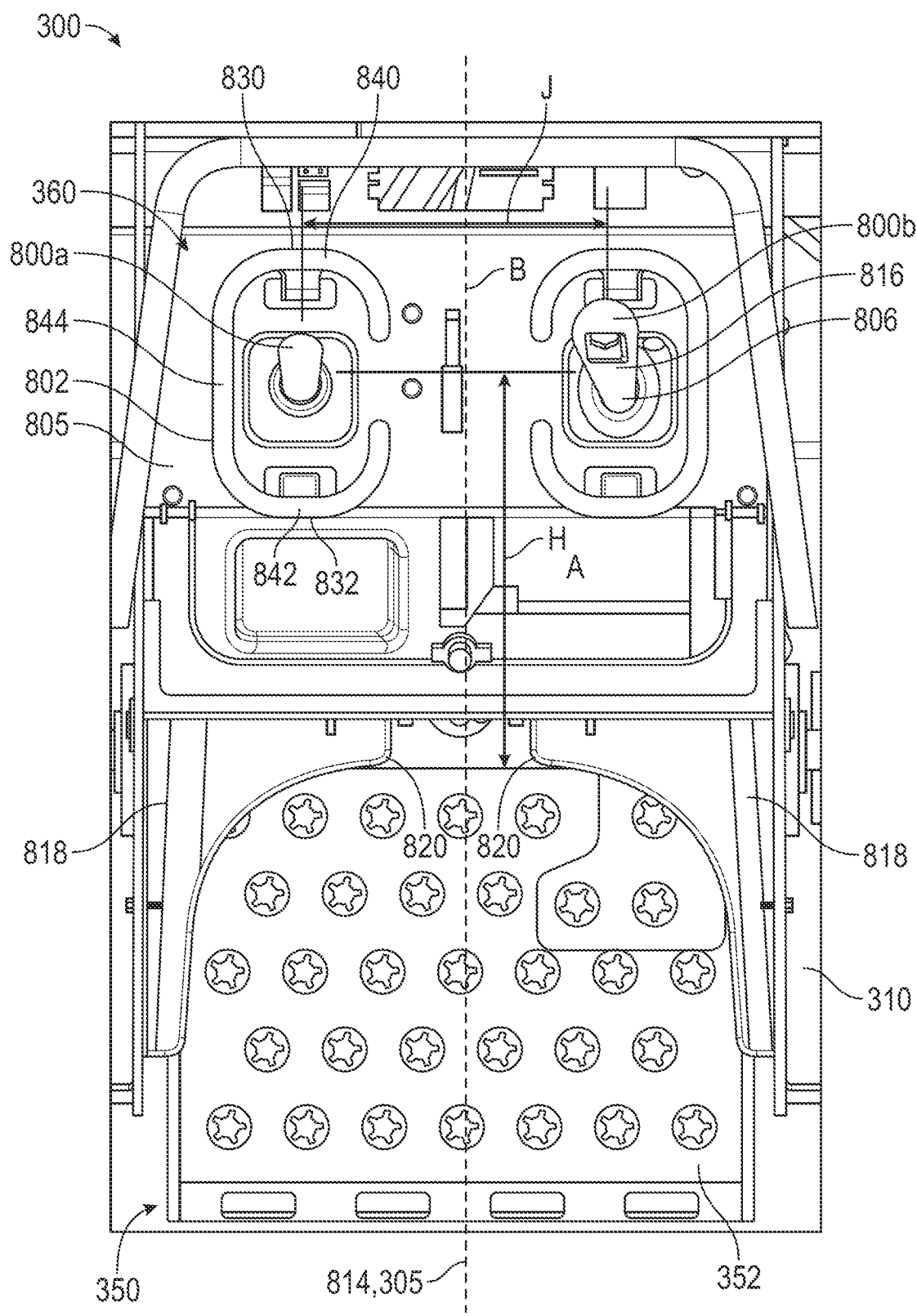
FIG. 28 illustrates a top view of the operator station of the power machine of FIG. 5.

Referring to FIG. 28, the centroid 816 of the joystick 800b can be positioned longitudinally forward of the contact point 820 defined by the hip pads 818. The longitudinal distance between the centroid 816 and the contact point 820 is defined by a distance H of at least 250 mm. In the illustrated example, the distance H is between about 250 mm and about 500 mm. According to some examples, the distance H is between about 300 mm and about 400 mm. According to other examples, the distance H is between about 300 mm and about 340 mm.

In the illustrated example, the first and second joysticks 800a, 800b are laterally separated for each other. The first and second joysticks 800a, 800b can define a lateral centroid-to-centroid distance J of at least 200 mm. In the illustrated example, the distance J is between about 200 mm and about 400 mm. According to some examples, the distance J is between about 200 mm and about 300 mm. According to other examples, the distance J is between about 220 mm and about 280 mm. According to the illustrated example, the joysticks 800 can be symmetrically (or otherwise) laterally offset of the centerline 814 by at least 100 mm. In the illustrated example, the lateral offset is between about 100 mm and about 200 mm. According to some examples, the lateral offset is between about 100 mm and about 150 mm. According to other examples, the lateral offset is between about 110 mm and about 140 mm.

In some cases, a reference bar for an ergonomically oriented joystick can be contoured to further support ergonomic engagement by an operator. Referring now to FIGS. 24, 27, and 28, the reference bar 802 includes a forward end 830 and an opposing rearward end 832. The forward end 830 of the reference bar 802 defines a first height relative to the reference plane 810 and the rearward end 832 of the reference bar 802 defines a second height relative to the reference plane 810. In the illustrated example, the first height and the second height are different such that a reference axis 834 (not shown in FIG. 28) that passes through the forward and rearward ends 830, 832 of the reference bar 802 is non-parallel to the reference plane 810. In some cases, arrangements that angle the reference axis 834 generally downward in the forward direction may provide improved ergonomic engagement. According to some examples, the angle of forward tilt of the reference axis 834 relative to the reference plane 810 is approximately equal to the forward tilt angle E of the joystick 800a, so that an operator can move the joystick 800a easily and ergonomically about the neutral axis of the joystick 800a while the operator's arm or hand remains appropriately supported by the reference bar 802.

In some cases, a reference bar can provide a smoothly curved support surface that corresponds to an angled neutral axis of a joystick. For example, as shown in FIGS. 24 and 28 in particular, the reference bar includes a first bar portion 840 forward of the joystick 800a and an opposing second bar portion 842 aft of the joystick 800a. The reference bar further includes a third bar portion 844 extending between the first and second bar portions, laterally to the outside of the joystick 800a. As best illustrated in FIG. 24, the third bar portion 844 provides a curved surface that generally follows an arc of travel of the joystick 800a. In particular, the third bar portion 844 can define a curved profile that can extend initially upwards and away from the rearward end 832 of the reference bar 802 and then curve downwards towards the forward end 830 of the reference bar 802, with an orthogonal line from the reference bar 802 at a point of maximum curvature extending substantially in parallel with the neutral axis of the joystick handle 806.

The curved profile of the reference bar 802 can be, in some examples, selected so that it has an approximate radius relative to a pivot point (not shown) of the joystick 800 which is substantially the same as the arcuate travel path 803 (see FIG. 25) of the joystick 800 (e.g., a radius defined by a fixed point on the joystick 800 relative to the pivot point during joystick travel between positions). Thus, the top surface of the reference bar 802, on which the operator rests his or her hand while operating the joystick, will allow consistent relationship between and operator's hand and the joystick handle 806 no matter where the joystick is positioned between the most fore and the most aft position.

In different embodiments, different overall shapes of a reference bar are possible. As best illustrated in FIG. 28, the first bar portion 840 can define a C-shaped bar section, in which the open end of the C-shaped bar section opens towards the rear of the frame 310. Similarly, the second bar portion 842 can also define a C-shaped bar section, in which the open end of the C-shaped bar section opens towards the rear of the frame 310. In the illustrated example, the first, second, and third bar portions are continuously connected to partially surround the joystick 800a.

With particular reference again to FIG. 24, the reference bar 802 can include a first support 850 and a second support 852. The first support 850 is coupled between the first bar portion 840 and the control panel 805 and a second support 852 is coupled between the second bar portion 842 and the control panel 805. The first support 850 can include a first support portion 854 and a second support portion 856. The first support portion 845 extends away from the control panel 805 and the second support portion 856 extends rearward and away from the first bar portion 840 to meet the first support portion 856 at a bend 858. The bend 858 between the first and second support portions 854, 856 defines an angle δ that can allow an operator to more easily grasp the reference bar 802, with fingers wrapped around the first bar portion 840. In some cases, the angle δ can be less than 175 degrees (e.g., about 150 degrees or less, about 125 degrees or less, etc.).

Similarly, the second support 852 can include a third support portion 860 and a fourth support portion 862. The third support portion 860 extends away from the control panel 805 and the fourth support portion 862 extends forward and away from the second bar portion 842 to meet the third support portion 860 at a bend 864. The bend 864 between the third and fourth support portions 860, 862 can also define an angle γ that can allow an operator to more easily grasp the reference bar 802, with fingers wrapped around the first bar portion 840. In some cases, the angle γ can be less than 175 degrees (e.g., about 165 degrees or less, about 140 degrees or less, etc.). According to the illustrated embodiment, the first support portion 854 of the first support 850 and the third support portion 860 of the second support 852 can also away from the joystick 800*a*.

The joysticks 800 and the operator station 350, as noted above, can provide an ergonomic interface for a wide range of operators of the loader. For example, the operator station 350 described herein can provide an ergonomic interface for operators between 5'4" and 6'4". According to some examples, the operator station 350 described herein can be configured to provide a comfortable operating position for the hands and arms of the operator. For example, the angle of the elbow of the operator, with the joysticks 800 in a neutral position, can be greater than 90 degrees. Additionally, the operator station 350 can be configured such that the middle finger of the operator is in line with the arm of the operator, providing a neutral wrist position when the operator is grasping the joysticks 800 in the neutral position.

In some cases, a power machine may experience increased lateral loading at its track assemblies due to the friction between the track assemblies and a support surface, particularly where a power machine has a narrow track configuration or when performing stationary turns (e.g., by driving a left track assembly and a right track assembly at approximately equal speeds in opposite directions, as can rotate the power machine with substantially no forward or rearward movement). Friction during turning can be greater on harder surfaces as compared with softer surfaces that can deform more under the power machine during turning. Generally, harder surfaces can include concrete, asphalt, or other surfaces that do not substantially deform under loading by a power machine, or that are harder than the track material so that the track primarily deforms rather than the support surface, whereas softer surfaces can include uncompacted dirt, turf, loose gravel, or mud, etc.

Figure 29:
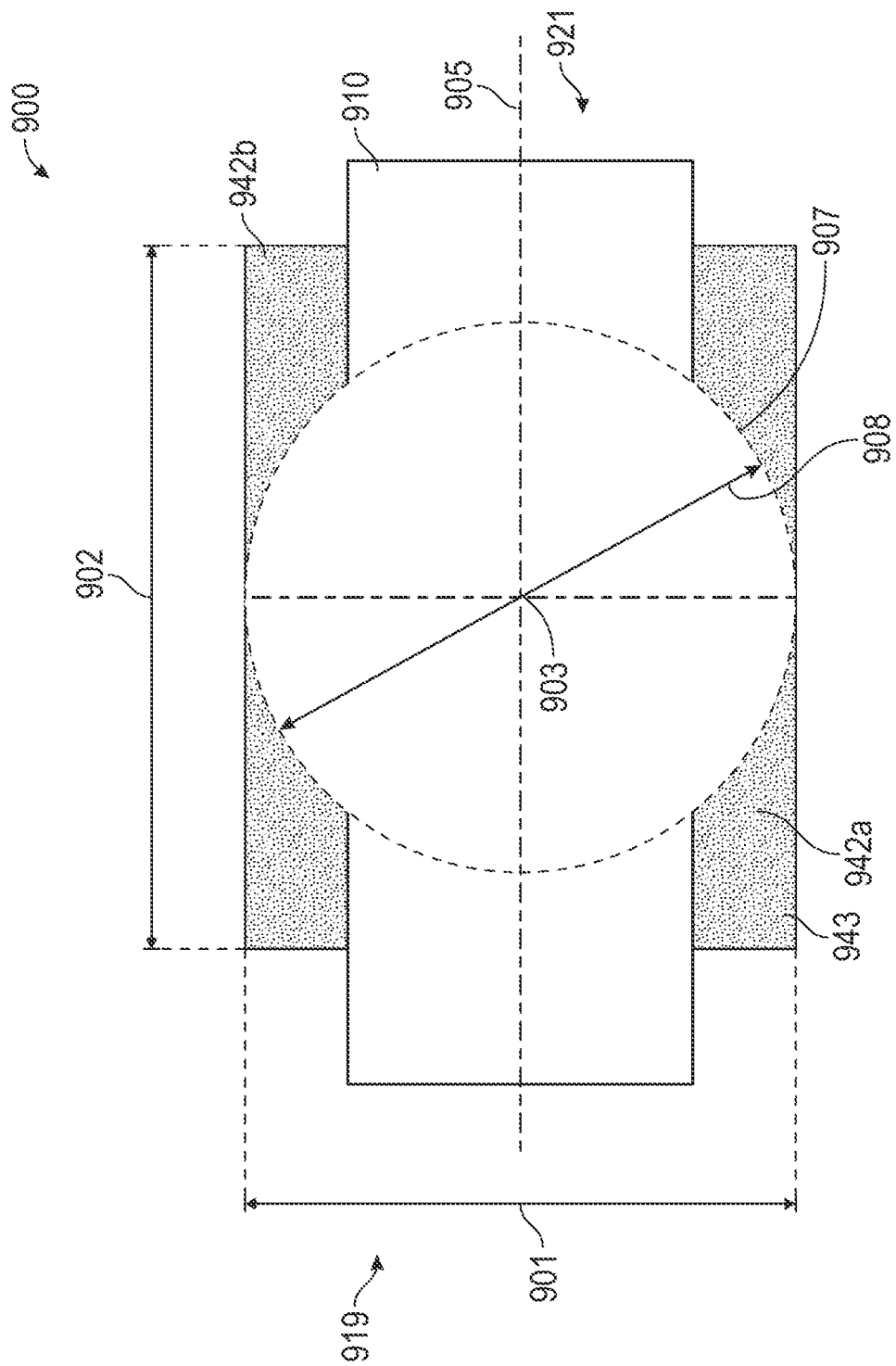
FIG. 29 illustrates a schematic top view of a power machine on which embodiments of the present disclosure can be advantageously practiced.

Some implementations of the technology disclosed herein can decrease friction on track assemblies during turning or otherwise similarly improve tractive performance of a track-driven power machine. For example, FIG. 29 illustrates a loader 900 configured as a mini-loader with a narrow track configuration (although wide track configurations are also possible). The loader 900 includes a first, left track assembly 942A and a second, right track assembly 942B (collectively track assemblies 942) that are operatively supported on opposing left and right lateral sides of a frame 910, respectively, and which extend in a front-to-back direction between a front end 919 and a back end 921 of the frame 910. The loader 900 defines a vehicle width 901 between the laterally outside edges of each of the left track assembly 942A and the right track assembly 942B, as well as a wheelbase 902 corresponding to a center-to-center distance between forward and rear idlers of a track assembly.

During a stationary turn, the left track assembly 942A and the right track assembly 942B can be counter-rotated to cause the loader 900 to pivot in a desired direction (e.g., clockwise or anti-clockwise with respect to FIG. 29), about a pivot axis 903. As illustrated, the pivot axis 903 can be positioned along a longitudinal plane 905 passing vertically through a longitudinal axis of the loader 900 (e.g., centrally along the vehicle width 901). Correspondingly, the loader 900 further defines a minimum turning circle 907 with a diameter 908 equal to the vehicle width 901.

As the loader 900 performs a stationary turn or near-stationary turn (e.g., with only one track rotating or with the two tractive assemblies rotating in opposite directions), the portions of the track assemblies 942 that are located radially outside of the turning circle 907 (e.g., see shaded areas of track assemblies 942 in FIG. 29) can experience high lateral loads, as compared with the portions of the track assemblies 942 that are located radially inside of the turning circle 907. Among other sources, these lateral loads can result from the laterally oriented frictional forces between the tractive assemblies 942 and a support surface, caused by the radially exterior portions of the tractive assemblies 942 dragging across the support surface.

Correspondingly, by reducing contact between a tractive element and a support surface outside of a turning circle (or otherwise at forward or rearward portions of a track), the lateral loading on the tractive element can also be reduced. Accordingly, as will be described in greater detail below, the track assemblies 942 are configured with roller and idler spacing that can help to reduce contact between the track assemblies 942 and a hard (or other) support surface outside of the turning circle 907 to improve turning. In the following description, only aspects of the left track assembly 942A will be expressly described. However, the right track assembly 942B can also generally include the same components, arranged in a similar manner.

Figure 30:
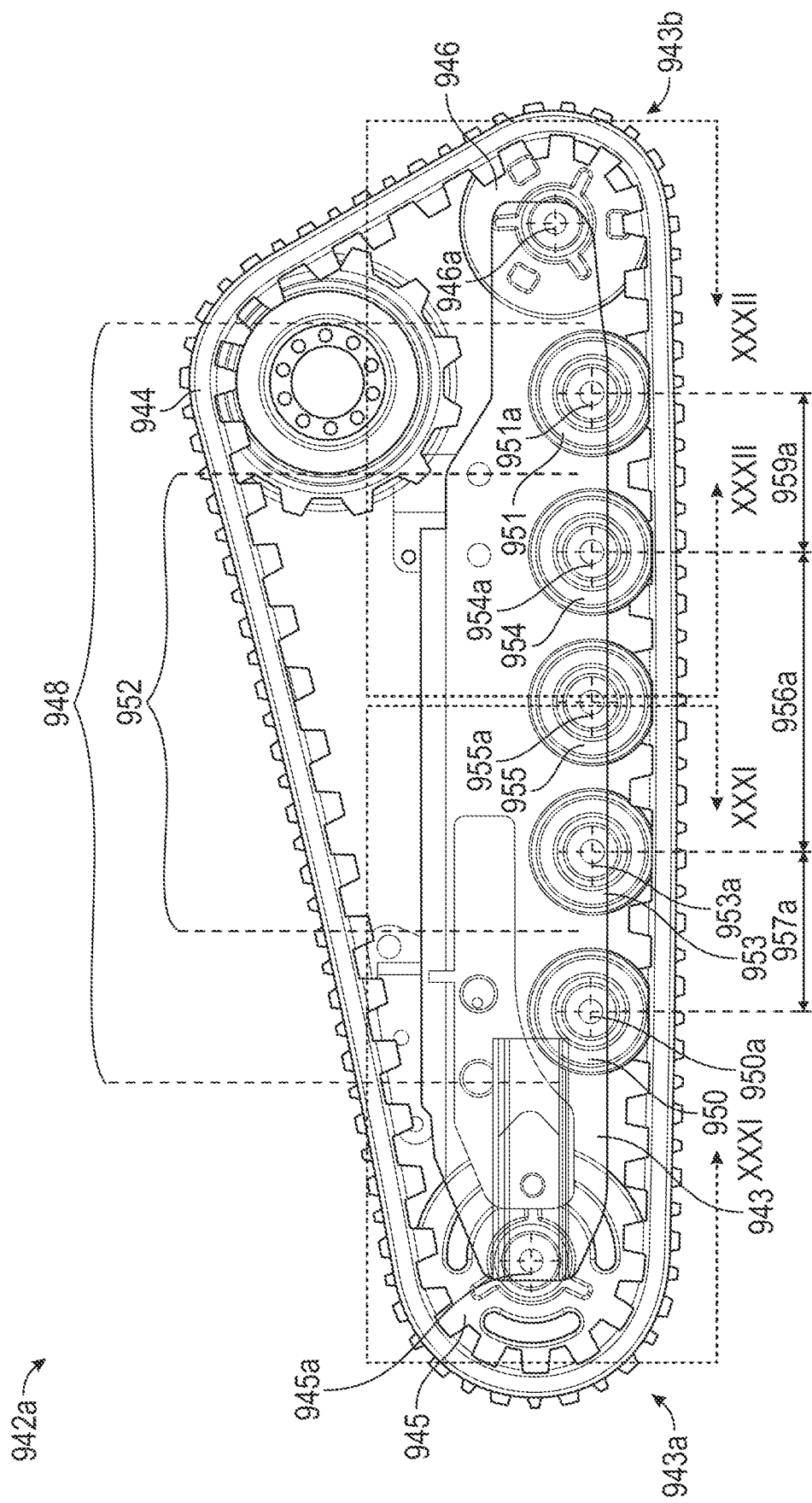
FIG. 30 illustrates a side view of a track assembly for a power machine on which embodiments of the present disclosure can be advantageously practiced.

Referring now to FIG. 30, the track assembly 942*a* includes track frame 943 that supports and is surrounded by an endless track 944, which rotates under power to propel the loader 900 over a support surface. To help keep the track 944 aligned as it rotates on the track frame 943, the track assembly 942*a* includes a first idler 945 (e.g., a front idler) rotatably coupled at a first end 943*a* (e.g., a front end) of the track frame 943 to rotate about a first idler axis 945*a*, and a second idler 946 (e.g., a rear idler) rotatably coupled at a second end 943*b* (e.g., a rear end) of the track frame 943 to rotate about a second idler axis 946*a*.

In addition, to support and distribute the weight of the loader 900 (e.g., the total unloaded weight of the loader plus the weight of a load being carried, including an operator), the track frame 943 also includes a plurality of rollers 948, which engage the track 944 and, through the track 944, the support surface, to support and distribute the weight of the loader 900. Each of the plurality of rollers 948 is rotatably coupled to the track frame 943 and arranged sequentially in a front-to-back direction between the first idler axis 945*a* and the second idler axis 946*a*. Here, the plurality of rollers 948 includes a first roller 950 (e.g., a front roller) configured to rotate about a first roller axis 950*a*, a second roller 951 (e.g., a rear roller) configured to rotate about a second roller axis 951*a*, and a plurality of intermediary rollers 952 arranged in a front-to-back direction between the first roller axis 950*a* and the second roller axis 951*a*. Accordingly, the first roller 950 is positioned so that the first roller axis 950*a* is closer to the first idler axis 945*a* than are any of the other rollers 948 (e.g., the axes of the second roller 951 and the intermediary rollers 952), and the second roller 951 is positioned so that the second roller axis 951a is closer to the second idler axis 946a than are any of the other rollers 948 (e.g., the axes of the first roller 950 and the intermediary rollers 952).

More specifically, the plurality of intermediary rollers 952 includes a third roller 953 (e.g., a first or front intermediary roller) configured to rotate about a third roller axis 953a and a fourth roller 954 (e.g., a second or rear intermediary roller) configured to rotate about a fourth roller axis 954a. The third roller axis 953a is positioned closer to the first roller axis 950a than is the fourth roller axis 954a and the fourth roller axis 954a is positioned closer to the second roller axis 951a than is the third roller axis 953a. Further, in some cases, the plurality of intermediary rollers 952 can further include one or more fifth rollers 955 each configured to rotate about a corresponding fifth roller axis 955a and arranged between the third roller 953 and the fourth roller 954. Here, the plurality of intermediary rollers 952 include a single fifth roller 955.

Figure 31:
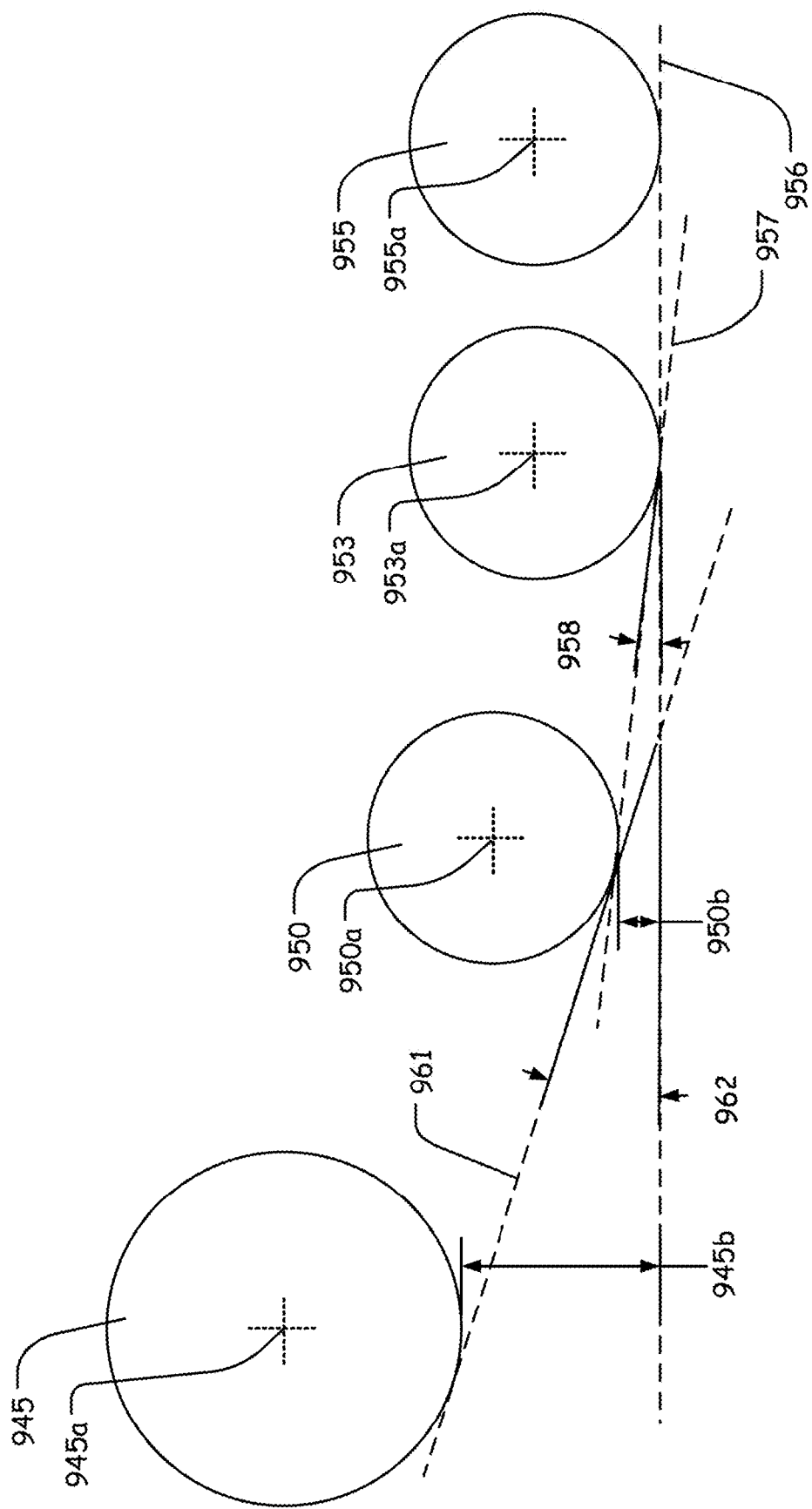
FIG. 31 illustrates a schematic detail view of the track assembly of FIG. 30, taken about line XXXI-XXXI.
Figure 32:
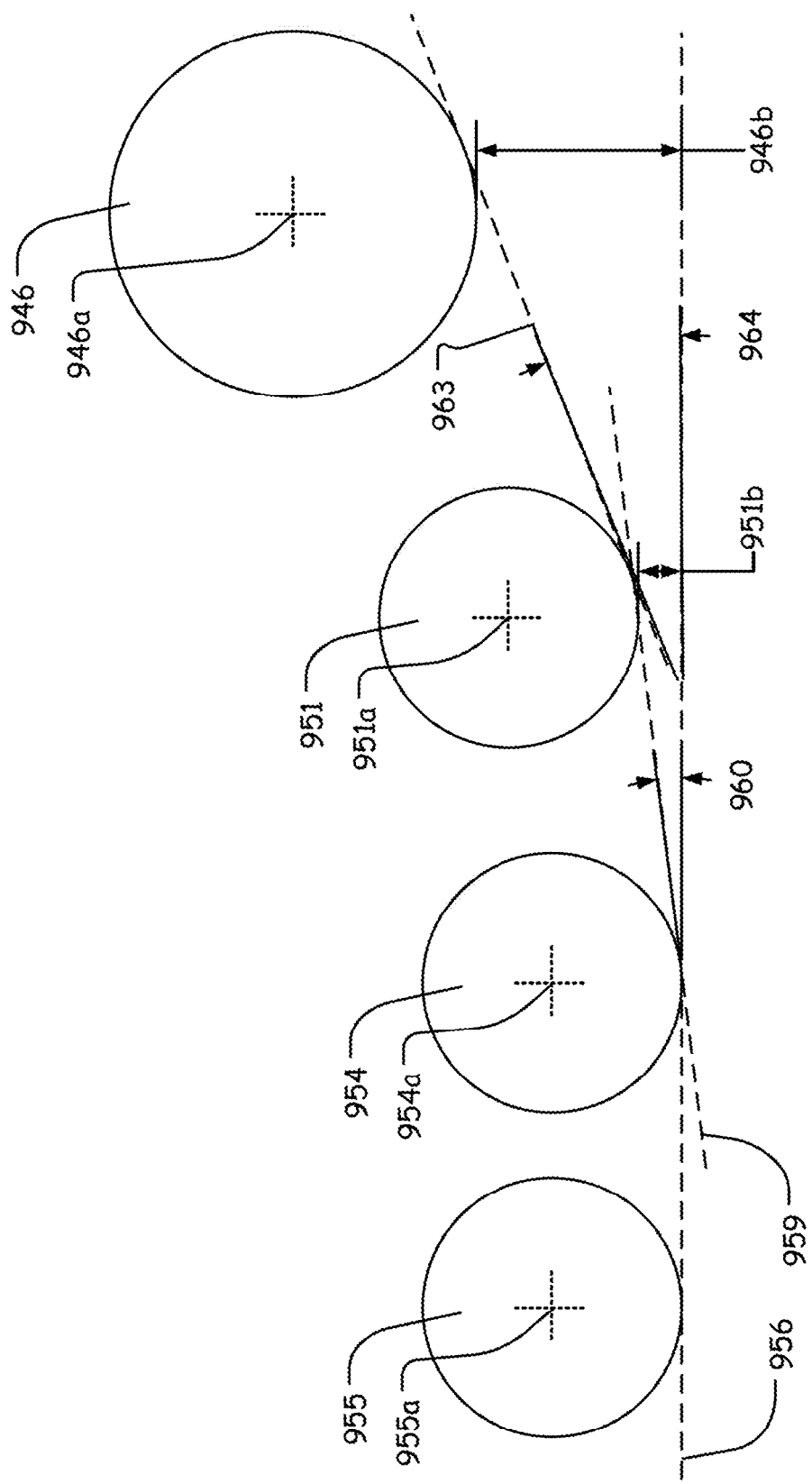
FIG. 32 illustrates a schematic detail view of the track assembly of FIG. 30, taken about line XXXII-XXXII.

Because rollers engage a track to distribute a downward force of a total weight of a loader to a support surface, the rollers on a track assembly can be arranged so that portions of a track that are outside of a turning circle of the loader can be spaced from the support surface (e.g., can be disposed with an upward offset relative to other rollers). As also discussed above, this can help to reduce excess lateral loading during a stationary turn, particularly when the loader is on a hard surface. For example, as illustrated in FIGS. 31 and 32, the track assembly 942a defines a first plane 956 (e.g., an intermediary plane) that is tangent to a lower surface of each of the intermediary rollers 952 that contacts the inner surface of the track 944. Correspondingly, a patch of the track 944 aligned along the plane 956 for a given rotational orientation of the track 944 defines a first contact portion 956a of the track assembly 942a (e.g., an intermediary or central contact portion) between the third roller 953 and the fourth roller 954, which is parallel and offset below the first plane 956 (e.g., toward the support surface), and along which the track 944 contacts the support surface when the first plane 956 is substantially parallel with the support surface. As further detailed below, support of the loader 900 along the contact portion 956a can correspond with neutral loading of the loader 900.

With particular reference to FIG. 31, the first roller 950 is offset from the first plane 956 so that a lower surface of the first roller 950 is vertically spaced from the first plane 956 by a first roller distance 950b. Correspondingly, the track assembly 942a further defines a second plane 957 (e.g., a front plane) that is tangent to a lower surface of each of the first roller 950 and the third roller 953. Because the first roller 950 is offset from the first plane 956, the second plane 957 is angled relative to the first plane 956 at a first angle 958 (e.g., between 0 degrees and 5 degrees) and defines a corresponding second contact portion 957a (e.g., a front contact portion, see FIG. 30), and a corresponding track patch, between the first roller 950 and the third roller 953. In particular, in the illustrated example, the contact portion 957a is parallel to and offset below the second plane 957, at which the track 944 contacts the support surface when the second plane 957 is substantially parallel with the support surface (e.g., when the loader 900 is front loaded).

Similarly, with particular reference to FIG. 32, the second roller 951 is offset from the first plane 956 so that a lower surface of the second roller 951 is vertically spaced from the first plane 956 by a second roller distance 951b. Correspondingly, the track assembly 942a further defines a third plane 959 (e.g., a rear plane) that is tangent to a lower surface of each of the second roller 951 and the fourth roller 954. Because the second roller 951 is offset from the first plane 956, the third plane 959 is angled relative to the first plane 956 at a second angle 960 (e.g., between 0 degrees and 5 degrees) and defines a third contact portion 959a (e.g., a rear contact portion, see FIG. 30) between the second roller 951 and the fourth roller 954. In particular, in the illustrated example, the contact portion 959a is parallel to and offset below the third plane 959, at which the track 944 contacts the support surface when the third plane 959 is substantially parallel with the support surface (e.g., when the loader 900 is rear loaded).

Depending on the specific configuration, vertical spacing of rollers from an intermediate (e.g., neutral-loading) plane may vary. In particular, vertical spacing for rollers can be selected to balance hard surface performance with soft surface performance. That is, the vertical spacing of rollers can selected to be large enough to reduce contact and friction on hard surfaces while allowing full track engagement on soft surfaces (e.g., so that the weight of loader is sufficient to cause the loader to sink into the support surface so that the track are in contact with the support surface along substantially all of the wheelbase). In that regard, the vertical spacing can be selected to be at a specific value or to achieve a particular angle between planes (e.g., between an intermediary plane and each of a front plane and a rear plane). For example, in the illustrated embodiment, each of the first roller distance 950b and the second roller distance 951b (see FIGS. 31 and 32) can range between 0.5 millimeters and 4.0 millimeters, or more specifically, approximately 2.0 millimeters.

In some embodiments, the first roller distance 950b and the second roller distance 951b can be substantially equal to each other. In some embodiments, the first roller distance 950b and the second roller distance 951b can be different from one another. Further, in some embodiments, it is possible that other rollers may also be spaced from the first plane 956, for example to be tangent to one of the second plane 957 or the third plane 959, or to define any number of additional planes that are angled relative to the first plane 956.

In some embodiments, idlers may also be vertically spaced from an intermediary plane to ensure that weight of the loader is not distributed to a support surface by the idlers during normal operation, which may result in decreased ride quality (e.g., increased noise and vibration). For example, in the example illustrated in FIG. 31, the first idler 945 is offset from the first plane 956 so that a lower surface of the first idler 945 is vertically spaced from the first plane 956 by a first idler distance 945b. Correspondingly, the track assembly 942a further defines a fourth plane 961 (e.g., a front elevation plane) that is tangent to a lower surface of each of the first roller 950 and the first idler 945. The fourth plane 961 is angled relative to the first plane 956 at a third angle 962. Similarly, as shown in the example illustrated in FIG. 32, the second idler 946 is offset from the first plane 956 so that a lower surface of the second idler 946 is vertically spaced from the first plane 956 by a second idler distance 946b. Correspondingly, the track assembly 942a further defines a fifth plane 963 (e.g., a rear elevation plane) that is tangent to a lower surface of each of the second roller 951 and the second idler 946. The fifth plane 963 is angled relative to the first plane 956 at a fourth angle 964.

Generally, it may be preferable that the first idler distance 945b is greater than the first roller distance 950b so that the third angle 962 is greater than the first angle 958. Similarly, it may be preferable that the second idler distance 946b is greater than the second roller distance 951b so that the fourth angle 964 is greater than the second angle 960. In this regard, for example, the first idler distance 945b and the second idler distance 946b can range between 4.0 millimeters and 8 millimeters, or more specifically, approximately 6.0 millimeters.

Continuing, the offset configuration of rollers, as generally discussed above, can help to reduce friction between a track and a hard support surface, including as the front-to-back position of a center of gravity of a loader (e.g., due to changing loading) can cause the loader to apply tractive force to the support surface primarily along only a specific patch of the track (e.g., primarily at a specific contact portion). For example, due to the roller configuration of the track assembly 942a, the loader 900 may apply tractive force primarily along each of the first contact portion 956a, the second contact portion 957a, or the third contact portion 959a, depending on a front-to-back position of a center of gravity 966 of the loader 900 in any particular loaded (or unloaded) state.

Figure 33:
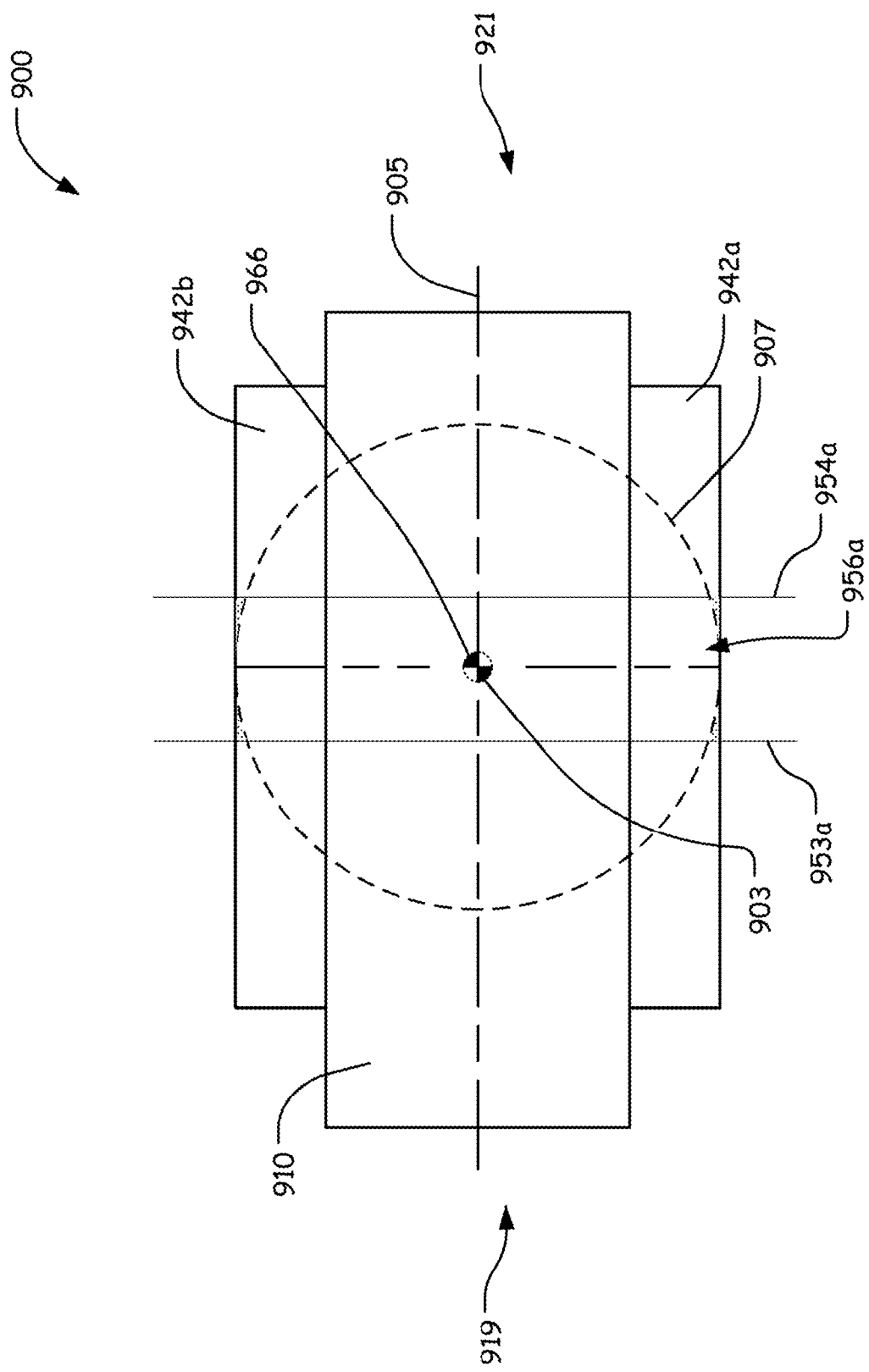
FIG. 33 illustrates a schematic top view of the power machine of FIG. 29 in a neutral loaded state.

In particular, with additional reference to FIG. 33, the loader 900 is illustrated in a first loaded state (e.g., a neutral loaded state). As used herein, a neutral loaded state indicates that an operational (e.g., as loaded) center of gravity of a loader is vertically above an intermediary contact portion of a tractive assembly so that the intermediary contact portion is substantially parallel with the support surface. Correspondingly, the weight of the loader is distributed on the support surface primarily along the intermediate contact portion in the neutral loaded state.

For example, when the loader 900 is in the first (e.g., neutral) loaded stated, the center of gravity 966 can be positioned between the third roller axis 953a and the fourth roller axis 954a, so that the center of gravity 966 is vertically above the first contact portion 956a (e.g., vertically above the intermediary rollers 952, between the third roller axis 953a and the fourth roller axis 954a in a front-to-back direction). In the neutral loaded state, the first plane 956 can be substantially parallel with a support surface so that the weight of the loader 900 can be distributed to the support surface primarily at the first contact portion 956a, and so that a tractive force can be applied primarily at the first contact portion 956a. As illustrated, the center of gravity 966 can be aligned with the pivot axis 903 of the loader 900, but this may not always be the case depending on the specific weight distribution of the loader 900.

Correspondingly, the total weight of the loader 900 can be distributed to the support surface at the first contact portion 956a, primarily by the intermediary rollers 952. Because the second, third, fourth, and fifth planes 957, 959, 961, 963 are angled relative to the first plane 956 and away from the support surface, the portions of the track 944 forward of the third roller axis 953a (e.g., between the first idler axis 945a and the first roller axis 950a, and between the first roller axis 950a and the third roller axis 953a) and rearward of the fourth roller axis 954a (e.g., between the second idler axis 946a and the second roller axis 951a, and between the second roller axis 951a and the fourth roller axis 954a) will be spaced from the support surface by more than first contact portion 956a. Correspondingly, the loader can exhibit reduced contact between the support surface and the portions of the track 944 that are radially outside of the turning circle 907 than with otherwise comparable conventional track assemblies. Put another way, because of the vertical offset of the various rollers, the portions of the track 944 along each of the second contact portion 957a and the third contact portion 959a may not contact the support surface in the first (e.g., neutral) loaded state.

Figure 34:
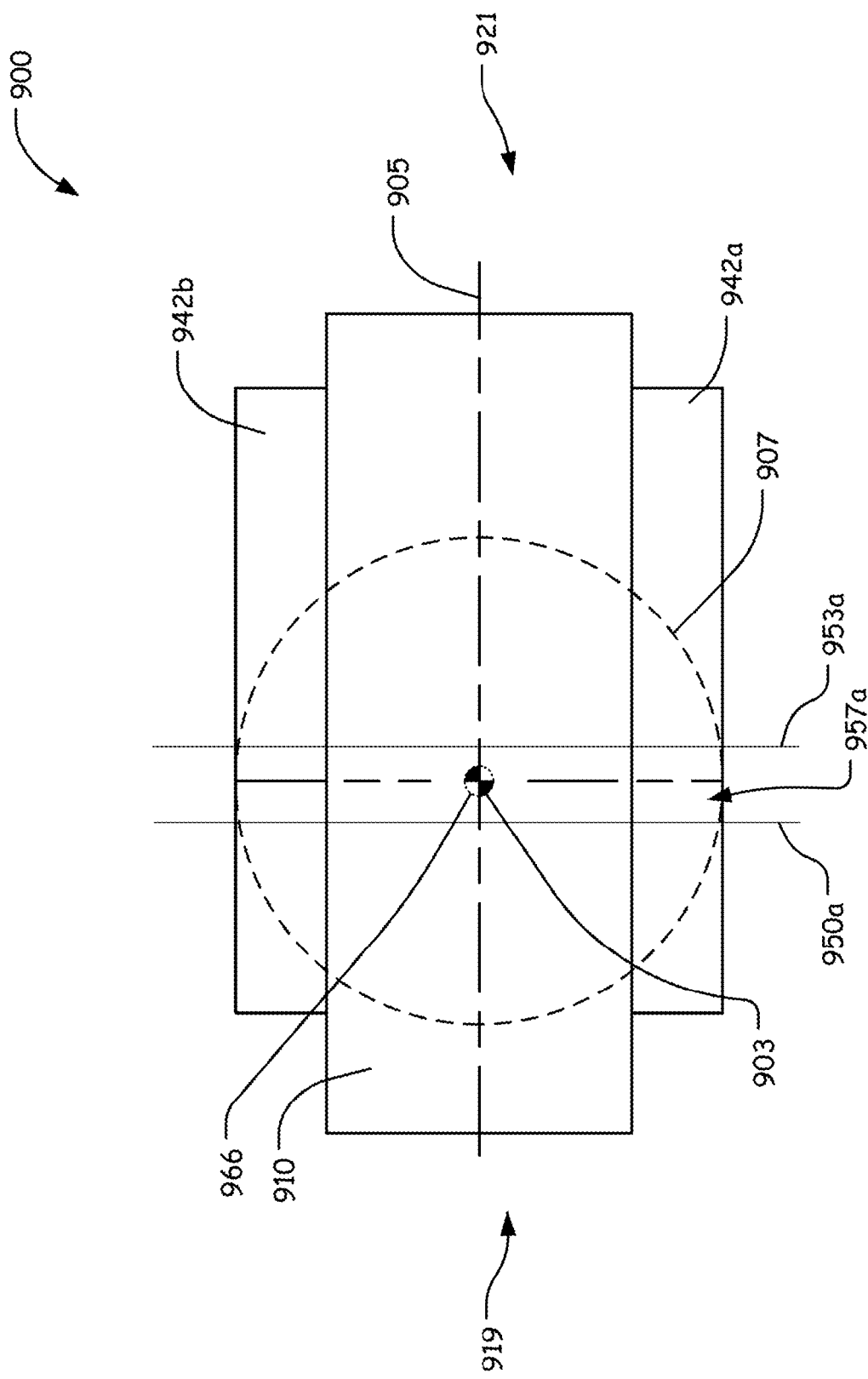
FIG. 34 illustrates a schematic top of the power machine of FIG. 29 in a front loaded state.

Similarly, referring now to FIG. 34, the loader 900 is illustrated in a second loaded state (e.g., a front loaded state). As used herein, a front loaded state indicates that an operational (e.g., as loaded) center of gravity of a loader is vertically above or forward of a front contact portion (e.g., to be forward of an intermediary contact portion) of a tractive assembly so that the front contact portion is substantially parallel with the support surface. Correspondingly, the weight of the loader is distributed on the support surface primarily along the front contact portion in the front loaded state.

For example, when the loader 900 is in the second (e.g., front) loaded state, the center of gravity 966 can be positioned closer to the front end 910a of the loader than is the third roller axis 953a (e.g., between the third roller axis 953a and the first idler axis 945a). More specifically, the center of gravity 966 can be positioned vertically over the second contact portion 957a (e.g., between the first roller axis 950a and the third roller axis 953a), or forward of the second contact portion 957a (e.g., forward of the first idler axis 950a). In the front loaded state, the second plane 957 can be substantially parallel with a support surface so that the weight of the loader 900 can be distributed to the support surface primarily at the second contact portion 957a, and so that a tractive force can be applied primarily at the second contact portion 957a. Correspondingly, the turning circle 907 is effectively shifted forward (e.g., to be centered front-to-back between the third roller axis 953a and the first roller axis 950a) and the total weight of the loader 900 can be distributed to the support surface primarily by the first roller 950 and the third roller 953.

Because the first, third, fourth, and fifth planes 956, 959, 961, 963 are angled relative to the second plane 957 and away from the support surface, the portions of the track 944 forward of the first roller axis 950a (e.g., between the first idler axis 945a and the first roller axis 950a) and rearward of the third roller axis 953a (e.g., between the second idler axis 946a and the second roller axis 951a, between the second roller axis 951a and the fourth roller axis 954a, and between the third roller axis 953a and the fourth roller axis 954a) will be spaced from the support surface by more than the second contact portion 957a. Correspondingly, the loader can exhibit reduced contact between the support surface and the portions of the track 944 that are radially outside of the turning circle 907. Put another way, because of the vertical offset of the various rollers, the portions of the track 944 along each of the first contact portion 956a and the third contact portion 959a may not contact the support surface in the second (e.g., front) loaded state.

Figure 35:
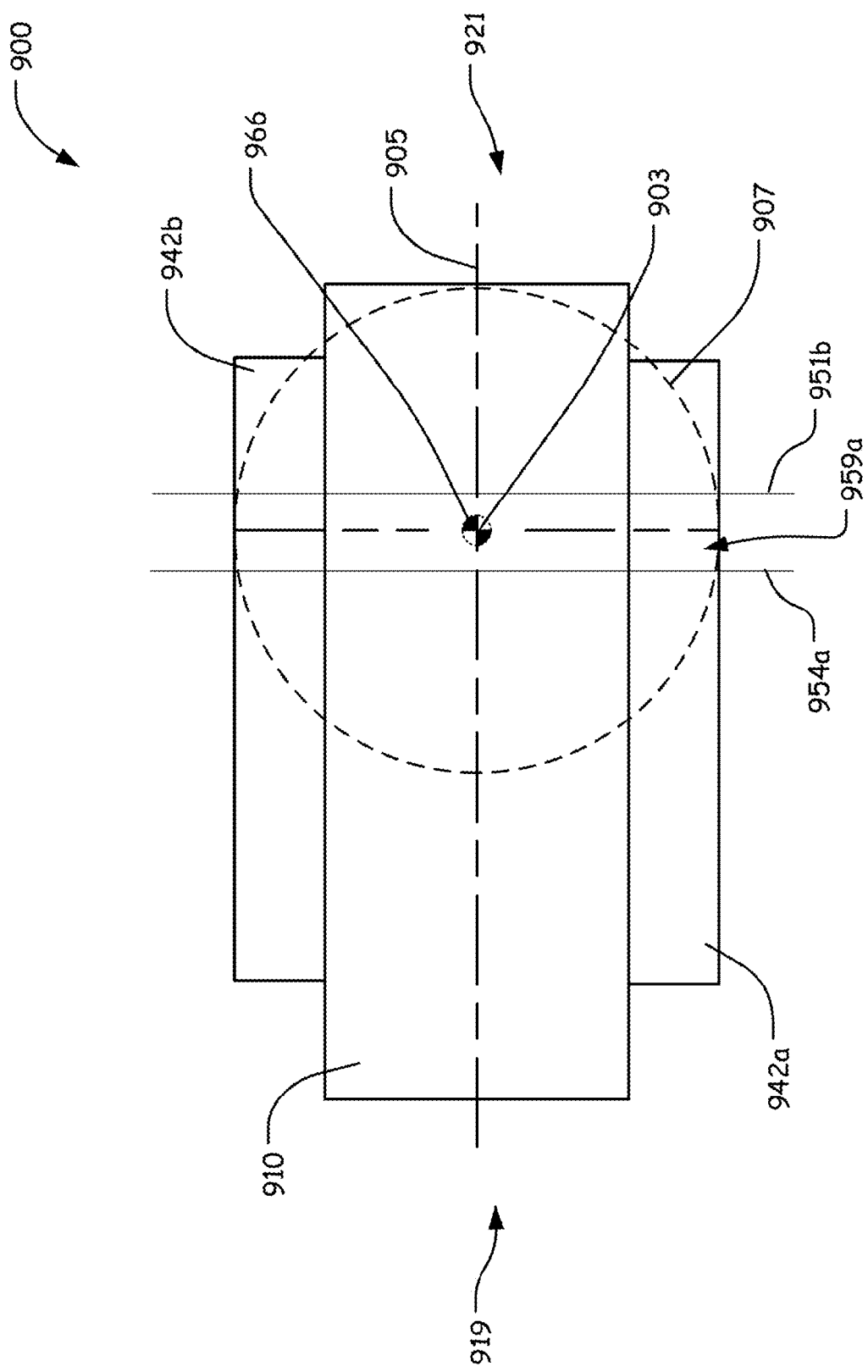
FIG. 35 illustrates a schematic top view of the power machine of FIG. 29 in a rear loaded state.

Likewise, referring now to FIG. 35, the loader is illustrated in a third loaded state (e.g., a rear loaded state). As used herein, a rear loaded state indicates that an operational (e.g., as loaded) center of gravity of a loader is vertically above or rearward of a rear contact portion (e.g., to be rearward of an intermediary contact portion) of a tractive assembly so that the rear contact portion is substantially parallel with the support surface. Correspondingly, the weight of the loader is distributed on the support surface primarily along the rear contact portion in the rear loaded state.

For example, when the loader 900 is in the third (e.g., rear) loaded state, the center of gravity 966 can be positioned closer to the back end 910b of the loader 900 than is the fourth roller axis 954a (e.g., between the fourth roller axis 954a and the second idler axis 946a). More specifically, the center of gravity 966 can be positioned vertically over the third contact portion 959a (e.g., between the second roller axis 951a and the fourth roller axis 954a), or rearward of the second contact portion 959a (e.g., rearward of the second idler axis 951a). In the rear loaded state, the third plane 959 can be substantially parallel with a support surface so that the weight of the loader 900 can be distributed to the support surface primarily at the third contact portion 959a, and so that a tractive force can be applied primarily at the third contact portion 959a. Correspondingly, the turning circle 907 is effectively shifted rearward (e.g., to be centered front-to-back between the fourth roller axis 954a and the second idler axis 946a) and the total weight of the loader 900 can be distributed to the support surface primarily by the second roller 951 and the fourth roller 954.

Because the first, second, fourth, and fifth planes 956, 957, 961, 963 are angled relative to the third plane 959 and away from the support surface, the portions of the track 944 forward of the fourth roller axis 954a (e.g., between the first idler axis 945a and the first roller axis 950a, between the first roller axis 950a and the third roller axis 953a, and between the third roller axis 953a and the fourth roller axis 954a) and rearward of the second roller axis 951a (e.g., between the second idler axis 946a and the second roller axis 951a) will be spaced from the support surface by more than the third contact portion 959a. Correspondingly, the loader can exhibit reduced contact between the support surface and the portions of the track 944 that are radially outside of the turning circle 907. Put another way, because of the vertical offset of the various rollers the portions of the track 944 along each of the first contact portion 956a and the second contact portion 957a may not contact the support surface in the third (e.g., rear) loaded state.

Turning now to FIGS. 36-39, in some embodiments, an operator platform for a loader can include a mat that is configured to improve traction in a variety of conditions, including while also providing cushioning and reducing vibrations transmitted to an operator supported on the platform (e.g., to reduce operator fatigue). For example, the illustrated loader 1000 includes an operator platform 1052 that is coupled to a frame 1010 of the loader 1000 (e.g., at a rear end of the loader 100). The platform 1052 can be made of a rigid material (e.g., steel, aluminum, or fiber reinforced composites) to support and provide traction to an operator. In that regard, the platform 1052 defines a support surface 1054 that includes a plurality of protrusions 1056 extending from the support surface 1054 to provide anti-slip contact for an operator standing on the operator platform 1052. For example, with particular reference to FIG. 39, each protrusion 1056 extends from the support surface 1054 by a protrusion height 1058 and includes a plurality of teeth 1060 to increase traction between the platform 1052 and the operator. Further, in some cases the protrusions 1056 can include an opening 1062, which can, for example, allow debris (e.g., mud, water, dirt, etc.) to pass through so as not to accumulate and thereby reduce traction between the platform 1052 and the operator.

Figure 36:
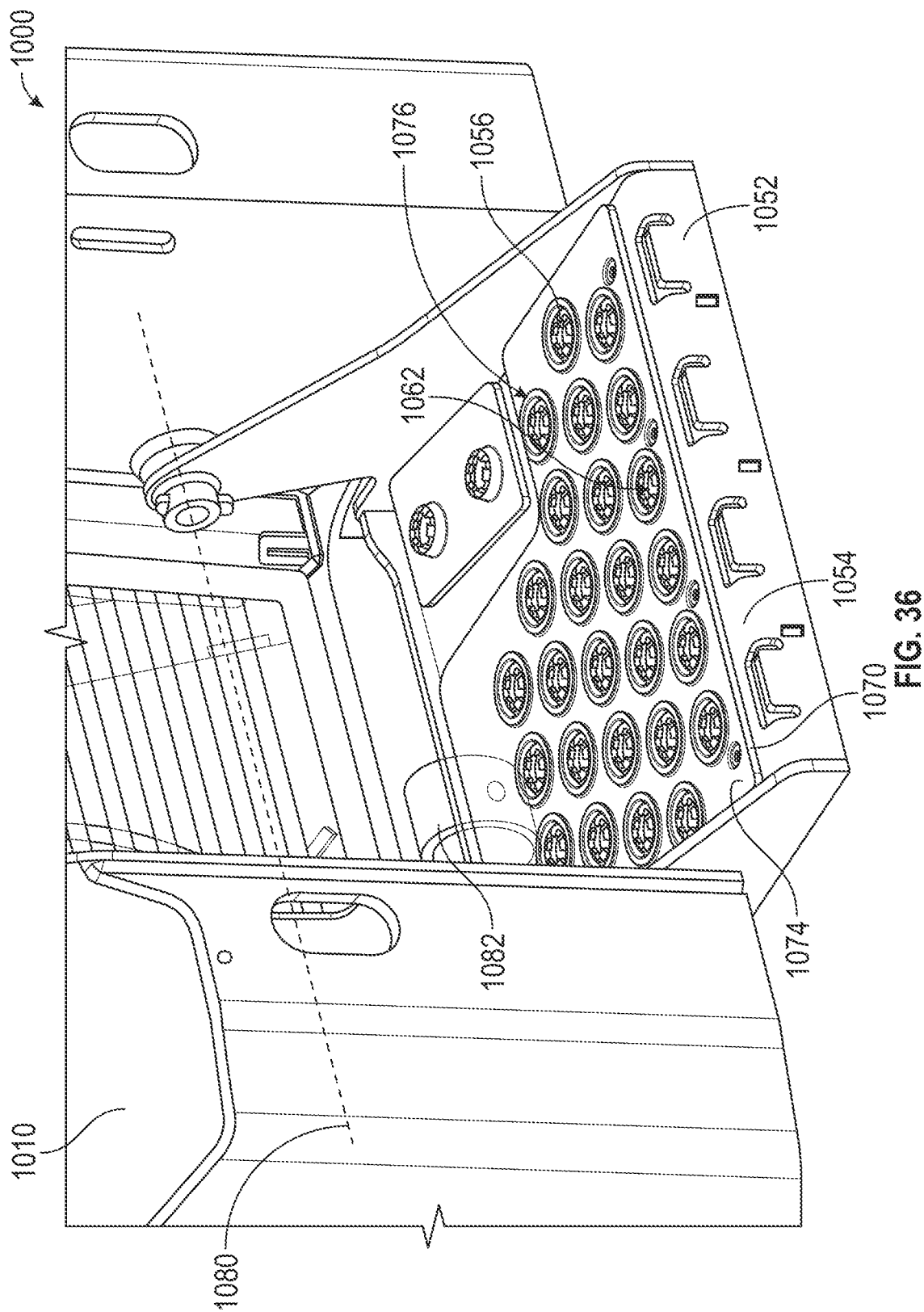
FIG. 36 illustrates a partial rear perspective view of a power machine having an operator platform with a mat according to some embodiments of the present disclosure.
Figure 37:
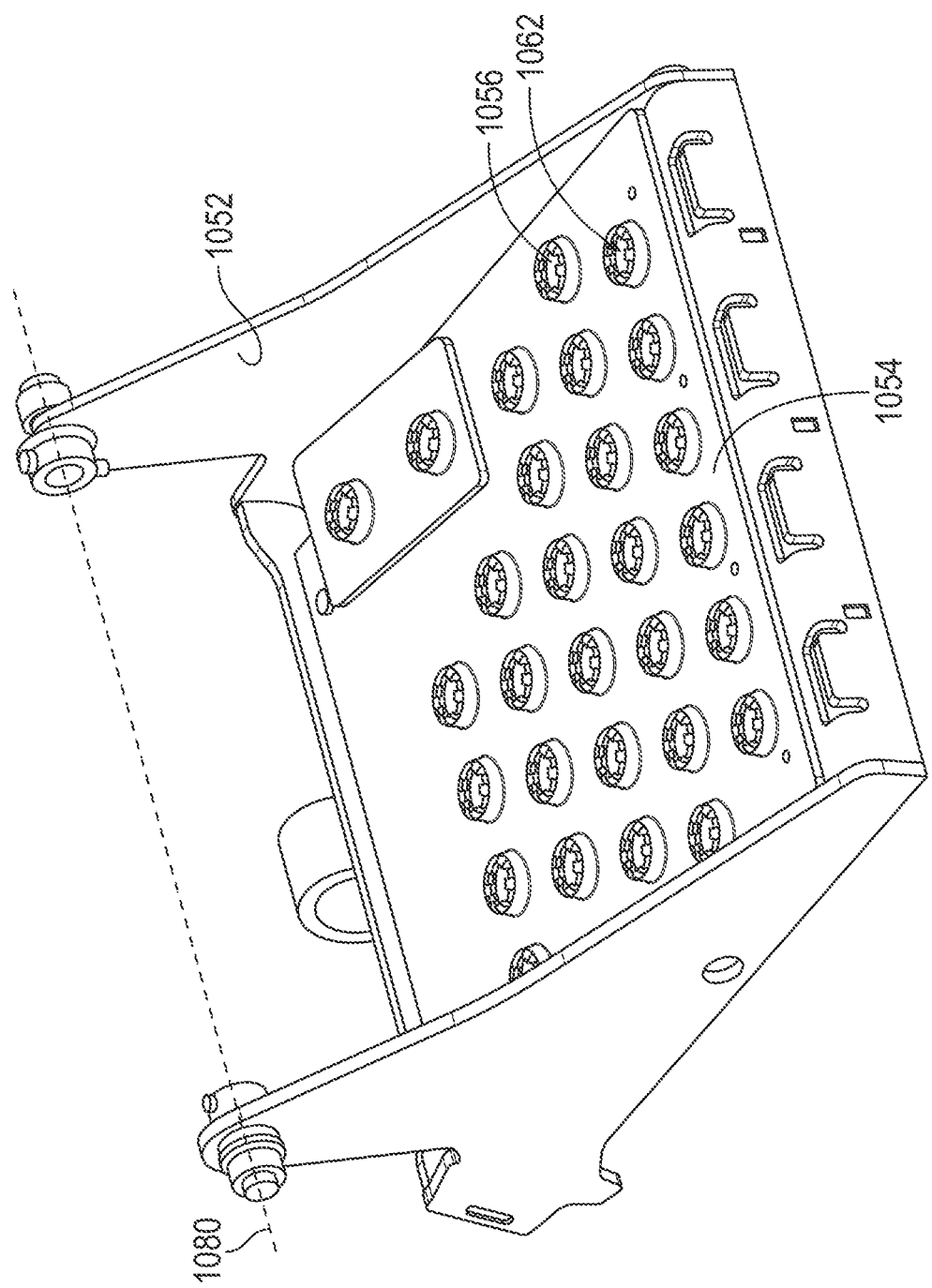
FIG. 37 illustrates a perspective view of the operator platform of FIG. 36 with the mat removed.
Figure 38:
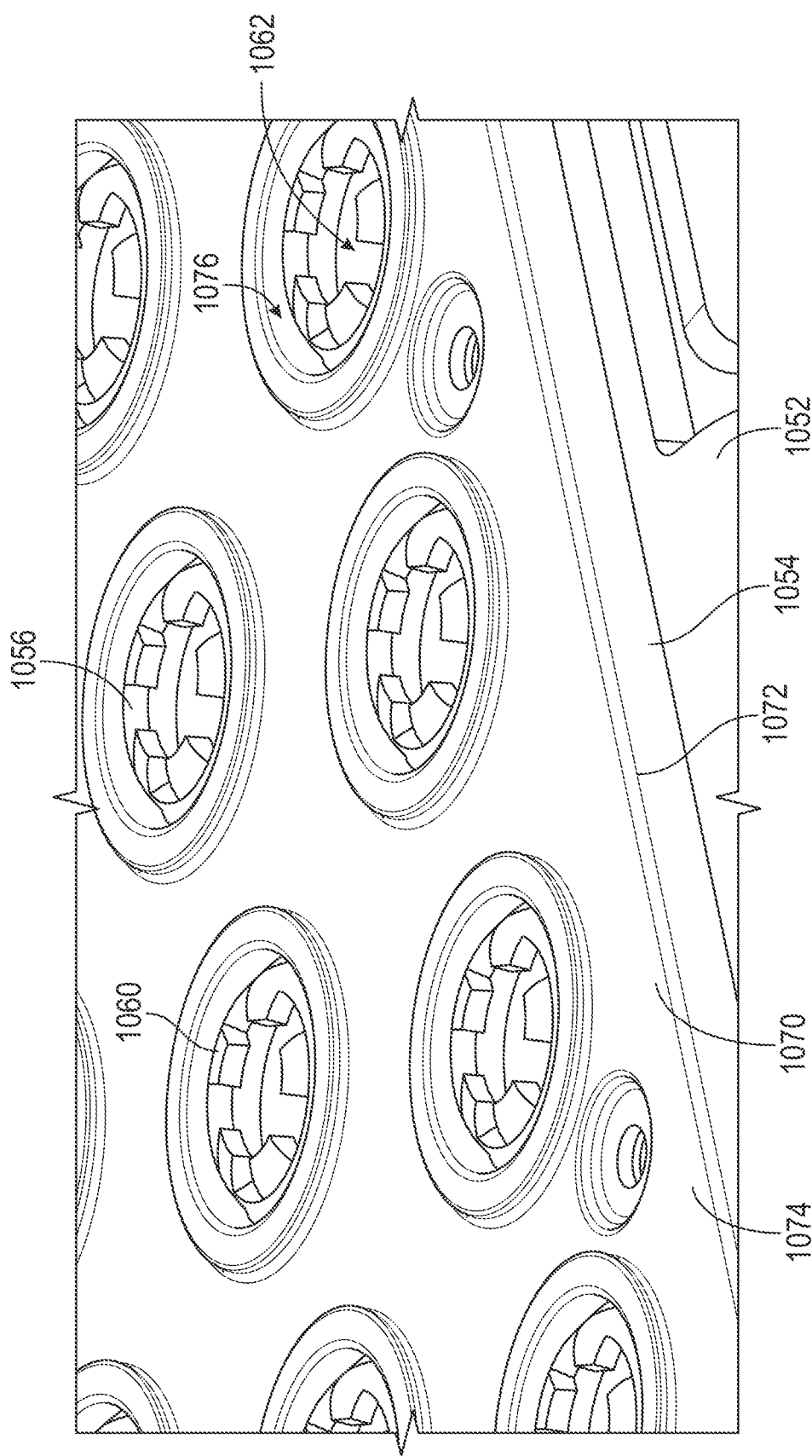
FIG. 38 illustrates a detail partial perspective view of the operator platform and mat of FIG. 36 illustrating protrusions extending into holes defined in the mat.
Figure 39:
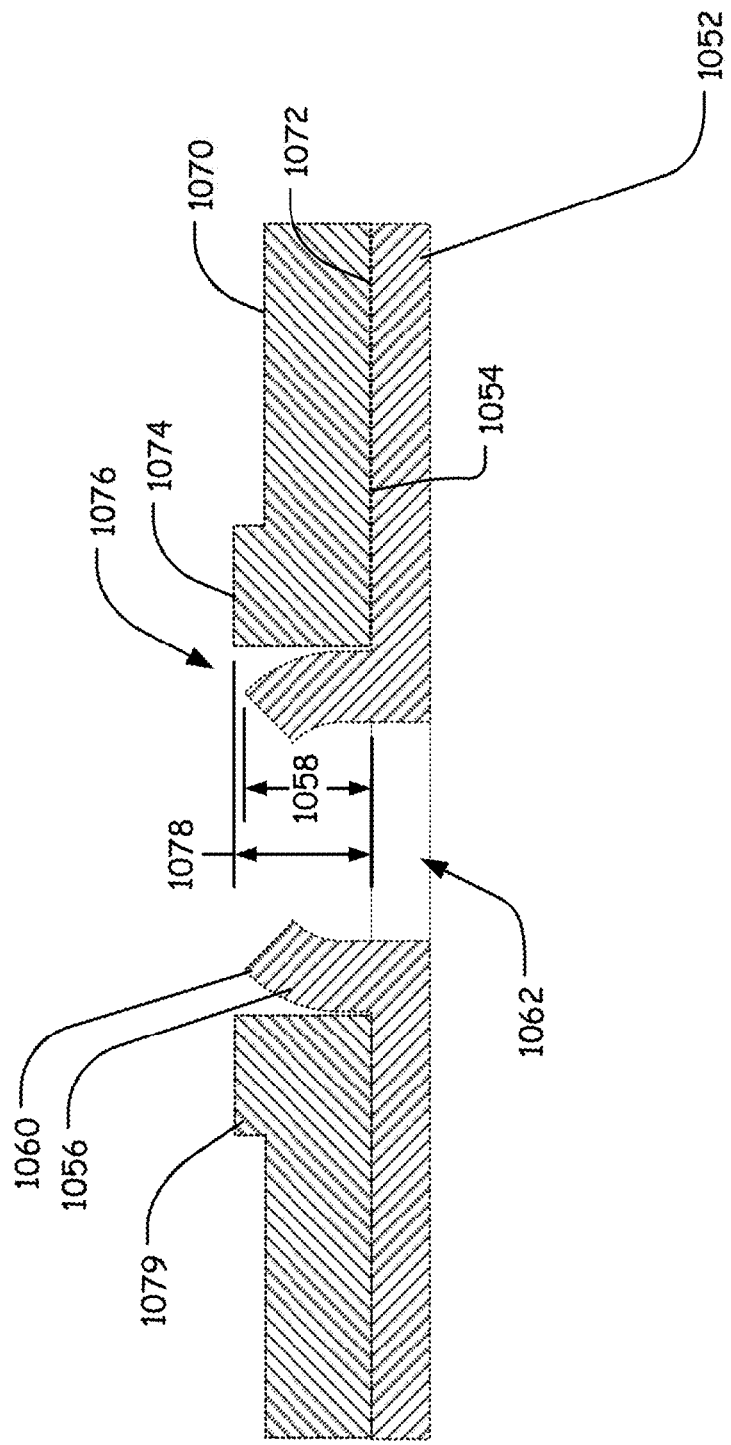
FIG. 39 illustrates a section view of the part of the operator platform and mat of FIG. 36.

As shown in FIGS. 36, 38, and 39 in particular, a mat 1070 can be seated on the support surface 1054 to further improve traction and operator comfort. More specifically, as shown in FIGS. 38 and 39, the mat 1070 defines a bottom surface 1072 that is configured to contact the support surface 1054 when the mat 1070 is seated on the platform 1052. The bottom surface 1072 is opposite a top surface 1074 that is configured to support and provide traction to the operator. In some cases, the mat 1070 can be configured to be secured to the platform 1052 (e.g., by fasteners, not shown). The mat 1070 further defines a plurality of holes 1076 that extend through the mat 1070 (e.g., through-holes extending through the mat 1070 from the bottom surface 1072 to the top surface 1074). The holes 1076 are configured to receive the protrusions 1056 and may, therefore, be sized and shaped to allow the protrusions 1056 to extend through the holes 1076, so as not to inhibit the protrusions from providing anti-slip contact for the operator.

In some cases, a mat can be made of a compressible material (e.g., rubber or a polymeric foam) to help isolate the operator from vibrations that would otherwise be transmitted through the frame 1010 and platform 1052 to the operator, as well as improve traction. Correspondingly, in some cases, the mat can have a thickness that is greater than a protrusion height of a protrusion and can be configured to resiliently compress under the weight of an operator to expose the protrusion at a top surface of the mat, thereby further increasing traction while also reducing the force exerted on the operator by the protrusion (e.g., to reduce uncomfortable point loading). For example, the mat 1070 can define a thickness 1078 (see FIG. 39) between the bottom surface 1072 and a top surface 1074, which may be greater than the protrusion height 1058. Thus, with an appropriately compressible configuration for the mat 1070, when an operator steps onto the platform 1052, the operator may first contact the top surface 1074 of the mat 1070, compressing the mat 1070 and exposing the protrusions 1056. Accordingly, the operator is supported by and contacts both the mat 1070 and the protrusions 1056. In some cases, the top surface 1074 can be formed as a discrete (or other) sub-surface of the mat 1070, with an intermediate (but still upper) surface of the mat 1070 being recessed around each of the holes 1076 to form a peripheral ridge 1079 around each hole 1076. Recessing part of the mat to surround protrusions of the top surface around the holes 1076 can allow the mat 1070 to more easily compress around the holes 1076 to expose the protrusions 1056, and particularly the teeth 1060 of the protrusions 1056, for anti-slip contact.

Figure 40:
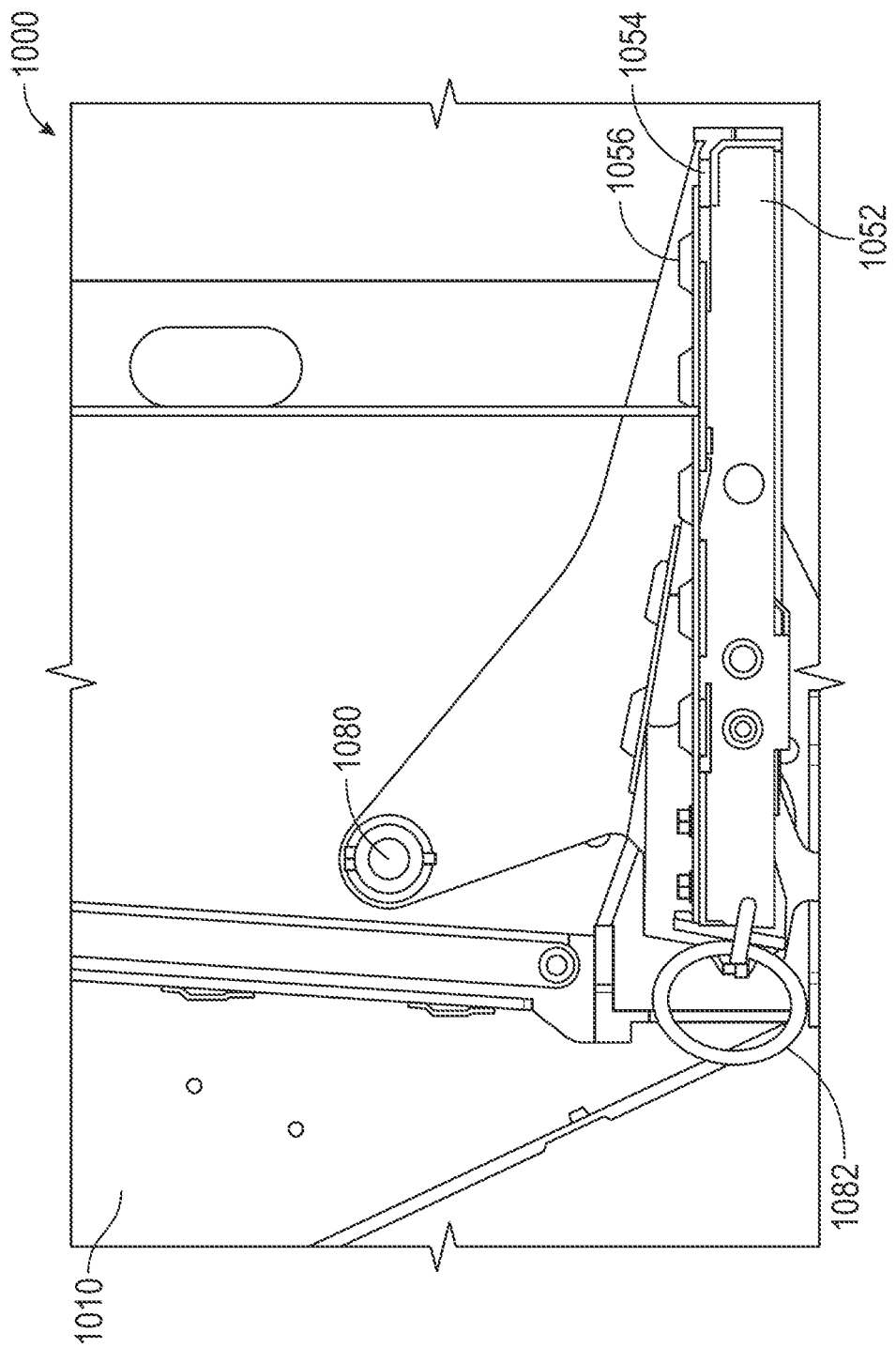
FIG. 40 illustrates a section view of part of an operator station of the power machine of FIG. 36, including the operator platform.

In some cases, to further reduce vibrations and shock (e.g., from traversing rough terrain) an operator platform can be pivotally coupled to a frame of a loader and a shock absorber may be disposed between the operator platform and the frame to absorb impact and vibrations during operation. For example, with particular reference to FIGS. 36 and 40, the mat 1070 is pivotally coupled to the frame 1010 to rotate about a pivot axis 1080. A resilient member 1082 (e.g., a shock absorber) is disposed between the platform 1052 and the frame 1010 and is configured to resist pivoting of the platform 1052 relative to the frame 1010 to generally hold the platform 1052 at a level position (e.g., a horizontal position or within 15 degrees of parallel to a support surface for the loader), as well as to attenuate any pivotal movement of the platform 1052 relative to the frame 1010 (e.g., as may result when the loader 1000 moves along a support surface). In the illustrated example, the resilient member 1082 is coupled to the frame 1010 and the platform 1052 and can be reversibly compressed and stretched between the frame 1010 and the platform 1052 to attenuate pivotal movement of the platform 1052 relative to the frame 1010. In other embodiments, a resilient member may be secured only one of a frame or a platform and can be compressed between the platform and the frame to attenuate pivotal movement of the platform relative to the frame.

Some implementations of the technology disclosed herein, including particular arrangements of lift arm structures, can provide improved routing for transmissive lines. For example, some lift arms can include particularly structured internal channels to provide improved protection and improved spatial efficiency for hoses that carry hydraulic signals to implements supported on the lift arms (e.g., removable implements supported at a distal end thereof). Similar arrangements can also be implemented for improved routing of cables for electrical signals.

As used herein reference to transmissive lines indicate lines for transmission of power or control signals, including hoses, cables, or other known configurations that can be arranged to transmit electrical current or hydraulic flow from a power source of a power machine (e.g., an onboard battery or hydraulic pump) to a power sink spaced apart from the power source. Thus, although hydraulic hoses are discussed in some examples, the same discussion generally also applies to electrical cables and other types of hydraulic or electrical lines.

Packaging and other considerations can complicate the routing of transmissive lines in conventional power machines, particularly along lift arm structures. Correspondingly, conventional designs may sometimes require the use of removable covers to shield transmissive lines along long sections of a lift arm, rather than more secure weldments or other permanent structures. As another issue for conventional designs, due to particular packaging challenges relating to actuators, links, and associated components, only relatively small clearances may be provided for passage of lines through particular sections of a protected area along a lift arm. This can result in inefficiencies during installation and increased potential for damage or obstruction of particular lines. Similar considerations can also result in decreased visibility for operators in conventional power machines, including due to the need to route transmissive lines around or through particular structures while still providing sufficient free lengths of the lines to accommodate full movement of the associated lift arms (e.g., arranged as loops of the line that extend well above a lift arm structure).

Some implementations disclosed herein can provide improved routing to address these or other issues. For example, some configurations can include fully enclosed weldments that define internal channels for routing transmissive lines. In some cases, the fully enclosed portions of these channels can extend over substantial portions of a lift arm (e.g., along particular lengths relative to a pivot joint for a lift actuator pivot or lift arm linkage). Thus, some examples may require no separate cover (e.g., no removable panel) on a lift arm for protection of transmissive lines. As another example, some configurations can include lift arms with internal structures that define improved clearance and orientation of internal passages, including as can allow for more efficient installation and operational routing of transmissive lines.

As used herein, a fully enclosed portion of an internal channel is a portion of the channel that is structurally bounded on all surrounding sides, other than an entrance and an exit into the portion along a main direction of the internal channel (e.g., a direction along which transmissive lines extend). Thus, for example, a weldment that fully encloses an internal channel of a lift arm can surround the internal channel—and any lines therein—on top, bottom, inboard, and outboard sides of the internal channel, while still providing openings for transmission lines to enter and exit the internal channel along a routing direction that extends from a proximal end of the lift arm toward a distal end of the lift arm (e.g., in a front-to-back direction for a power machine).

Figure 41:
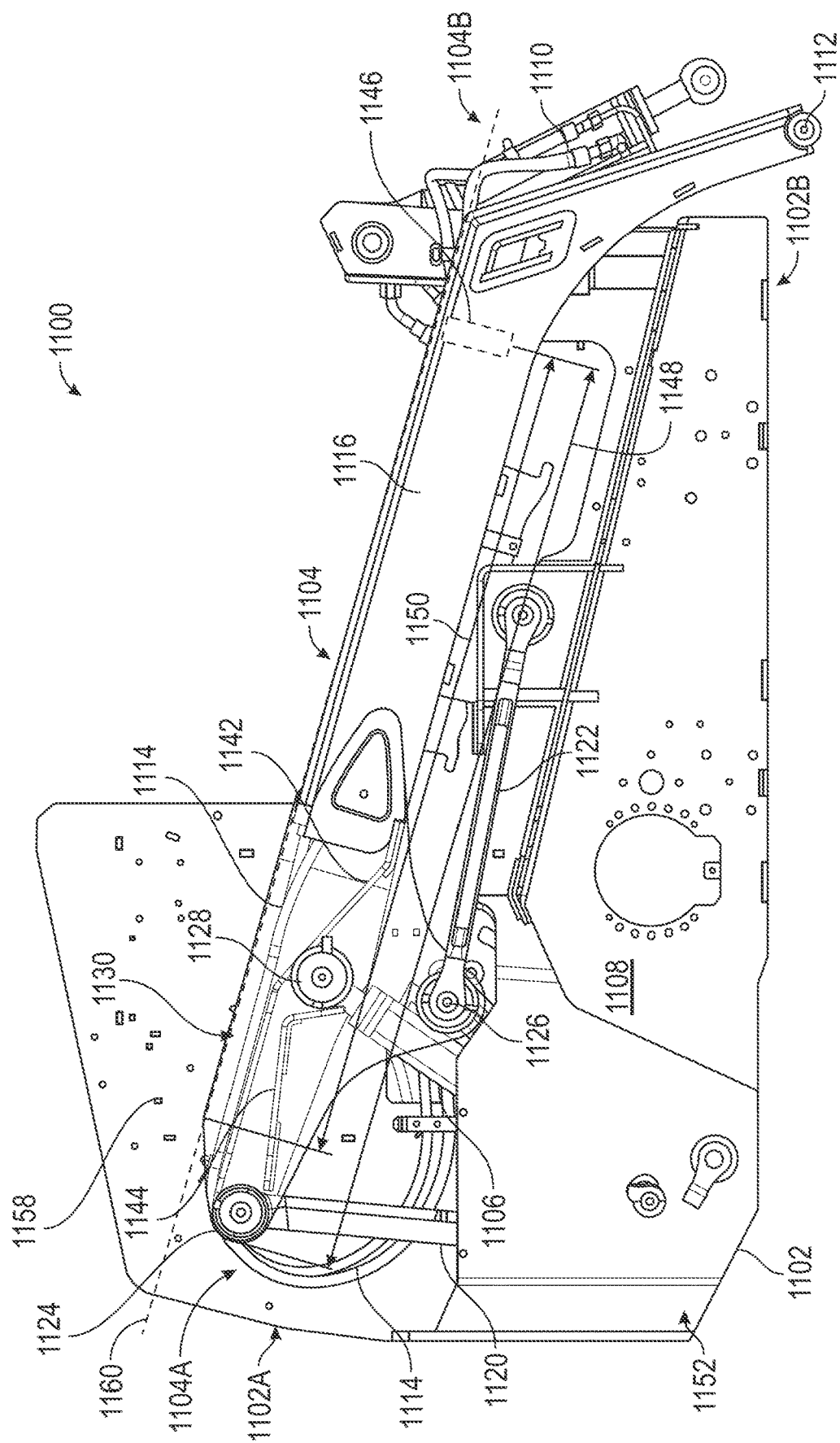
FIG. 41 illustrates a right side elevation view of components of a power machine according to some embodiments of the present disclosure, including a main frame and a lift arm structure, with the lift arm structure in a fully lowered position and with a rear portion of a lift arm rendered transparent to show internal structures.

Some examples of the disclosed technology can provide improved routing relative to multi-member lift arm structures (e.g., lift arm structures with multi-bar linkages). For example, as shown in FIG. 41, a power machine 1100 is configured as a mini-loader that is generally similar to other mini-loaders discussed above and can thus include similar features as discussed above. Correspondingly, the power machine 1100 includes a main frame 1102 that pivotally supports a lift arm structure 1104 with a rear end 1104A and a front end 1104B. An operator station 1152 is provided at a rear end 1102A of the main frame. For example, a standing platform or other operator station as discussed variously above can be included at the rear end 1120A of the frame 1102, laterally between opposing sides of the rear end 1104A of the lift arm structure 1104.

Still referring to FIG. 41, a lift actuator 1106 can be pivotally secured at opposing pivot joints to the lift arm structure 1104 and either of the frame 1102 or a link of a lift arm linkage (e.g., a follower link as discussed below). Thus, the lift actuator 1106 can be powered by an on-board power source 1108, as indicated schematically in FIGS. 41 and 47, to raise and lower the lift arm structure 1104. For example, for a hydraulic lift actuator as shown, the power source 1108 can be a hydraulic pump powered by an engine, as discussed above, or a hydraulic pump powered by an electrical power source. For other lift actuators, corresponding other power sources can be used. For example, the power source 1108 can be an electrical power source configured to electrically power movement of an electric configuration of the lift actuator 1106 (e.g., a ball screw) via transmission of electrical power along one or more of the transmissive lines 1114.

Figure 47:
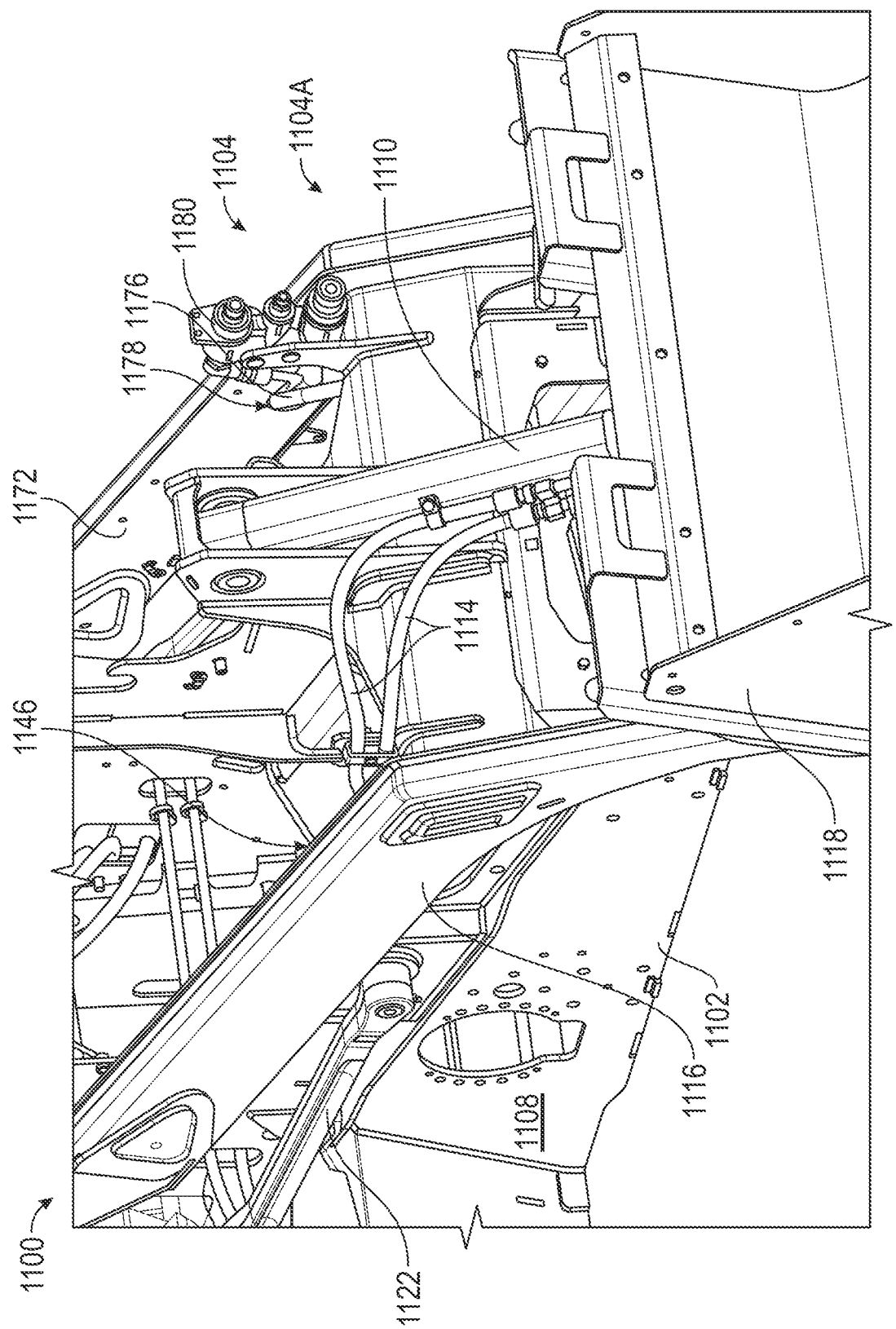
FIG. 47 illustrates a front perspective partial view of the power machine of FIG. 41.

Other actuators can also be included in or engaged with a lift arm structure. For example, a tilt actuator 1110 can be supported at the front end 1104A of the lift arm structure 1104, proximate to a distal pivot joint 1112 for an implement (not shown in FIG. 41). Thus, the tilt actuator 1110 can be powered by an on-board power source 1108 (e.g., a hydraulic pump powered by an engine, as discussed above), via transmissive lines 1114, to change an attitude of an implement supported at the joint 1112 relative to a main lift arm 1116 of the lift arm structure 1104. For example, the tilt actuator 1110 can be powered by the on-board power source 1108 (e.g., a hydraulic pump) to change an attitude of a bucket 1118 as shown in FIG. 47.

In some examples, a lift arm structure can be supported relative to a main frame of a power machine by a linkage, including so that at least two pivot joints are provided on a lift arm of the lift arm structure: a first pivot joint for pivotal connection to a lift actuator, and a second pivot joint for pivotal connection to a link of a lift arm linkage. In some examples, a multi-bar linkage can be used, including as can provide a vertical path lift structure (as also discussed above). For example, in the configuration illustrated in FIG. 41, the rear end 1104A of the lift arm structure 1104 includes a follower link 1120 pivotally connected to a pivot joint 1124 at a proximal end of the lift arm 1116. A driver link 1122 is also pivotally connected to a forward portion of the frame 1102 and to a pivot joint 1126 on the lift arm 1116. At least with the lift arm 1116 fully lowered, as shown in FIG. 41, the pivot joint 1126 is forward of the pivot joint 1124 for the follower link 1120, and also aligned below a pivot joint 1128 between the lift arm 1116 and the lift actuator 1106. Thus, movement of the lift arm 1116 between the fully raised and lowered positions during extension and retraction of the lift actuator 1106 can be prescribed by the particular configuration of the links and pivot joints of the illustrated linkage. In other cases, the principles discussed below can be implemented with other types of lift arm structures, including structures in which a lift actuator extends between different components than illustrated (e.g., a lift arm and a follower link) or in which linkages with different numbers or other arrangements of links or actuators.

Figure 42:
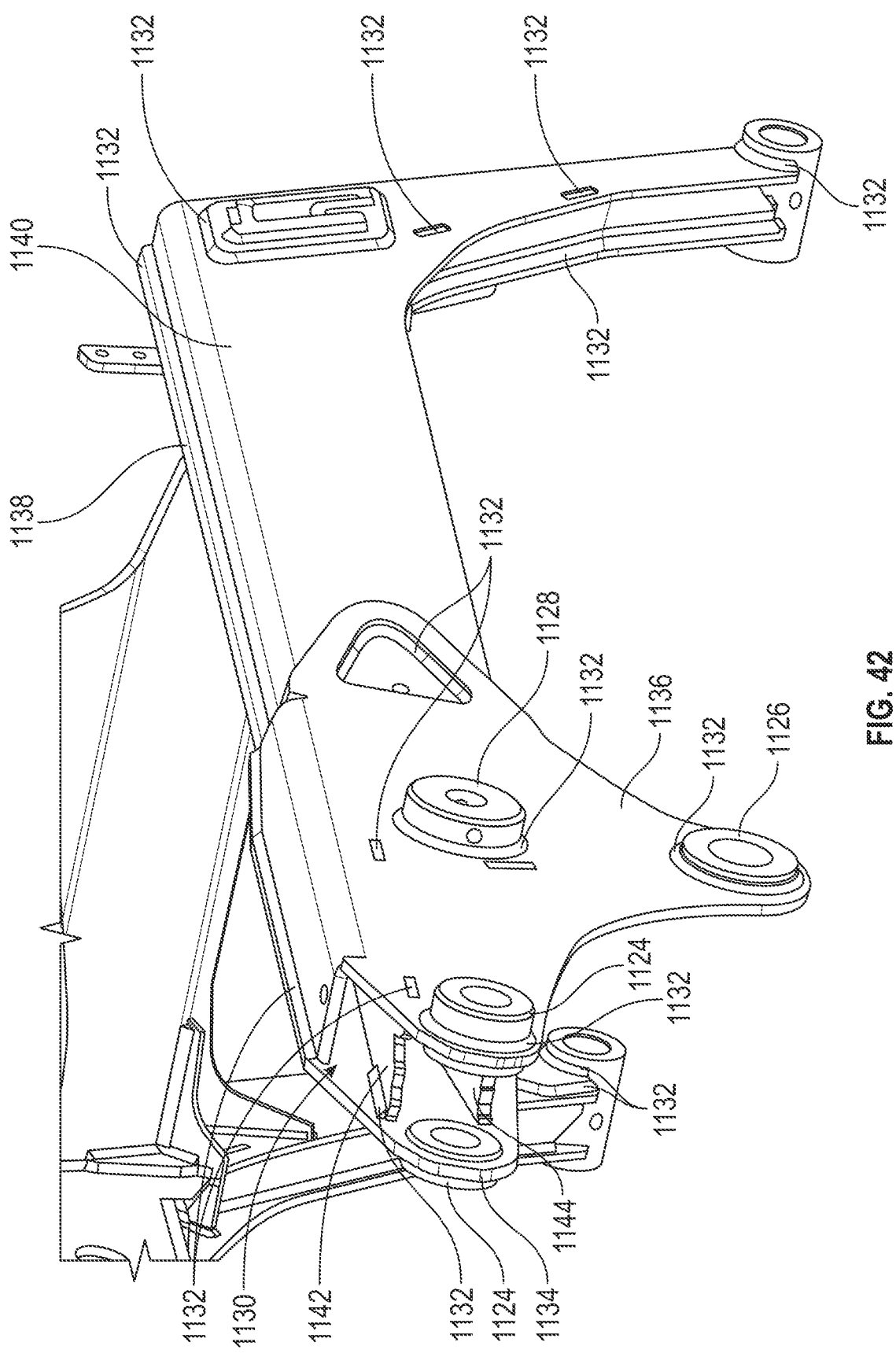
FIG. 42 illustrates a rear perspective view of an example lift arm weldment of the lift arm structure of FIG. 41.

In some cases, as also discussed above, a lift arm can include a weldment that defines an internal channel for routing of transmissive lines within the lift arm. For example, the lift arm 1116 is formed as a weldment that defines an internal channel 1130 along substantially all of a front-to-back length of the lift arm 1116 along which the lines 1114 extend. In particular, the structures of the lift arm 1116 that define the internal boundaries of the internal channel 1130 are welded rather than secured by fasteners or other removable structures. For example, as shown in FIG. 42, welds 1132 extend along external or internal seams between weldment plates 1134, 1136, 1138, 1140 (etc.) and to secure internal weldment plates 1142, 1444 (etc.).

Thus, because internal boundaries of the internal channel 1130 are defined in particular by weldment structures, the internal channel 1130—and the transmissive lines 1114 extending therein—can be more durably protected during operation than in conventional systems. To power the tilt actuator 1110, for example, and as shown in FIG. 41 in particular, the lines 1114 extend within the lift arm 1116, between top and bottom sides of the lift arm 1116, over a length 1148 that is measured between an entry into the internal channel 1130 at a proximal end of the lift arm 1116 and an exit from the internal channel 1130 and the lift arm 1116 at an outlet 1146 (e.g., a formed opening or conventional line fitting). Due to the improved configuration of the lift arm 1116, the lines 1114 can extend within the internal channel 1130, as defined by the weldment of the lift arm 1116, over a length 1150 that may be substantially equal to the length 1148 (e.g., within 15%, 12% or less of the length 1148 as shown). Further, in the illustrated example, the lines 1114 extend within the fully enclosed weldment portion of internal channel 130 along a length of the lift arm that includes and extends forward of the pivot joint 1128. In some examples, a fully enclosed weldment portion of the internal channel 130 can extend by different lengths, including farther than is shown (e.g., also along a length of the lift arm 1116 that includes the pivot joint 1124.

Figure 43:
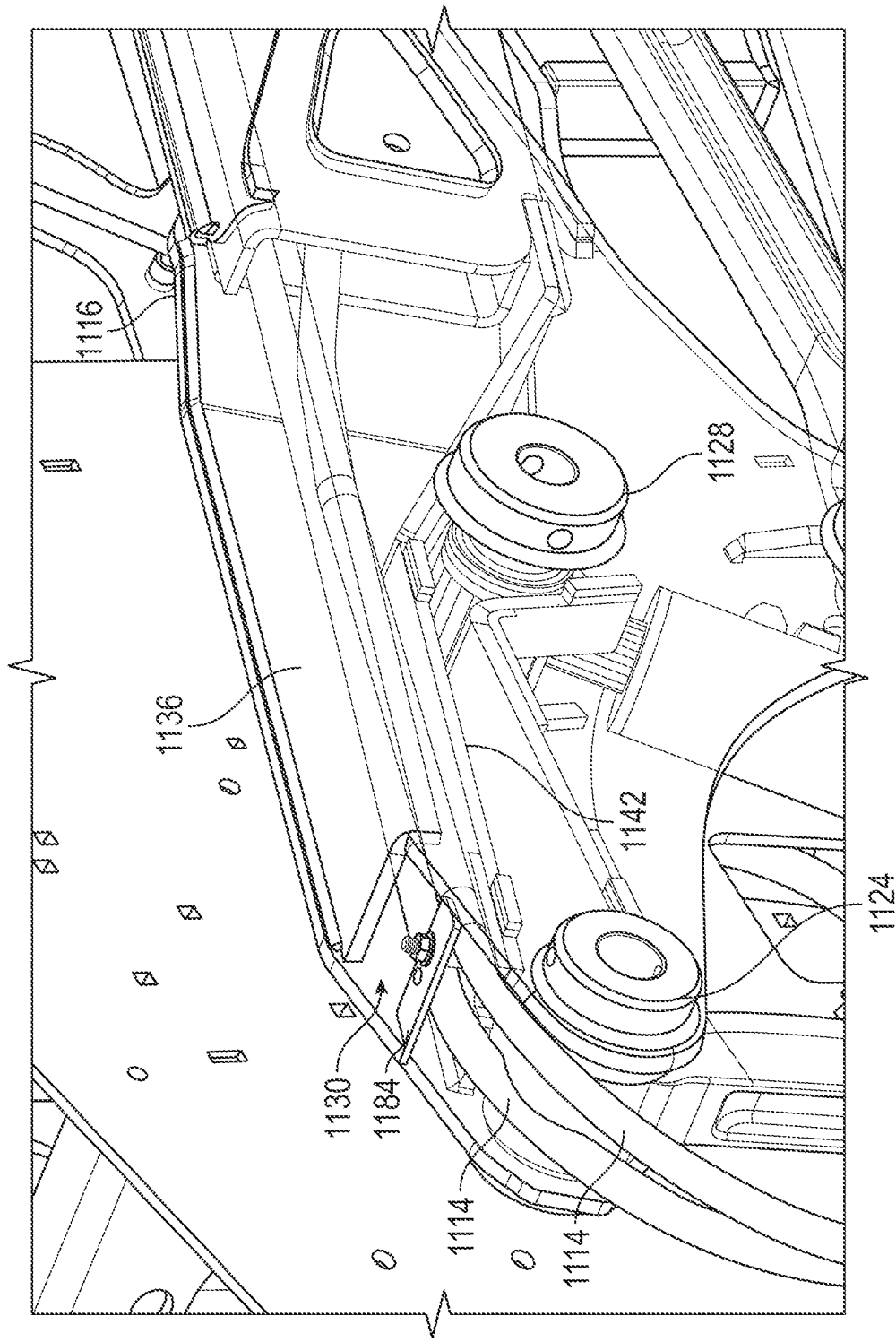
FIG. 43 illustrates a rear perspective partial view of the power machine of FIG. 41.

In some cases, other improvements in routing of lines along lift arms can be implemented, including as may be facilitated by the one or more of the improvements discussed above. For example, some arrangements according to the disclosed technology can include transmissive lines that extend above a rearward (e.g., farthest rearward) pivot joint of a lift arm to enter an internal channel of a lift arm. In some arrangements, transmissive lines may not extend above a top plane defined by a lift arm over a range of motion of a lift arm, including at a fully lowered orientation of a lift arm, at which operator visibility may be more notably affected by components that extend notably above a lift arm. As shown in FIGS. 41 and 43, for example, the transmissive lines 1114 can be routed by the internal channel 1130, from the frame 1102 of the power machine (and the power source 1108, see FIG. 41) by passing above and rearward of the pivot joint 1124 to enter the internal channel 1130 of the lift arm 1116.

Thus, as guided by the internal guide plate 1142 in the example shown, and as shown in FIG. 41 in particular, the transmissive lines 1114 can extend from above and behind the pivot joint 1124 and into the internal channel 1130 without extending above a top plane 1160 defined along a top surface of the lift arm 1116 (e.g., with the top plane 1160 exhibiting the average slope of a top surface of the lift arm 1116, and being tangent to the top of the lift arm in alignment with the pivot joint 1124 or at a distal end of the top surface of the weldment that bounds the internal channel 1130).

Additionally, some disclosed arrangements can allow transmissive lines to remain below a top plane of a lift arm over a relatively larger range of motion of particular lift arm structures. As shown in FIG. 44A, for example, the arrangement of the internal channel 1130 or associated lift arm structures can ensure that the lines 1114 remain below the top plane 1160 to extend from the frame 1102 into the internal channel 1130, as the lift arm is raised above a fully lowered position (e.g., to a partially raised position). For example, as illustrated in FIG. 44A, with the internal channel 1130 generally arranged as described herein (e.g., as discussed relative to FIG. 45, below), as the lift arm structures 1104 is raised from a fully lowered configuration (see, e.g., FIG. 41) to at least a partially raised configuration, the transmissive lines 1114 can still extend to cross behind and over the pivot joint 1124 and extend into the channel 1130 without extending above the top plane 1160. For example, the transmissive lines 1114 can extend behind and over the pivot joint 1124 (e.g., a rear-most pivot joint, as shown) and into the channel 1130, without crossing the top plane 1160, up to a height 1154 above ground as measured at the implement pivot joint 1112. In some examples, the height 1154 can be about 90% of a fully-raised height of the pivot joint 1112. In other cases, other maximum heights are possible for similar alignment of transmissive lines (e.g., with transmissive lines remaining below the top plane up to about 60% of a fully-raised height for a lift arm, up to about 70% of a fully-raised height, up to about 80% of a fully-raised height, up to a fully-raised height, etc.).

Figure 44B:
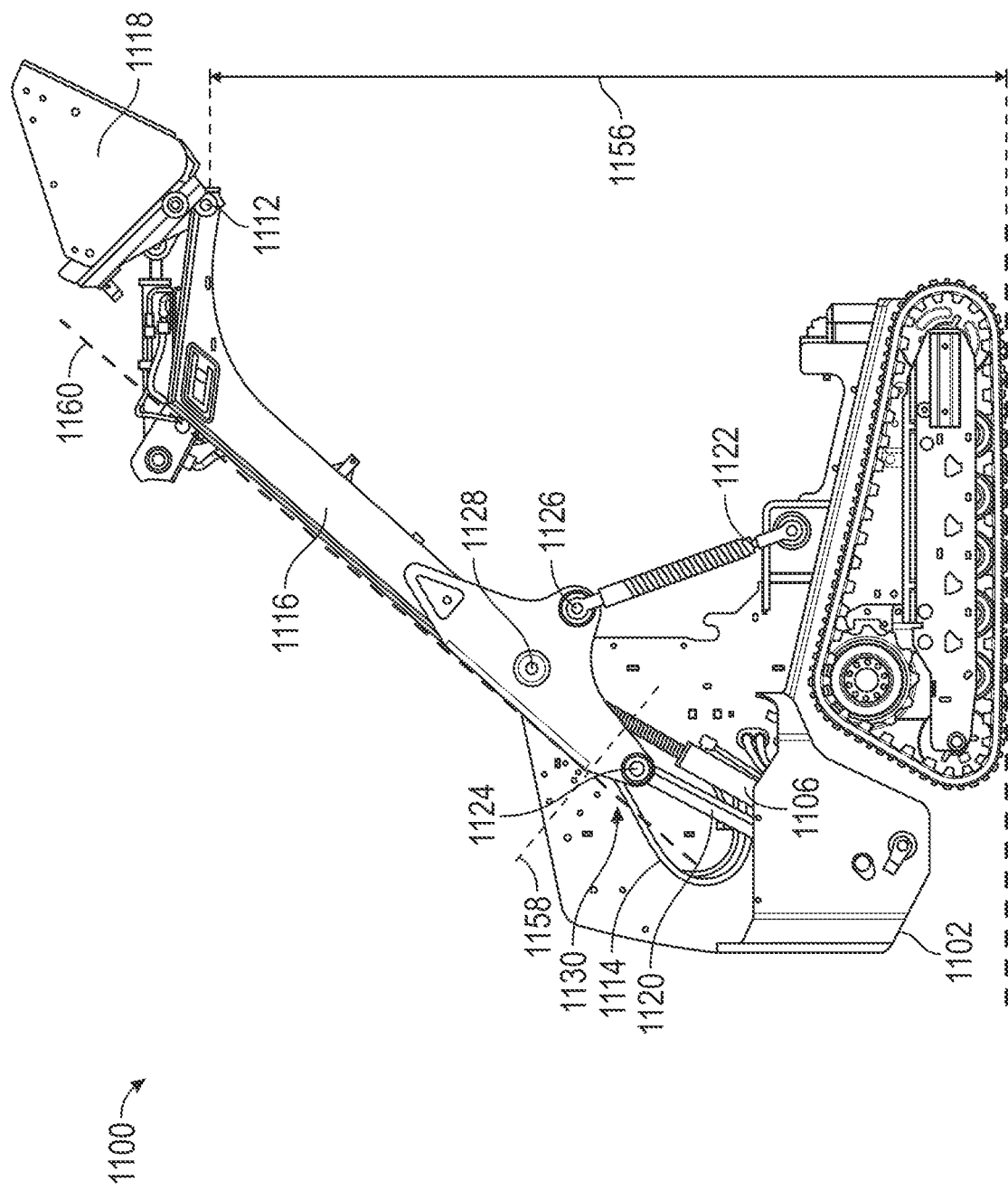

Relatedly, in some cases, internal channels of lift arms can be configured so that, over a wide range of lift arm heights, transmissive lines can continue to pass at optimal angles into an entrance of a fully enclosed internal channel of the lift arm. For example, as shown in FIGS. 44A and 44B, with the lift arm 1116 at the partially raised height 1154 or at a fully raised height 1156, the lift arm structure 1104 is arranged so that the transmissive lines 1114 can pass from below the top plane 1160 into an entrance 1158 of a fully enclosed portion of the internal channel 1130, as defined by the weldments of the lift arm 1116 (e.g., perpendicular to the top plane 1160). In other words, rather than extend into an enclosed channel of the lift arm by crossing a top surface of the lift arm, the transmissive lines can extend into the entrance 1158 to the weldment-enclosed internal channel 1130 from below the plane 1160 (including after having never crossed the plane 1160, with the lift arm 1116 positioned below or at the height 1154). Likewise, for examples in which transmissive lines pass behind or over a rearward pivot joint for a lift arm (e.g., behind and over, as shown for the lines 1114 and the joint 1124), transmissive lines can thus extend into a fully-enclosed portion of a weldment from between a top plane and a local bottom edge of a lift arm, rather than from above the top plane or below the bottom edge.

In some examples, one or more of the benefits noted above can be provided, or can be further improved, with particular arrangements of the internal geometry of an internal channel of a lift arm. For example, use of internal guide structures along an internal channel can result in particularly beneficial directional routing of transmissive lines (e.g., particular angular routing at key points). Or use of internal guide structures can result in a particularly beneficial balance between spatial constraints for a lift arm structure as a whole and for a cross-sectional area of an internal channel through which transmissive lines may need to be fed during manufacturing, operational, and maintenance activities.

Figure 45:
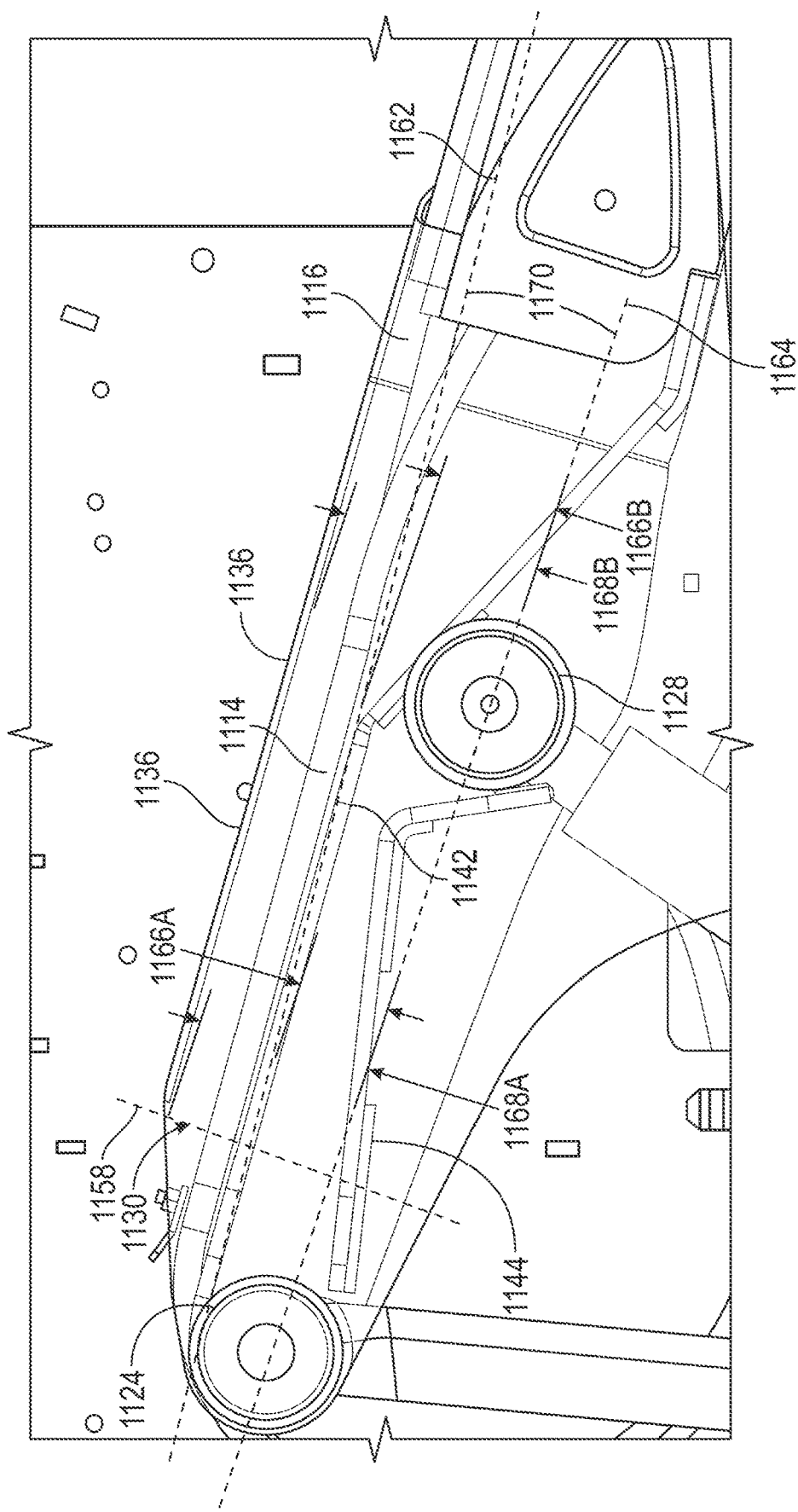
FIG. 45 illustrates a detail right side elevation view of the power machine of FIG. 41, including certain geometric relationships of an internal channel for routing of transmissive lines.

As one example, in this regard, internal structures of a lift arm can provide a particular angular orientation of an internal channel and a particular minimal cross-sectional area, which can individually or collectively provide improved routing of transmissive lines in optimal balance with structural support for other components (e.g., the high-load structures at and around the pivot joints 1124, 1128). In some configurations, a lower internal boundary of an internal channel, including as may be fully enclosed within a weldment portion of a lift arm, can be oriented to deviate by no more than four degrees from parallel with a reference line between the nearest associated pivot joints. For example, as illustrated in FIG. 45 in particular, the internal weldment plate 1142 is arranged as a lower guide plate 1142 that defines a lower internal boundary of the internal channel 1130. A reference line 1162 extending along the plate 1142—and in particular along substantially all of a length of the plate 1142 between the pivot joints 1124, 1128—can deviate by less than four degrees (e.g., 3.3 degrees as shown for the illustrated angle 1170) from a reference line 1164 through the axes of rotation of the pivot joints 1124, 1128.

As another example, in some configurations, upper and lower boundaries of an internal channel of a lift arm can ensure that the internal channel exhibits no less than about 1.8 inches in minimum cross-sectional height. As shown in FIG. 45, the lower internal boundary of the internal channel 1130, as can be defined by the plate 1142 along a length of the internal channel 130, can be spaced from the reference line 1162 by a perpendicular distance 1166A at the entrance 1158 to the weldment-enclosed portion of the internal channel 1130 and by a perpendicular distance of 1166B further along the internal channel 1130. In some cases, the distances 1166A, 1166B can represent minimum and maximum spacings of the plate 1142, respectively, from the reference line 1162. In some cases, the distance 1166A can be no more than about 2.2 inches (e.g., about 2.2 inches at a maximum, as shown), or the distance 1166B can be no more than about 2.8 inches (e.g., about 2.8 inches at a maximum, as shown).

Still referring to FIG. 45, a top internal boundary of the internal channel 1130 can be formed by the internal contour of a top portion the plate 1136 and can also be particularly spaced relative to reference locations. For example, in some cases, the upper internal boundary can be spaced from the reference line 1162 at the entrance 1158 by a perpendicular distance 1168A of no less than about four inches (e.g., by about 3.9 inches at a minimum, as shown), or can be spaced from the reference line 1162 at a location further along the internal channel 1130 by a perpendicular distance 1168B of no less than about 4.6 inches (e.g., by about 4.6 inches, as shown). The distance 1168B can correspond, for example, to a location of maximum spacing of a lower boundary of the internal channel 1130 away from the reference line 1162 (e.g., can correspond to the same location along the internal channel 1130 as the distance 1166B, as shown in FIG. 45).

Thus, in some cases, as also noted above, the internal channel 130 can exhibit a minimum cross-sectional height of about 1.8 inches along a relevant length of the internal channel 130 (e.g., at or between the pivot joints 1124, 1128, over substantially all of the internal channel 130, etc.). In particular, for the example illustrated in FIG. 45, the weldment plates 1136, 1142 can collectively define an internal channel that exhibits a minimum cross-sectional height (and corresponding clearance) of at least about 1.8 inches, particularly along a length of the lift arm 1116 that extends between or includes either of the pivot joints 1124, 1128. In other cases, similar other arrangements can similarly provide a substantially constant height of the internal channel 130 along a length of the channel 130 that extends between or includes either of the pivot joints 1124, 1128 (e.g., an entrance-section height that remains substantially equal at a minimum channel height over the relevant length of the channel 130, as shown in FIG. 45).

Figure 46:
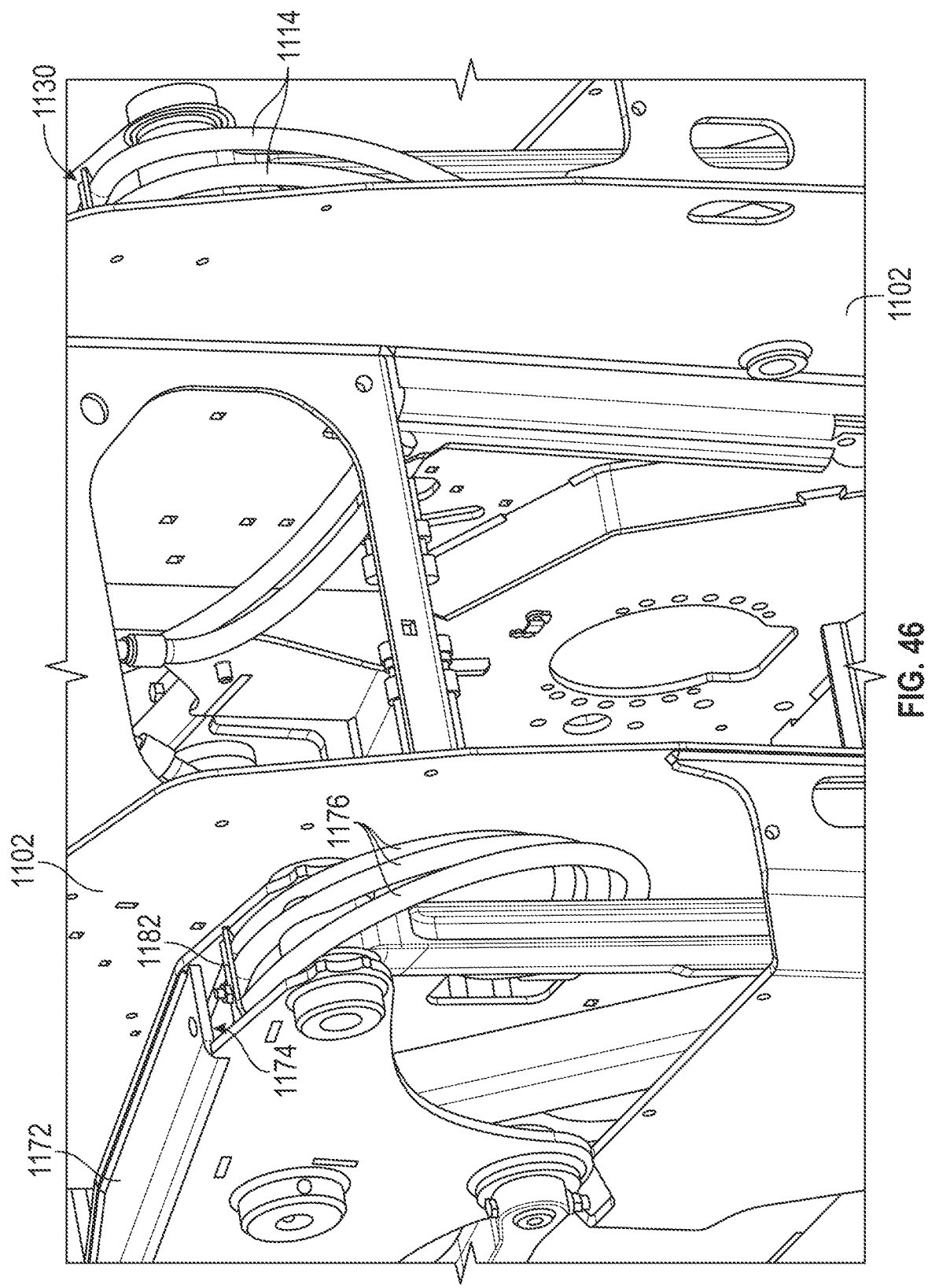
FIG. 46 illustrates a detail rear perspective partial view of the power machine of FIG. 41.

In some examples, internal channels to route transmissive lines along lift arms can be similarly configured on opposing sides of a power machine. For example, as shown in FIG. 46, a second lift arm 1172 off the lift arm structure 1104 can be structured to provide an internal channel 1174 similar to the internal channel 1130 (see, e.g., FIG. 41) to similarly route transmissive lines 1176 from the main frame 1102 through the lift arm 1172. In particular, as illustrated in FIG. 47, the internal channel 1130 can extend to a distal outlet 1178 at which the lines 1176 can pass out of the internal channel 1130 to provide power or control for auxiliary implements (not shown). For example, the lines 1176 can extend to provide power or control signals to an implement power interface 1180 supported at the front end 1104B of the lift arm structure 1104. As with the lines 1114, the transmissive lines 1176 are illustrated as hydraulic hoses but can additionally or alternatively transmit electrical signals for control or power in some configurations.

Also as shown in FIG. 46, an anchor assembly 1182 can be provided in some examples to secure the lines 1176 at a proximal end of the lift arm 1172. For example, the anchor assembly 1182 can include a screw-adjusted clamp, as illustrated in FIG. 46. A similar anchor assembly 1184 can be provided for the lines 1114 as shown in FIG. 43.

Although the subject matter has been described in language specific to structural features and/or methodological acts, it is to be understood that the subject matter defined in the appended claims is not necessarily limited to the specific features or acts described above.

What is claimed is:

1. A mini-loader comprising:
   a frame;
   an operator station positioned toward a rear end of the frame and configured to be used by an operator who is behind or on the rear end of the frame;
   a power source positioned toward a front end of the frame;
   one or more hydraulic pumps operatively coupled to the power source; and
   at least two heat exchangers supported by the frame and configured to cool fluid passing through the at least two heat exchangers, including a radiator configured to receive coolant from the power source and an oil cooler configured to receive hydraulic fluid from the one or more hydraulic pumps,
   wherein the at least two heat exchangers are positioned between the power source and the operator station.

2. The mini-loader of claim 1, wherein at least one of the at least two heat exchangers is oriented vertically.

3. The mini-loader of claim 1, wherein at least one of the at least two heat exchangers is positioned vertically above an axis defined by a crankshaft of the power source.

4. The mini-loader of claim 1, wherein a bottom end of at least one of the at least two heat exchangers is pivotally mounted to the frame.

5. The mini-loader of claim 1, wherein the radiator is coupled to the oil cooler.

6. The mini-loader of claim 5, wherein the radiator and the oil cooler are arranged in the same plane.

7. The mini-loader of claim 6, wherein the radiator is positioned vertically above the oil cooler.

8. A mini-loader comprising:
a frame;
an operator station positioned toward a rear end of the frame and configured to be used by an operator who is behind or on the rear end of the frame;
a power source positioned toward a front end of the frame;
at least one heat exchanger supported by the frame to be positioned between the power source and the operator station, and configured to cool fluid passing through the at least one heat exchanger,
an air inlet positioned toward a rear end of the frame;
a hood pivotally coupled to the frame and configured to cover the power source and at least one side of the at least one-heat exchanger;
at least one air outlet arranged on a first lateral sidewall of the hood or an opposing second lateral sidewall of the hood; and
a fan coupled to the at least one heat exchanger and configured to draw air through an airflow path defined by the air inlet, the at least one heat exchanger, and the at least one air outlet.

9. The mini-loader of claim 8, wherein the fan is a variable-speed electric fan.

10. The mini-loader of claim 8, wherein the air inlet is positioned vertically below an operator control panel and the at least one heat exchanger is positioned forward of the operator control panel.

11. The mini-loader of claim 8, wherein the at least one heat exchanger is pivotally mounted to the frame and configured to pivot in a first direction and the hood is configured to pivot in a second direction opposite the first direction.

12. The mini-loader of claim 8, wherein the at least one air outlet includes at least two air outlets including a first air outlet on the first lateral sidewall and a second air outlet on the second lateral sidewall.

13. The mini-loader of claim 12, wherein the hood defines an enclosure including an open back side configured to receive air entering through the at least one heat exchanger, the first lateral sidewall, the second lateral sidewall, a top wall, and a bottom wall,
wherein the enclosure is configured to prevent air entering through the at least one heat exchanger from entering into a power source compartment containing the power source.

14. The mini-loader of claim 12, wherein the hood includes a vertical center baffle configured to separate air entering through the at least one heat exchanger to direct an outlet flow of the air through the first and second air outlets in the first and second lateral sidewalls, respectively.

15. A mini-loader comprising:
a frame;
an operator station positioned toward a rear end of the frame and configured to be used by an operator who is behind or on the rear end of the frame;
a power source positioned toward a front end of the frame; and
a hydraulic pump unit including one or more hydraulic pumps, the hydraulic pump unit being operatively coupled to the power source and extending from the power source towards the rear end of the frame, and the hydraulic pump unit being solely supported by a coupling with the power source.

16. The mini-loader of claim 15, wherein the hydraulic pump unit is supported by the power source in a cantilever arrangement.

17. The mini-loader of claim 15, wherein a shaft of the hydraulic pump unit is arranged in-line with and coupled to a crank shaft of the power source.

18. The mini-loader of claim 17, wherein the hydraulic pump unit includes:
a first drive pump configured to power to a first drive motor to operate a first tractive element;
a second drive pump configured to power to a second drive motor to operate a second tractive element; and
an implement pump configured to power one or more work elements.

19. The mini-loader of claim 18, wherein the first drive pump, the second drive pump, and the implement pump are axially aligned with one another.

20. The mini-loader of claim 19, wherein the first drive pump is operatively coupled to the crank shaft of the power source, the second drive pump is operatively coupled to the first drive pump, and the implement pump is operatively coupled to the second drive pump.

21. A mini-loader comprising:
a frame including a first side frame member, a second side frame member laterally opposite the first side frame member, and a cross member spanning between the first and second side frame members;
an operator station positioned toward a rear end of the frame and configured to be used by an operator who is behind or on the rear end of the frame; and
a power source positioned toward a front end of the frame and supported by engine mounts on each of the first side frame member, the second side frame member, and the cross member, the engine mounts including:
a first engine mount coupled between a front side of the power source and the cross member and positioned in a vertical plane defined by a crankshaft of the power source;
a second engine mount coupled between the power source and the first side frame member; and
a third engine mount coupled between the power source and the second side frame member.

22. The mini-loader of claim 21, wherein the power source is rearward of the cross member.

23. The mini-loader of claim 21, wherein the second engine mount and the third engine mount define a lateral axis therebetween, the lateral axis being perpendicular to a crankshaft axis.

* * * * *